Figure 1:
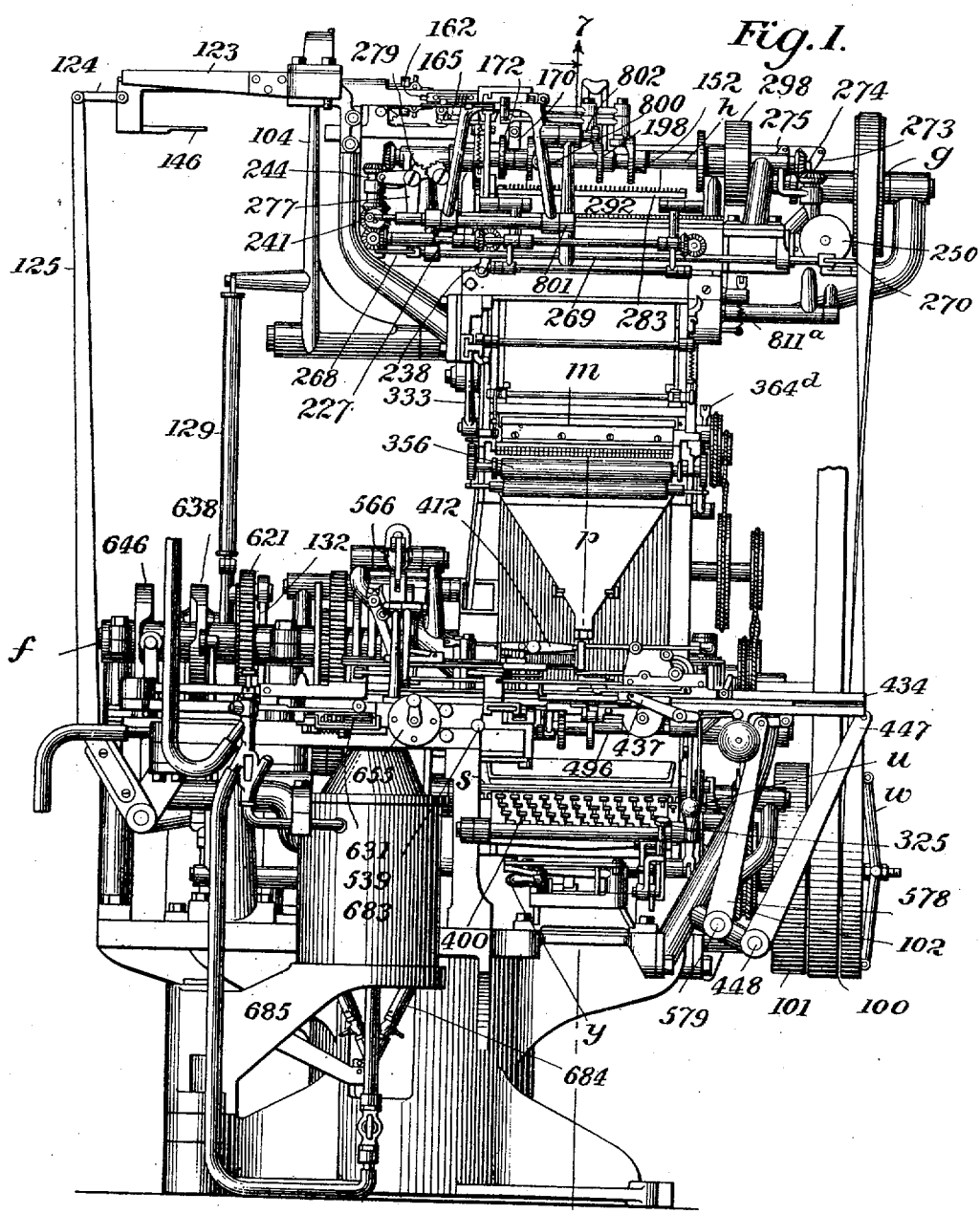

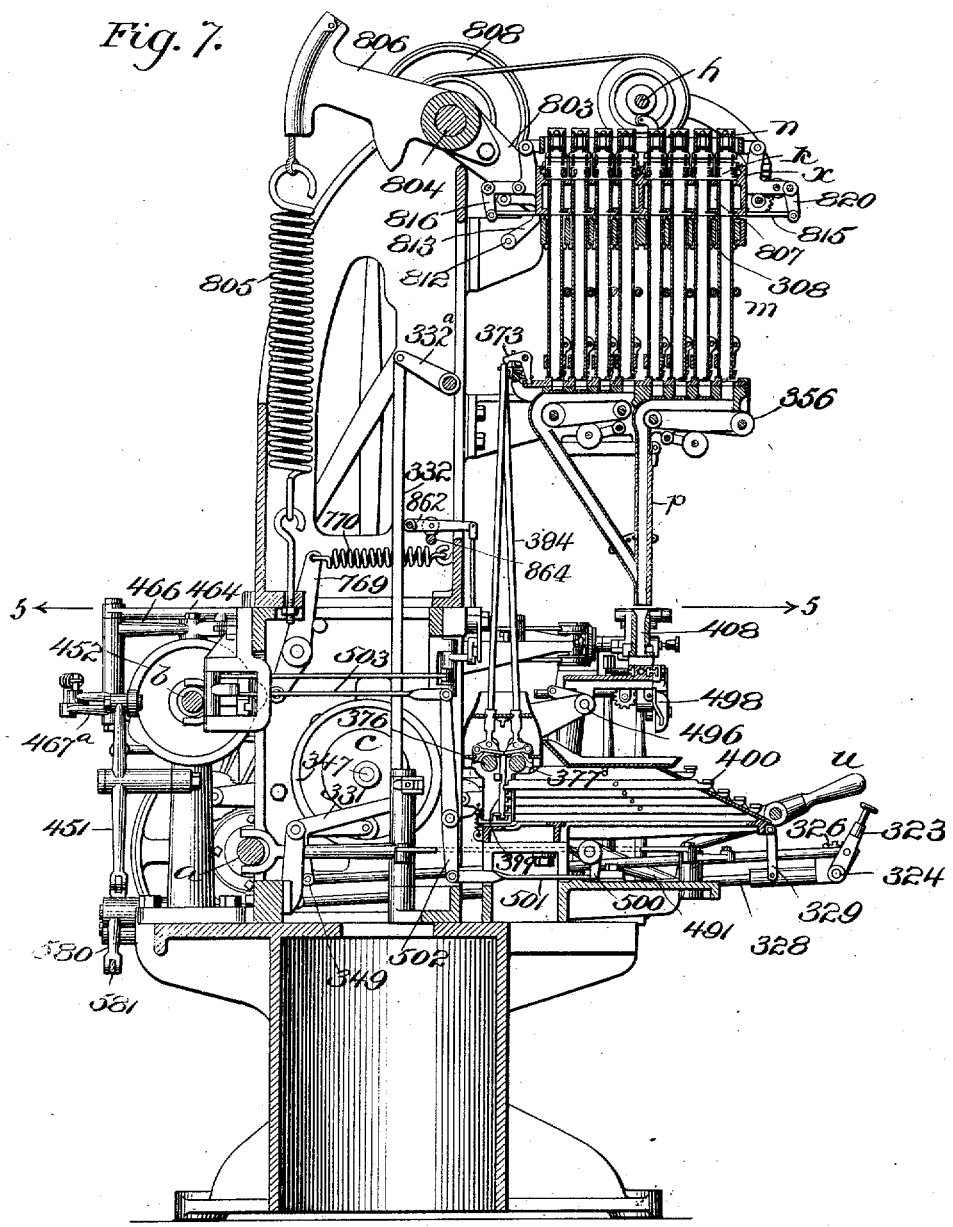

E. LAWRENZ.
TYPOGRAPHIC MACHINE.
APPLICATION FILED MAR. 14, 1904.
1,017,771.
Patented Feb. 20, 1912.
48 SHEETS—SHEET 8.
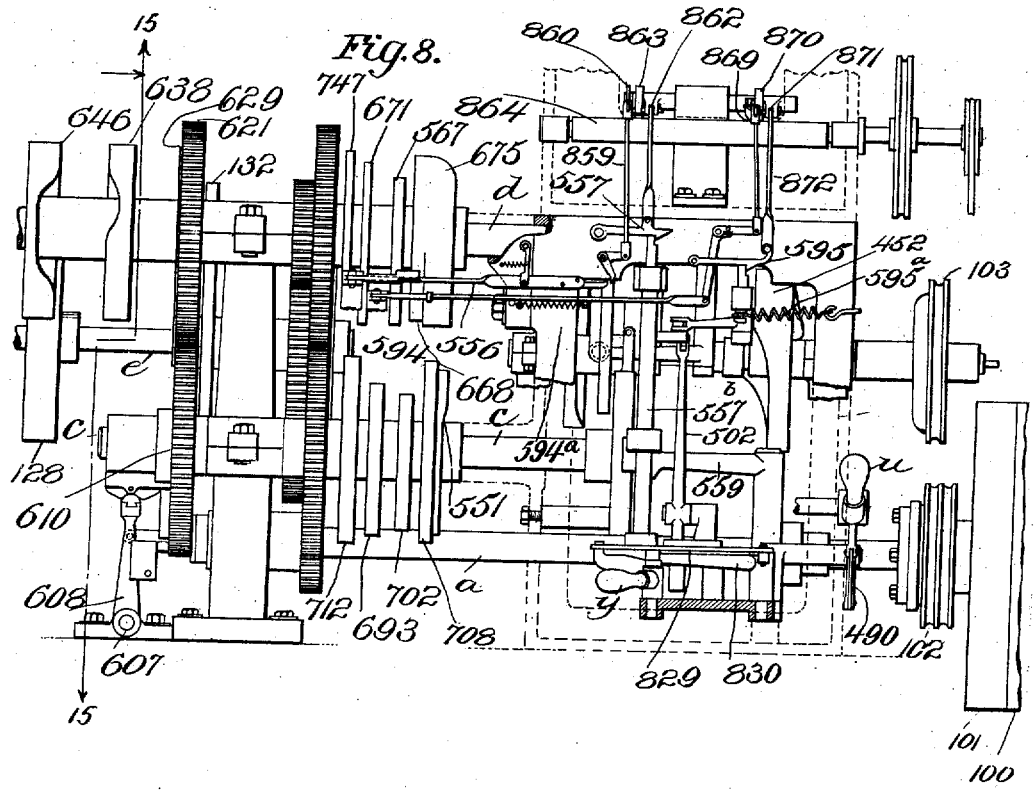
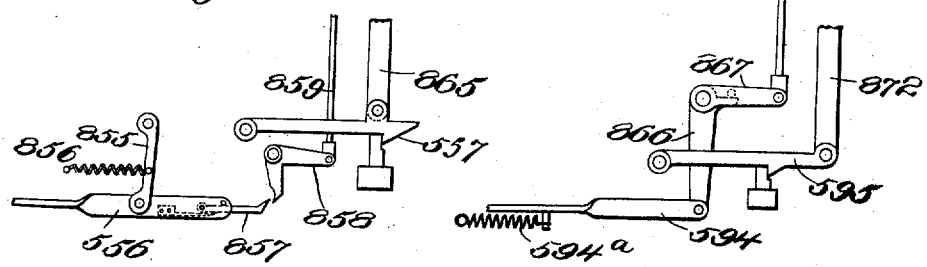
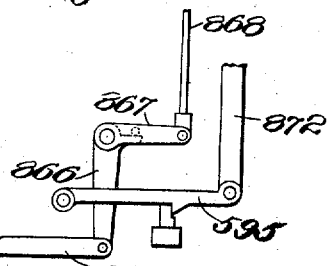
Witnesses
Fenton S. Belt
C. W. Clement
Inventor
Emil Lawrenz
by J. H. Watson
Attorney E. LAWRENZ.
TYPOGRAPHIC MACHINE.
APPLICATION FILED MAR. 14, 1904.
1,017,771.
Patented Feb. 20, 1912.
48 SHEETS—SHEET 9.
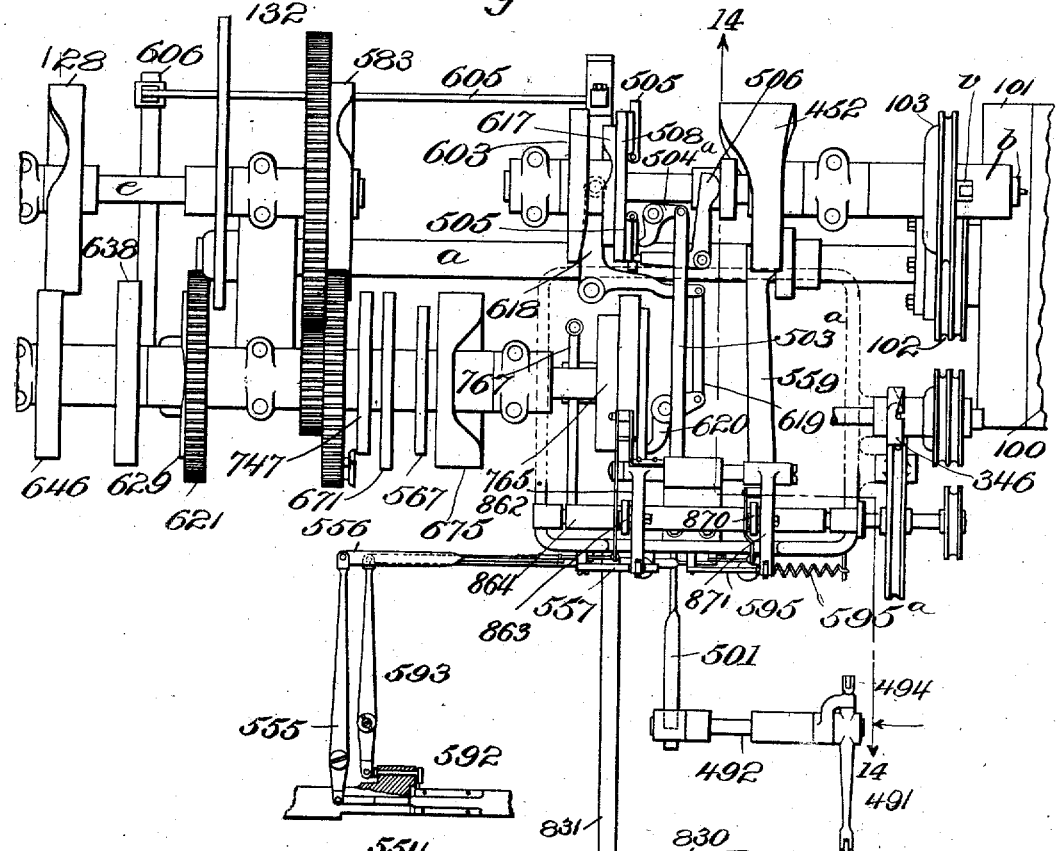
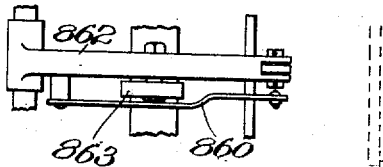
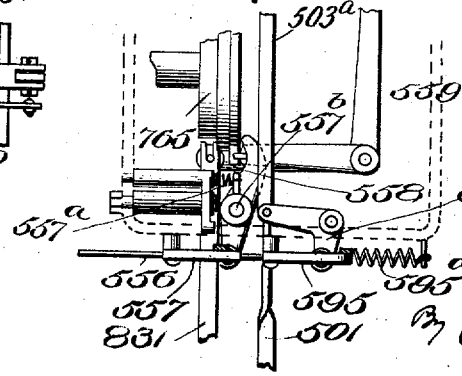
Witnesses
Fenton S. Belt
C. W. Clement
Inventor
Emil Lawrenz
By J. Watson
Attorney

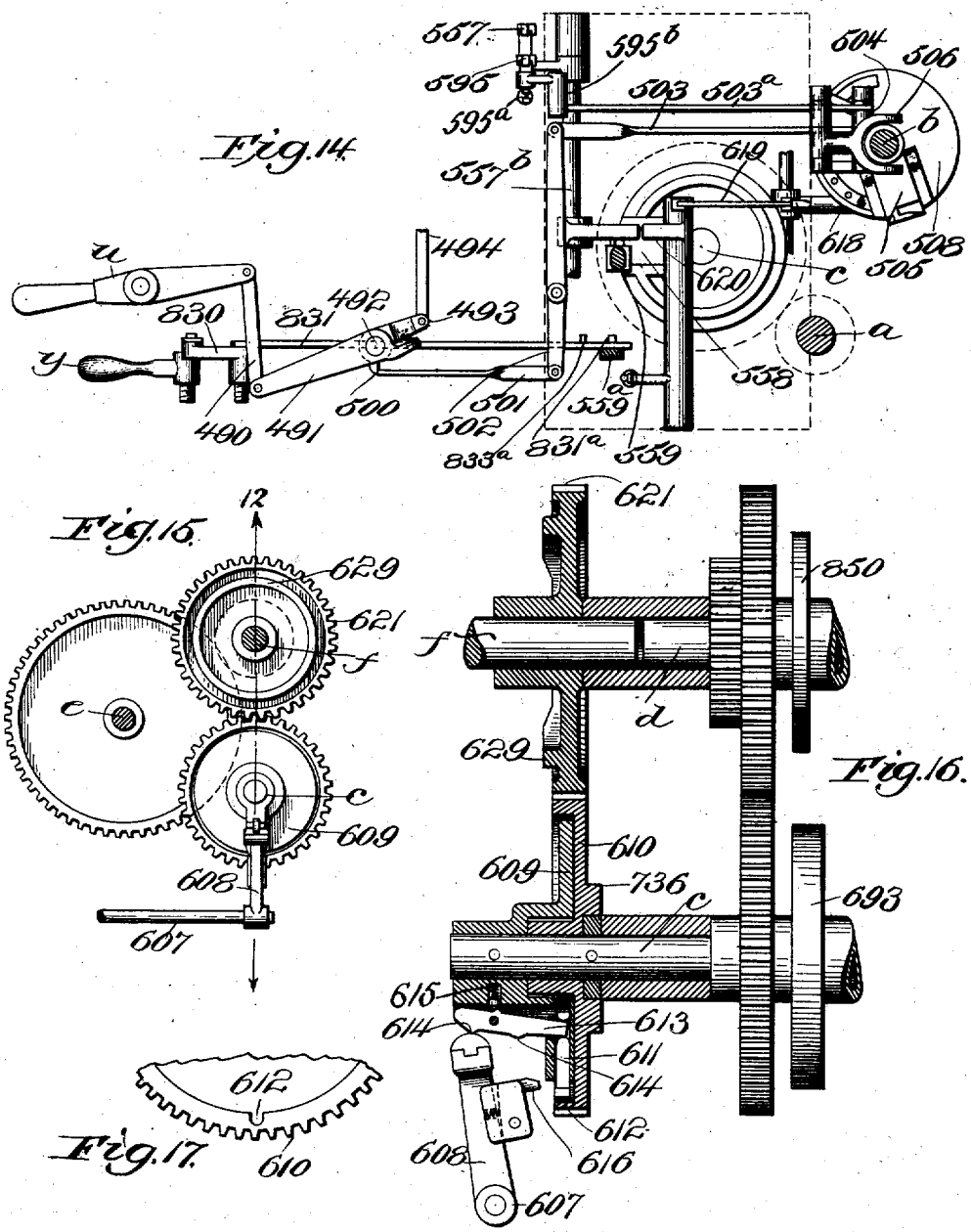

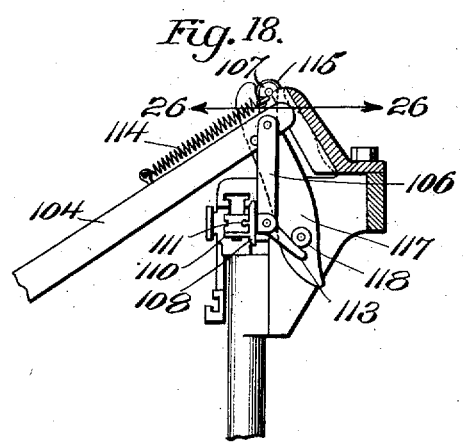
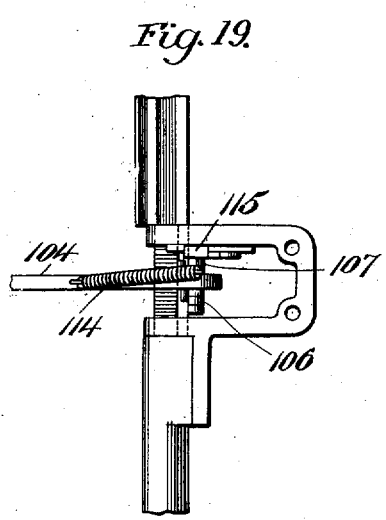
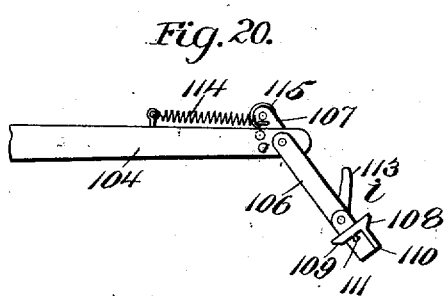
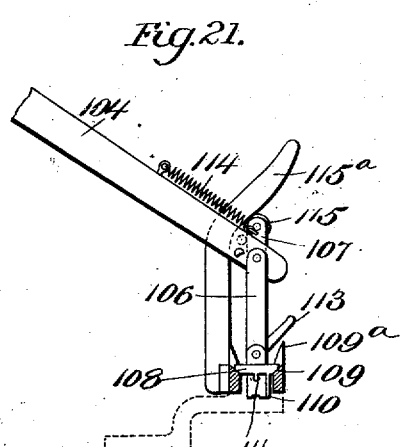
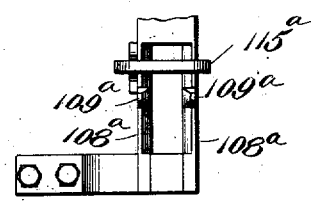

E. LAWRENZ.
TYPOGRAPHIC MACHINE.
APPLICATION FILED MAR. 14, 1904.
1,017,771.
Patented Feb. 20, 1912.
48 SHEETS—SHEET 12.
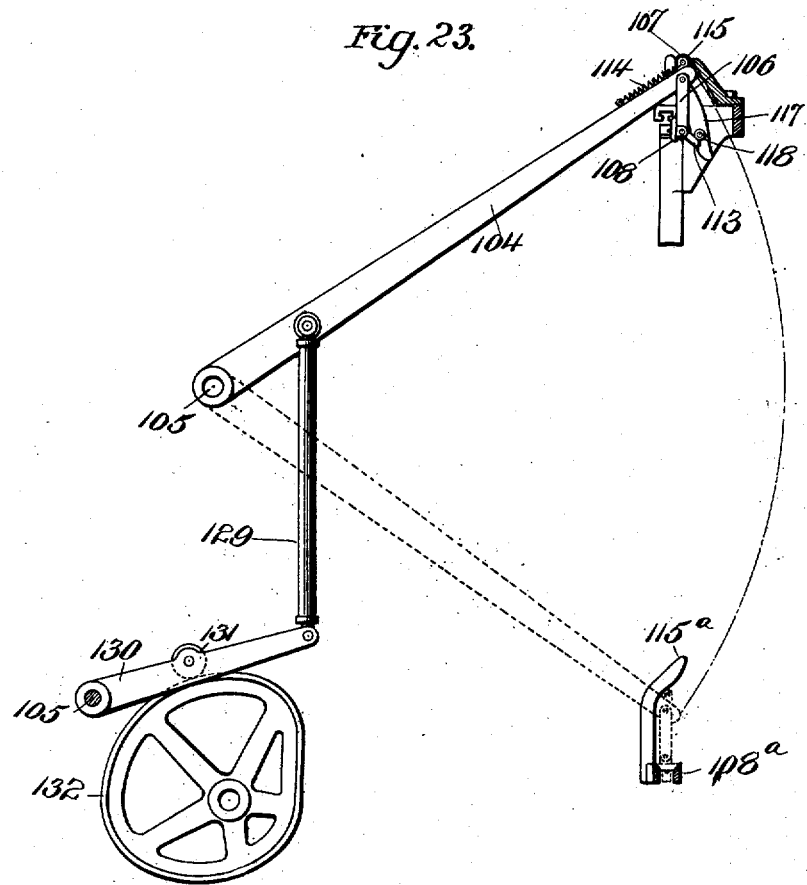
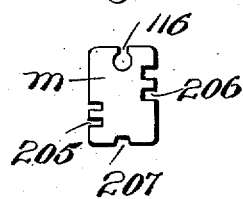

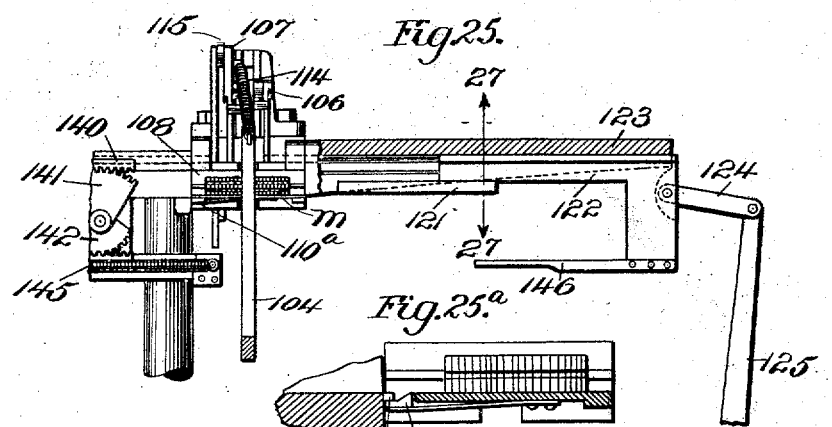

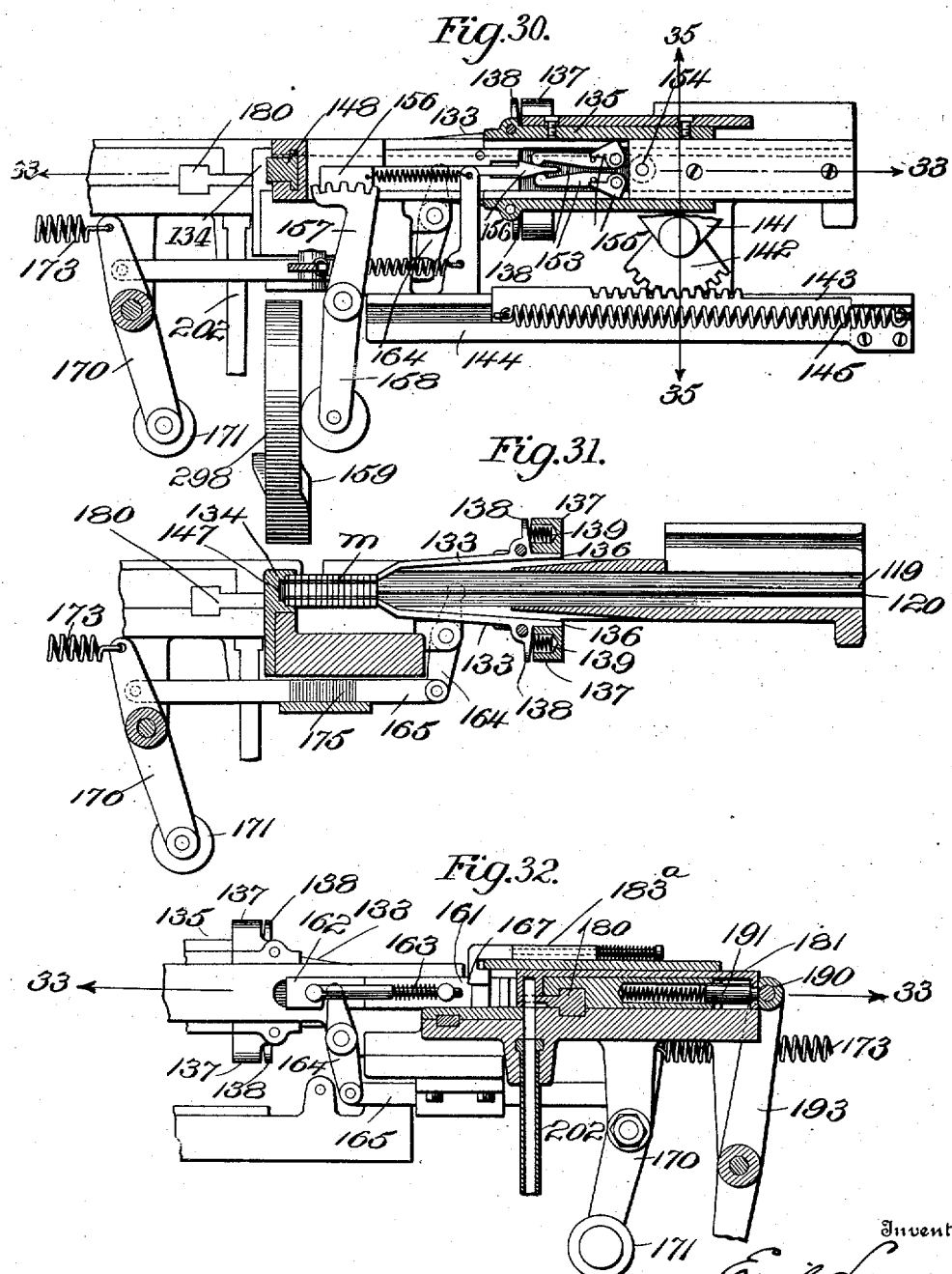

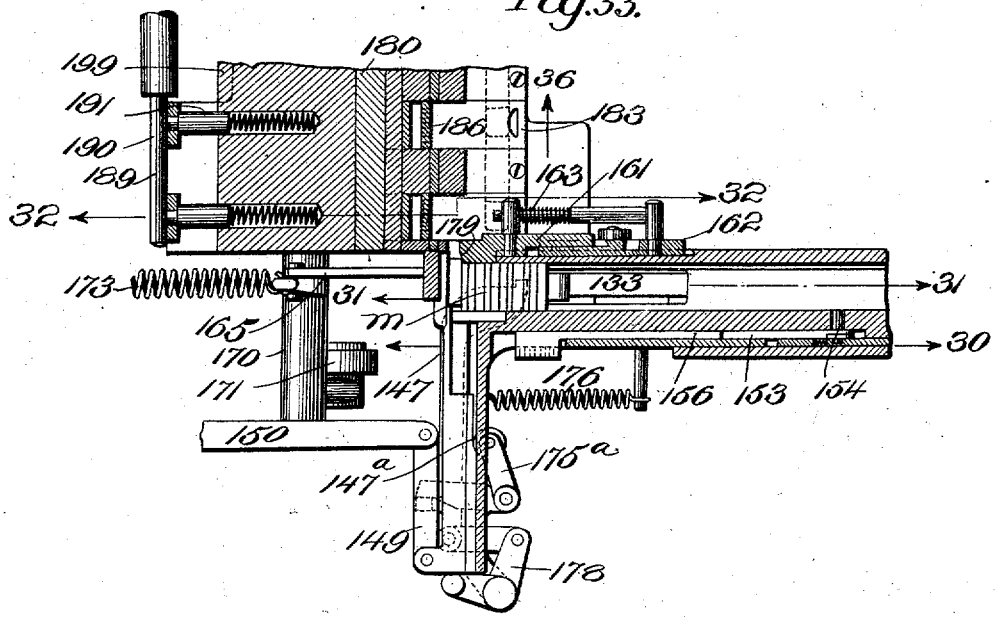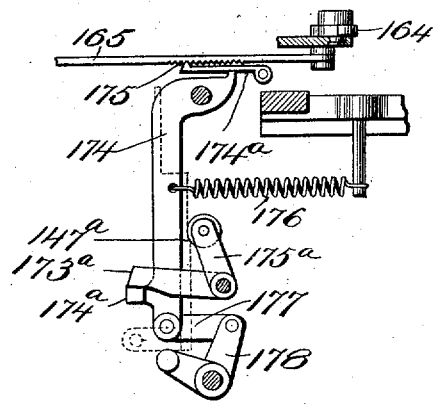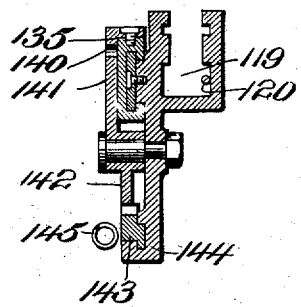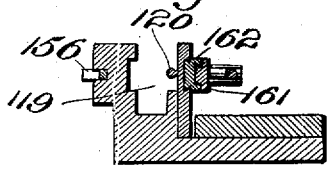

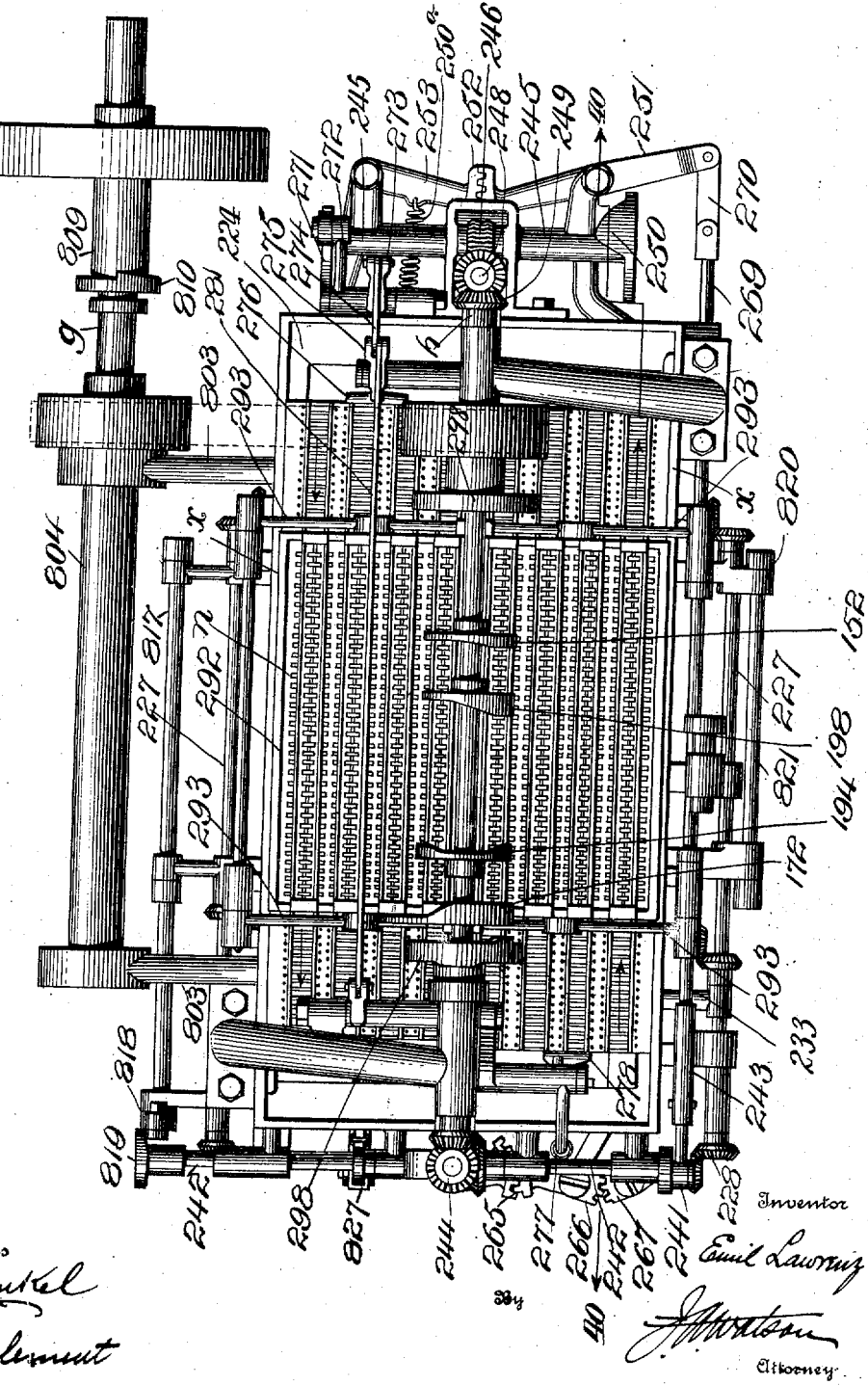

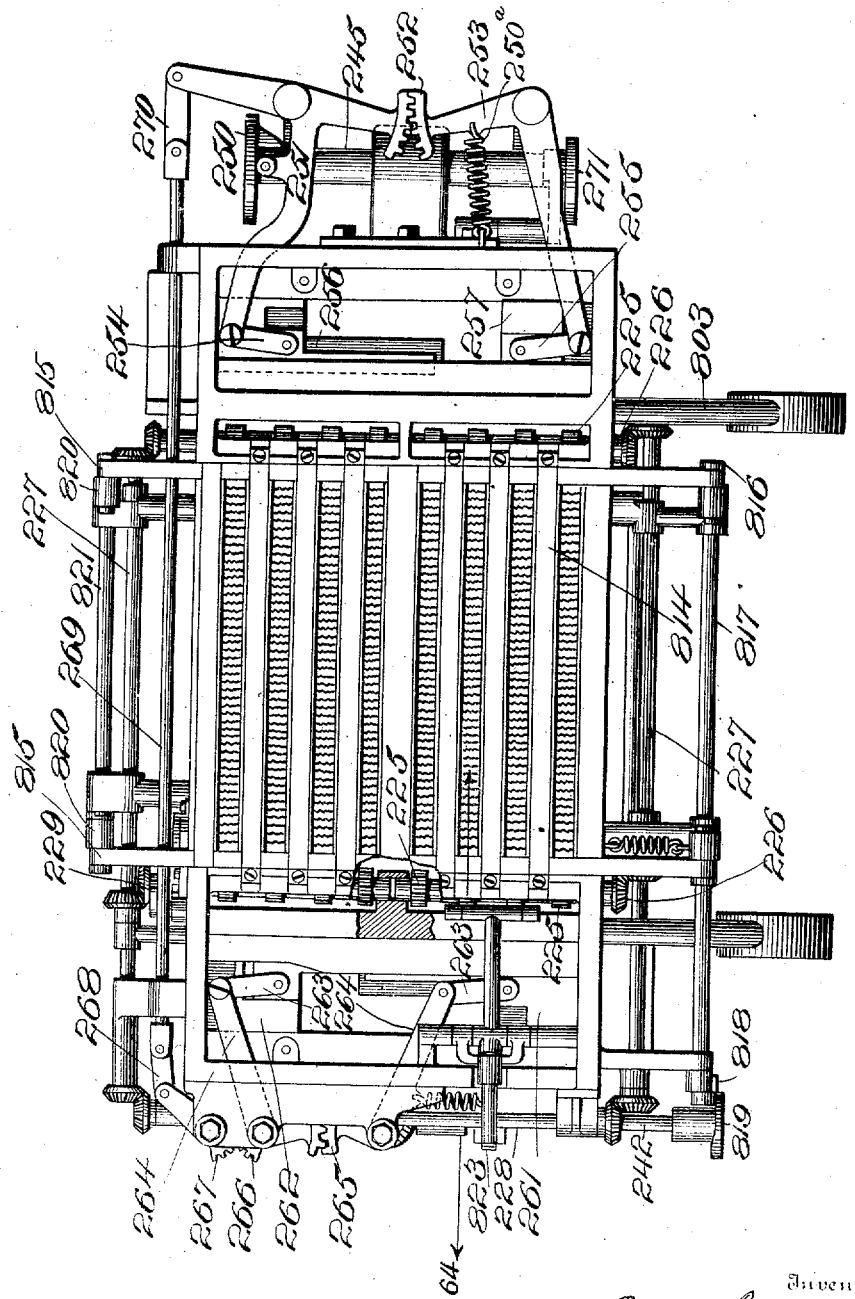

E. LAWRENZ.
TYPOGRAPHIC MACHINE.
APPLICATION FILED MAR. 14, 1904.
1,017,771.
Patented Feb. 20, 1912.
48 SHEETS—SHEET 18.
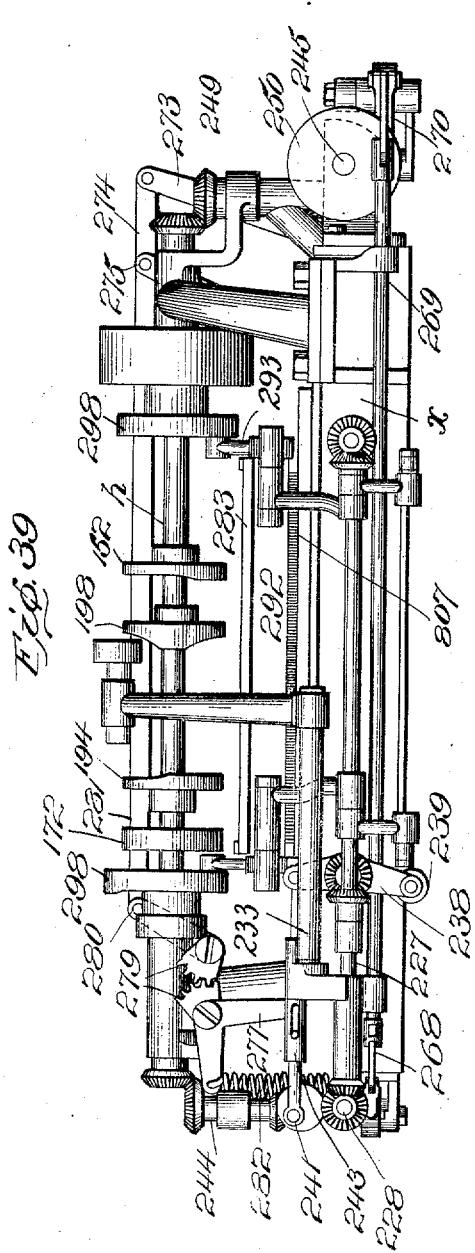
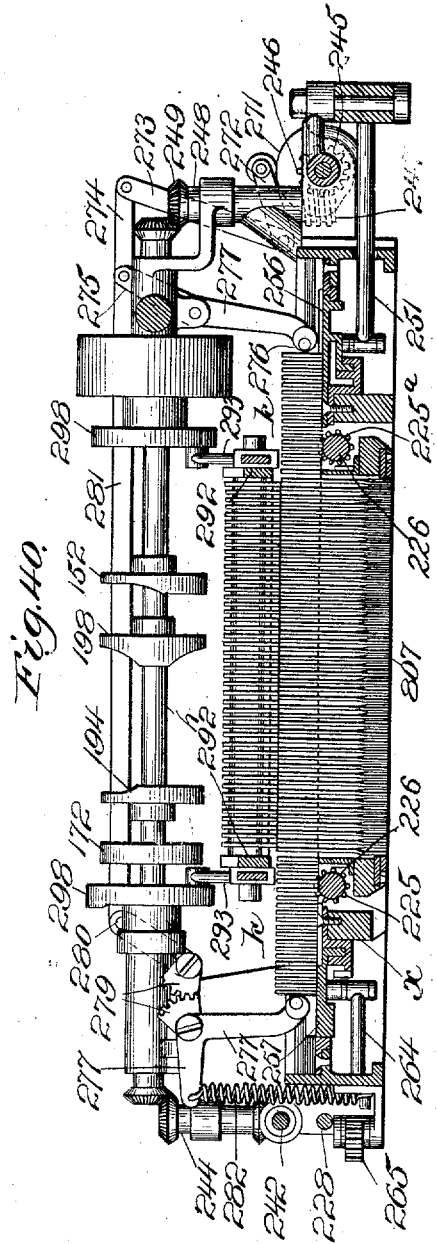

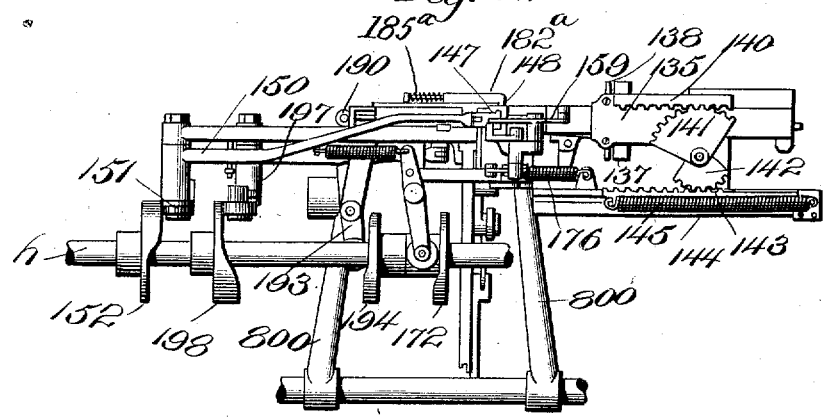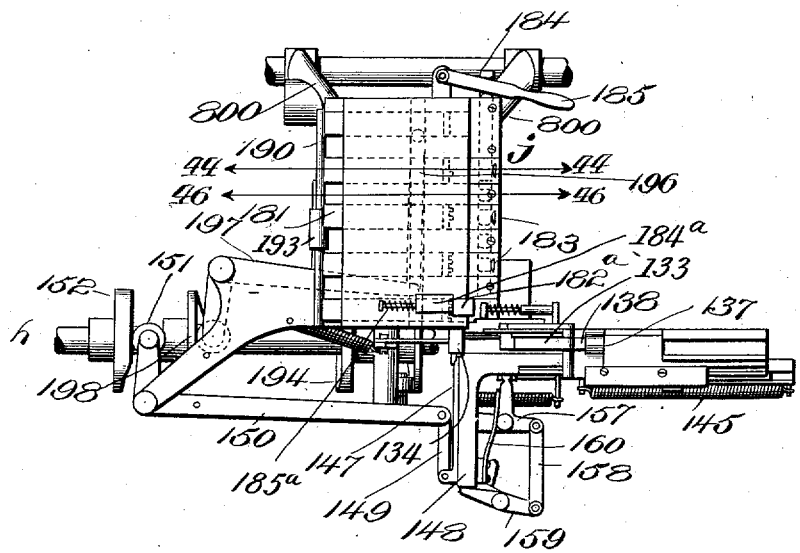

E. LAWRENZ.
TYPOGRAPHIC MACHINE.
APPLICATION FILED MAR. 14, 1904.
1,017,771.
Patented Feb. 20, 1912.
48 SHEETS—SHEET 20.
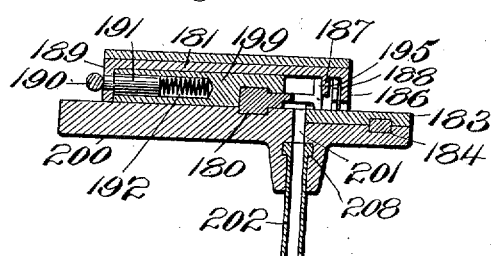
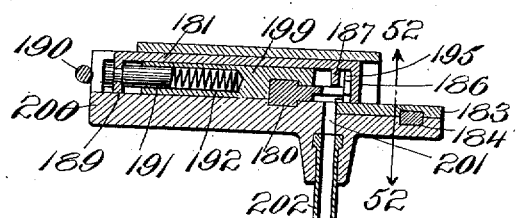
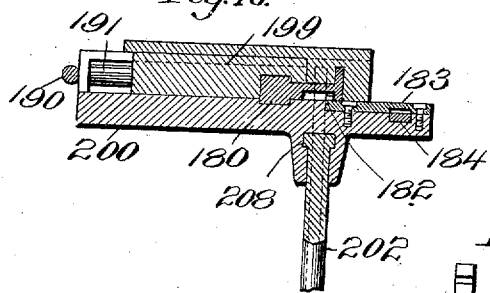
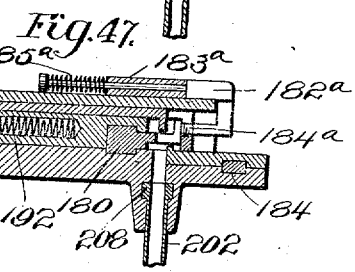
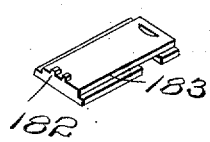
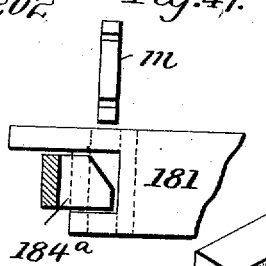
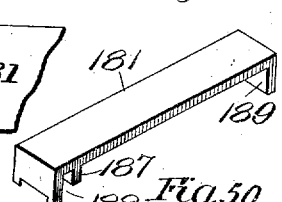
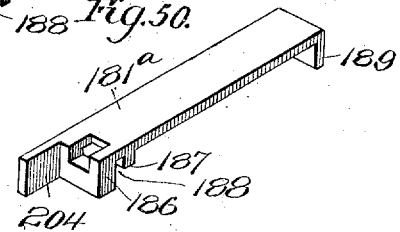
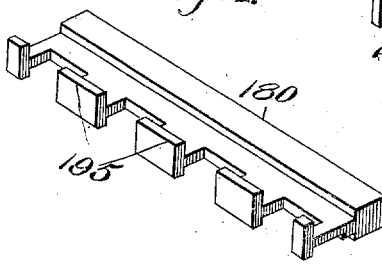
Witnesses
J. G. Hinkel
C. W. Clement
Inventor
Emil Lawrenz
By
J. Watson
Attorney E. LAWRENZ.
TYPOGRAPHIC MACHINE.
APPLICATION FILED MAR. 14, 1904.
1,017,771.
Patented Feb. 20, 1912.
48 SHEETS—SHEET 21.
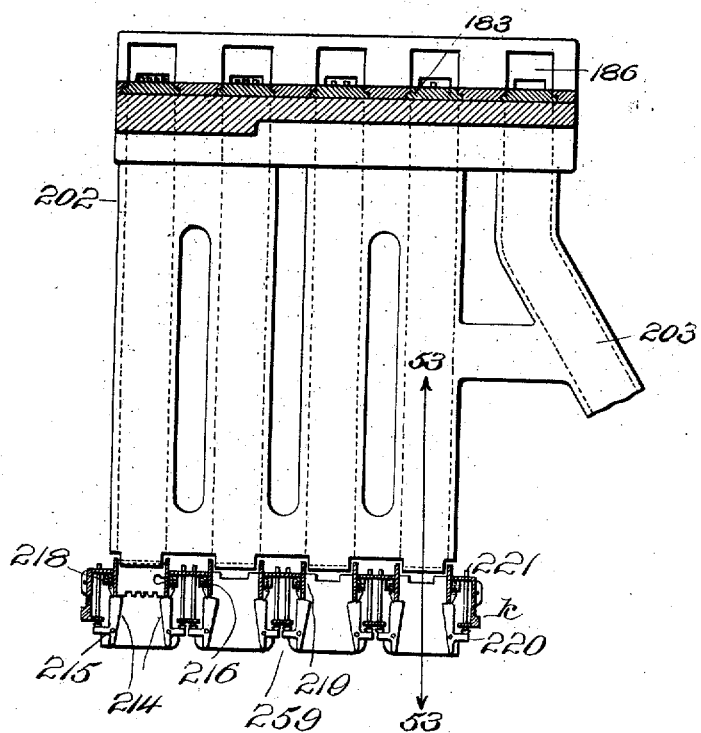
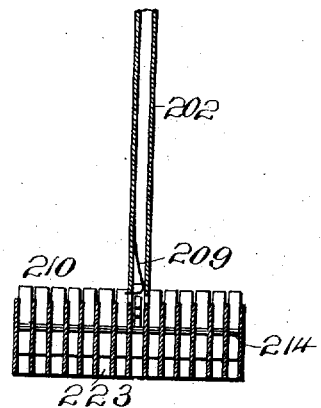
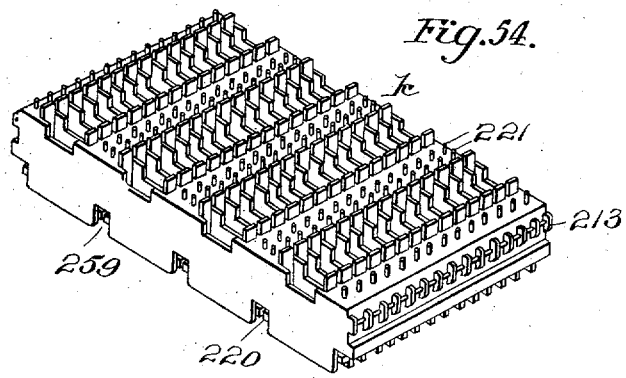
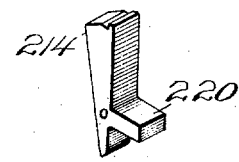

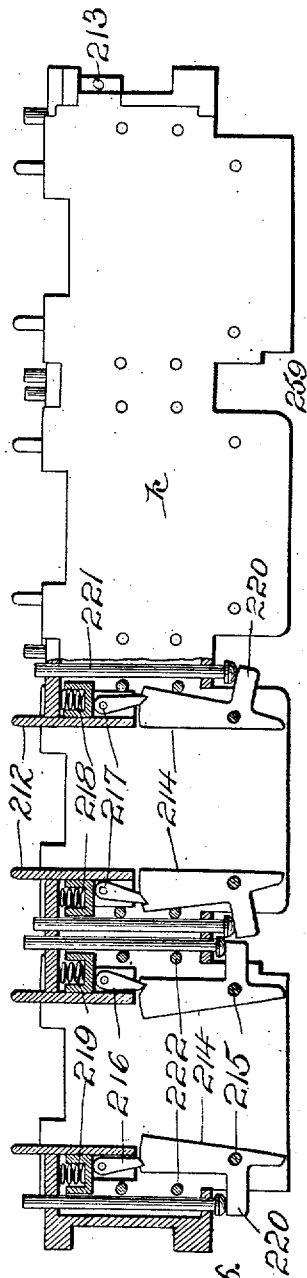
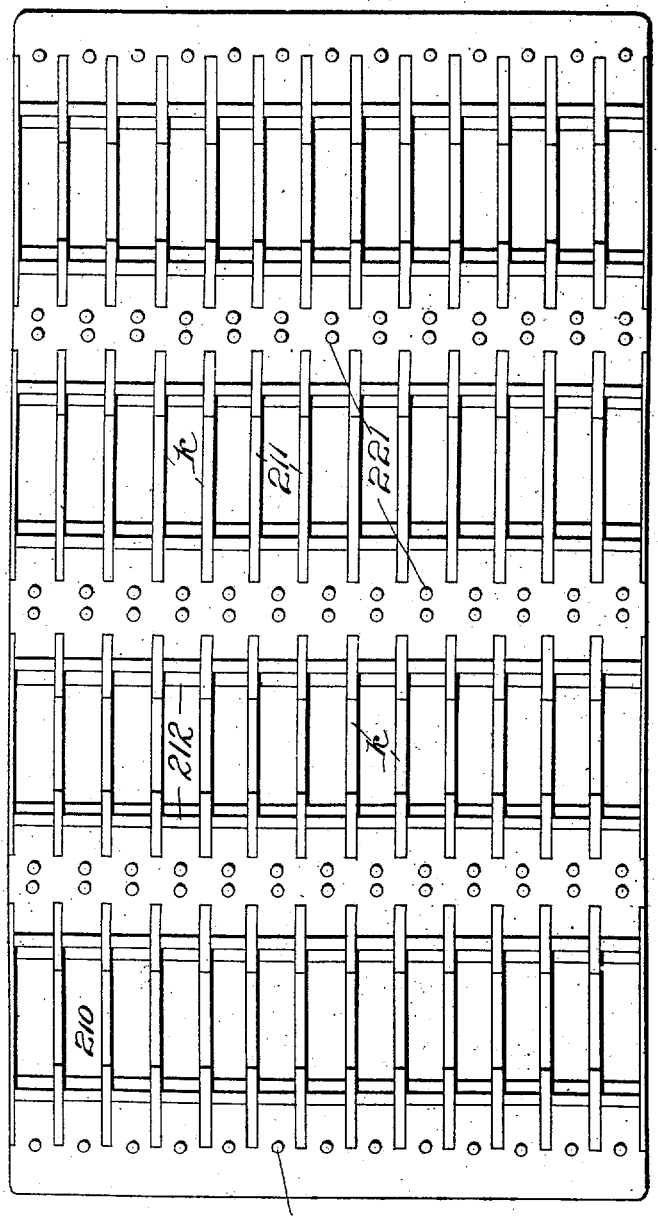

E. LAWRENZ.
TYPOGRAPHIC MACHINE.
APPLICATION FILED MAR. 14, 1904.

1,017,771.

Patented Feb. 20, 1912.
48 SHEETS—SHEET 23.

Witnesses
J. G. Hinkel
C. W. Clement

Inventor
Emil Lawrenz
By
J. H. Watson
Attorney

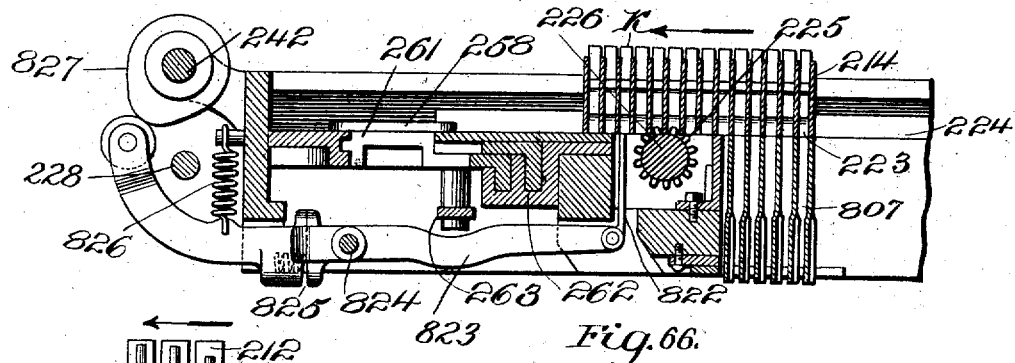
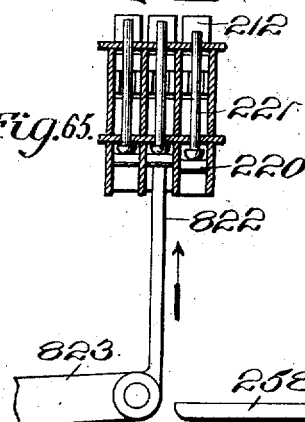
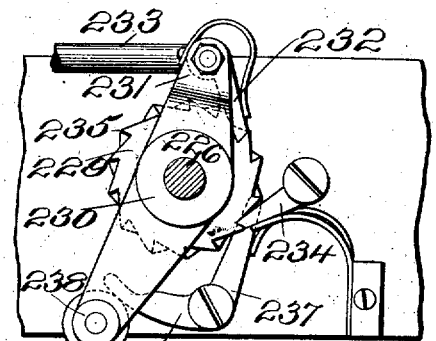
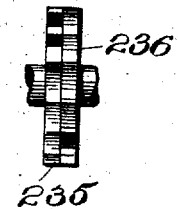
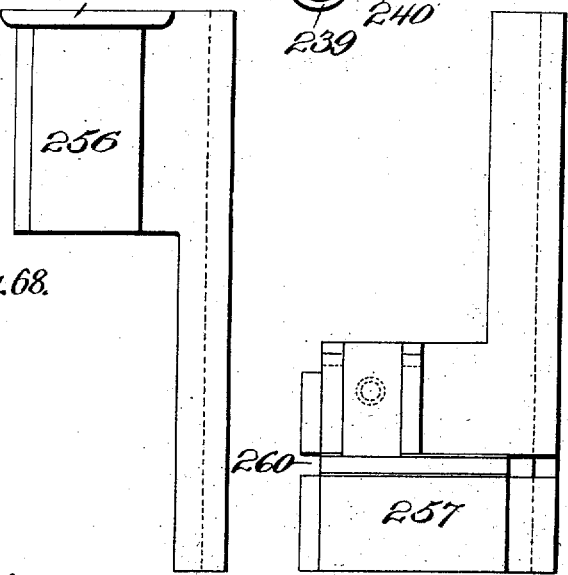

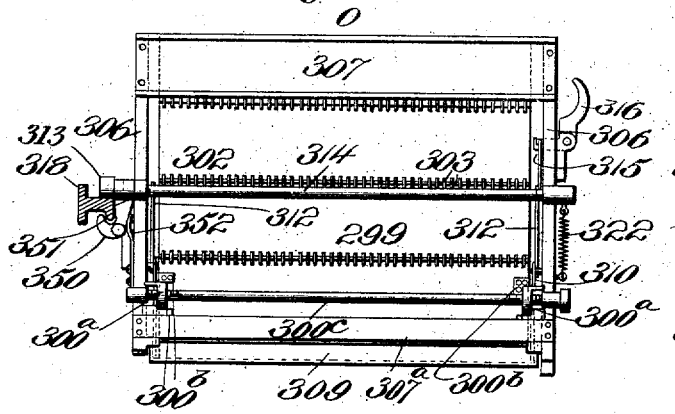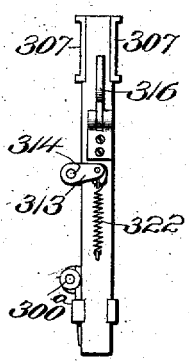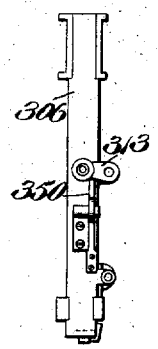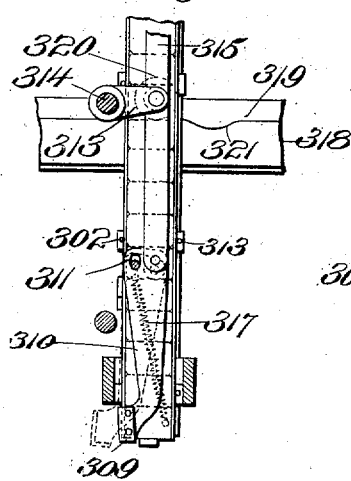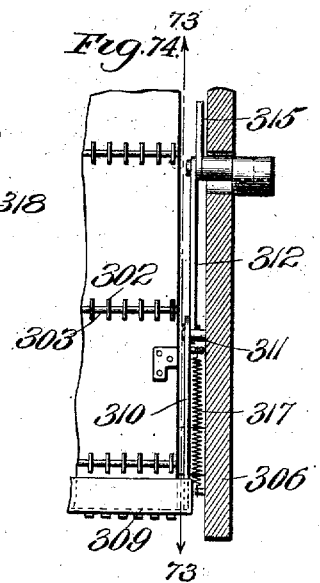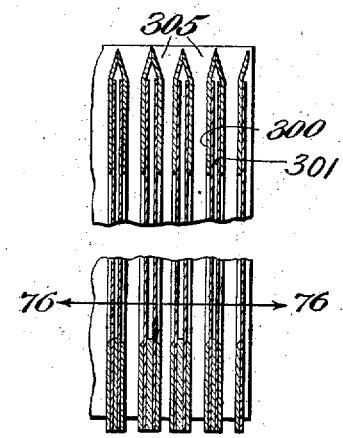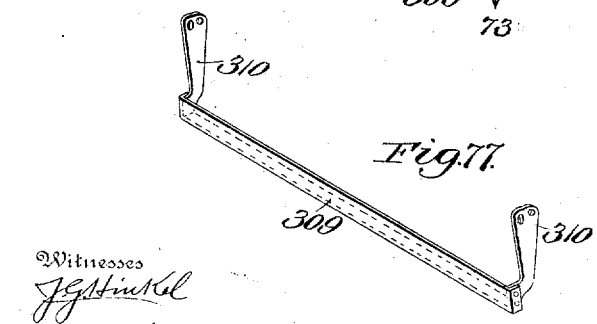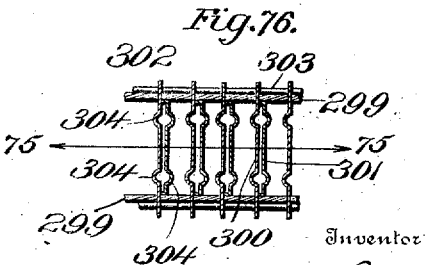

E. LAWRENZ.
TYPOGRAPHIC MACHINE.
APPLICATION FILED MAR. 14, 1904.
1,017,771.
Patented Feb. 20, 1912.
48 SHEETS—SHEET 26.
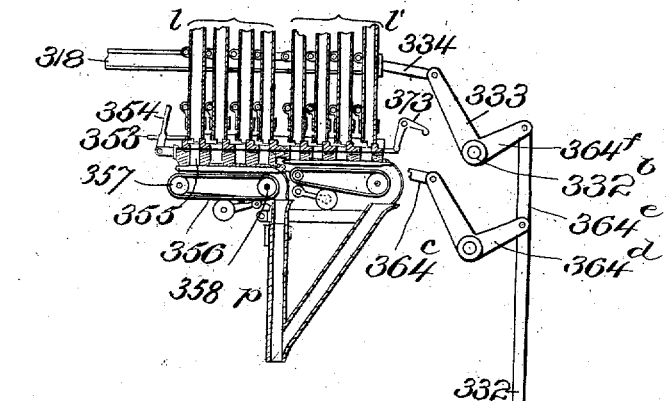
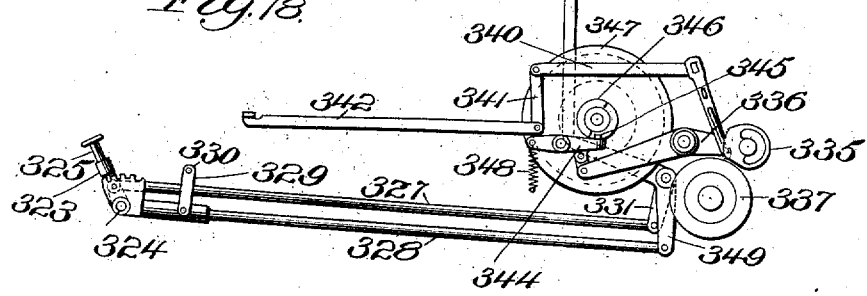
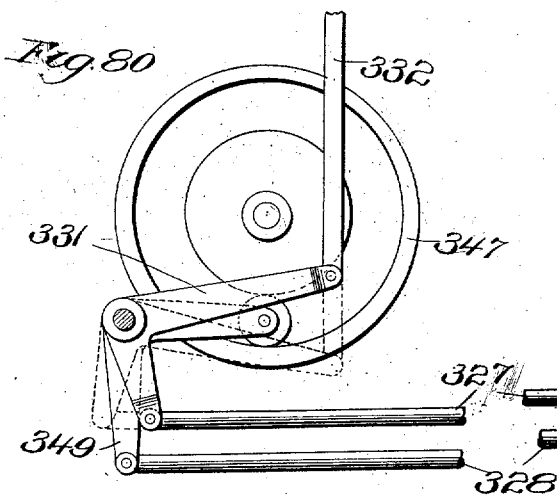
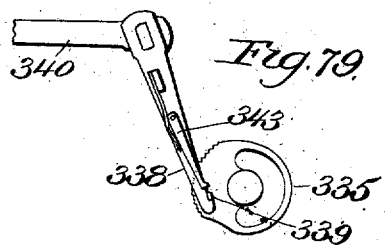

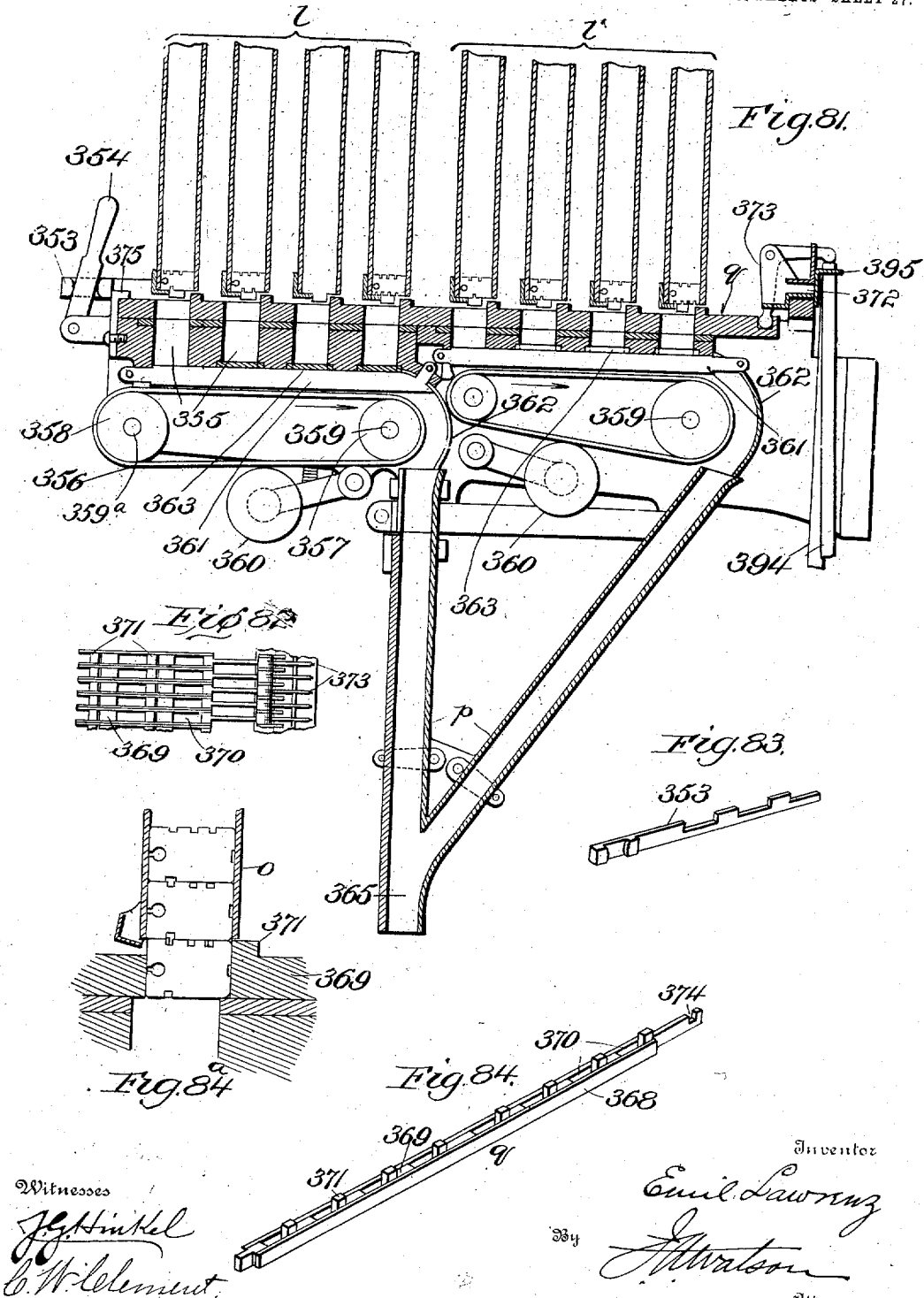

E. LAWRENZ.
TYPOGRAPHIC MACHINE.
APPLICATION FILED MAR. 14, 1904.

1,017,771.

Patented Feb. 20, 1912.
48 SHEETS—SHEET 28.

Witnesses
J. G. Hinkel
C. W. Clement

Inventor
Emil Lawrenz
By J. H. Watson
Attorney

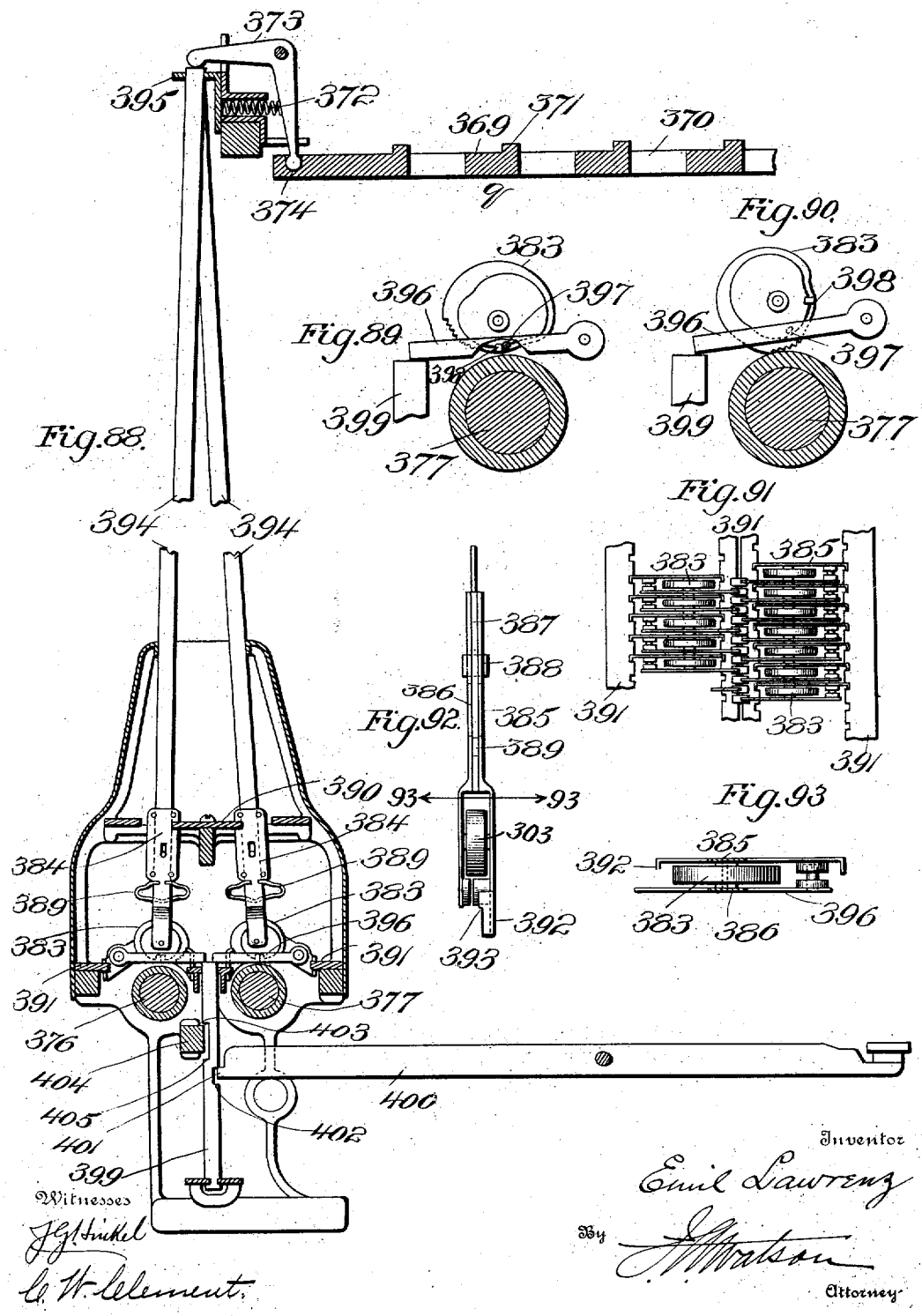

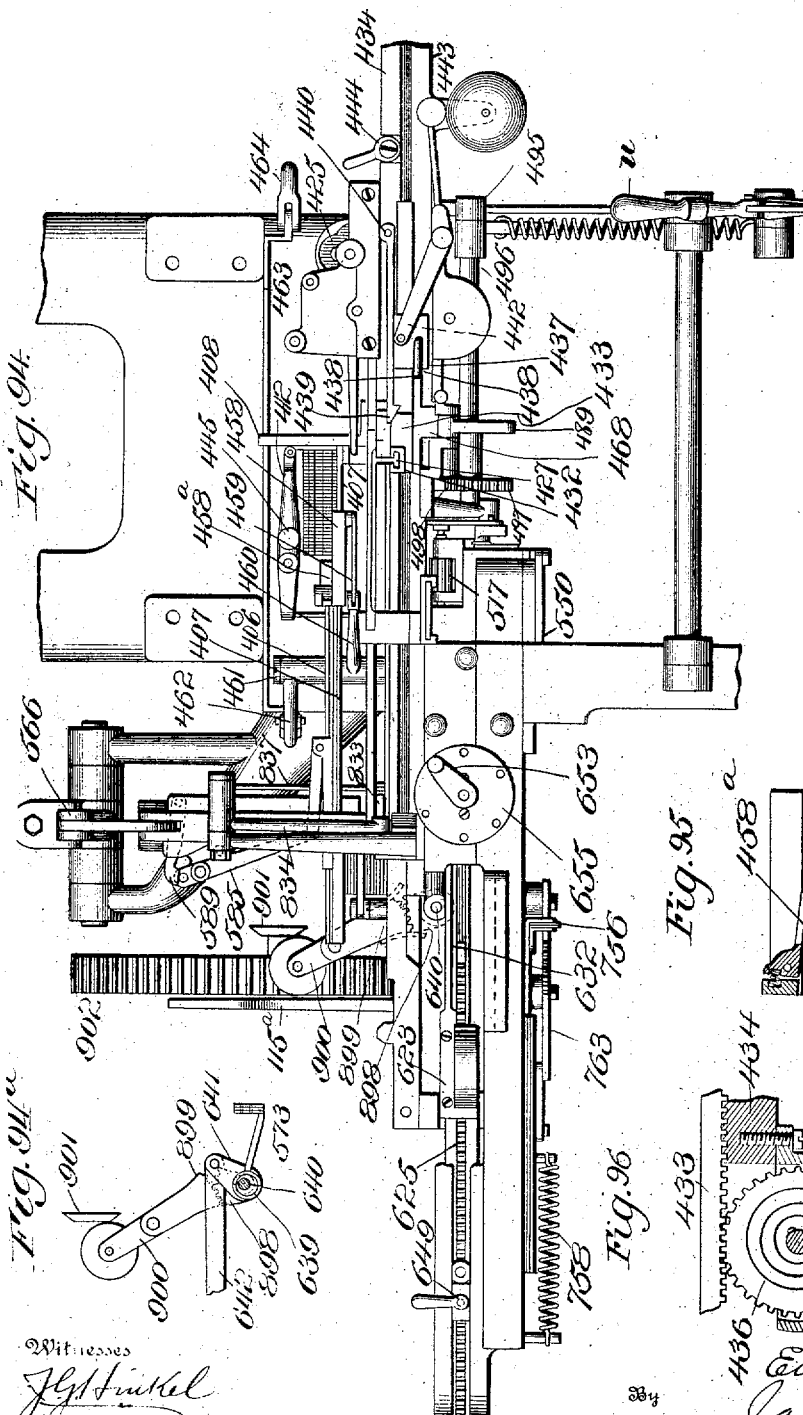

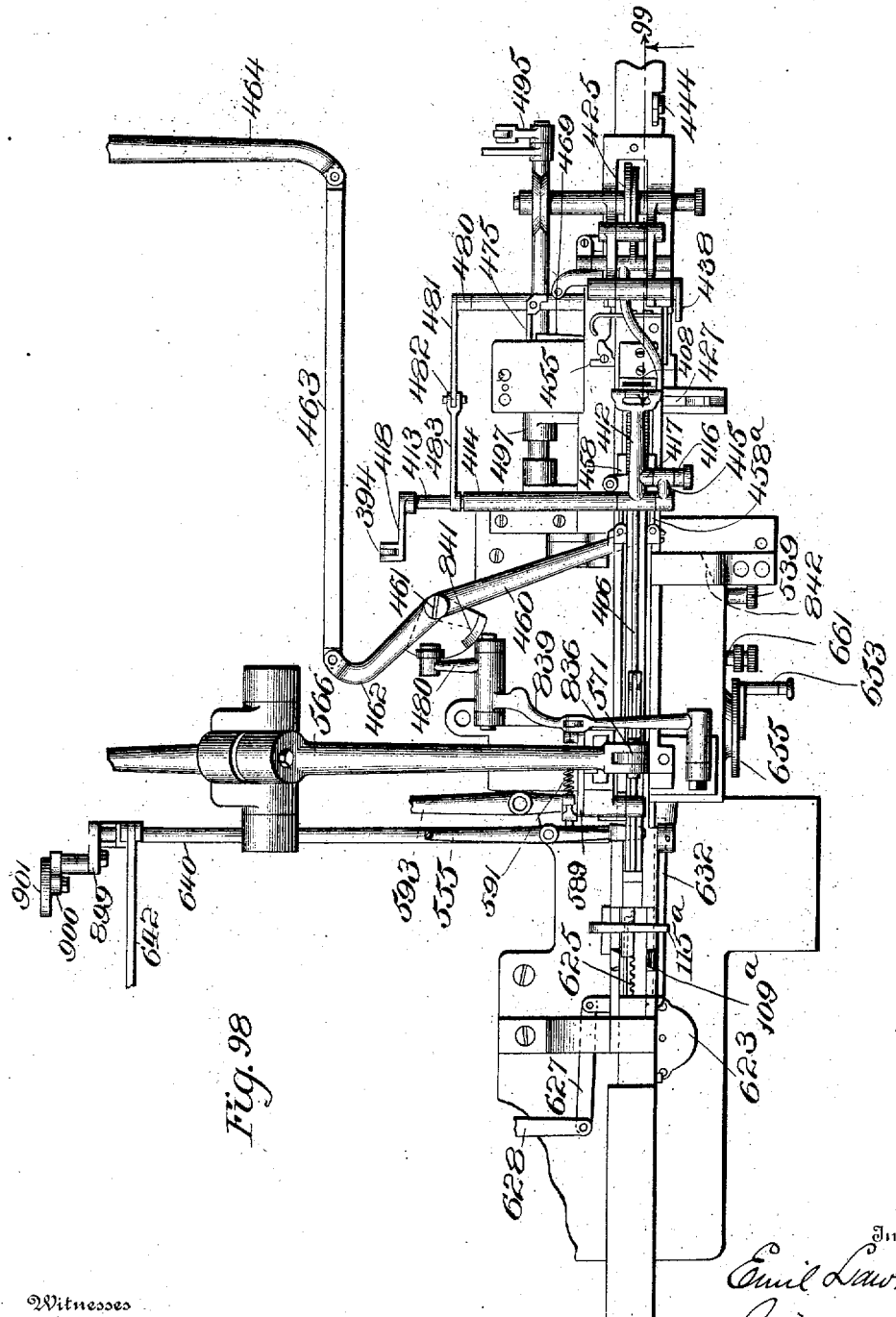

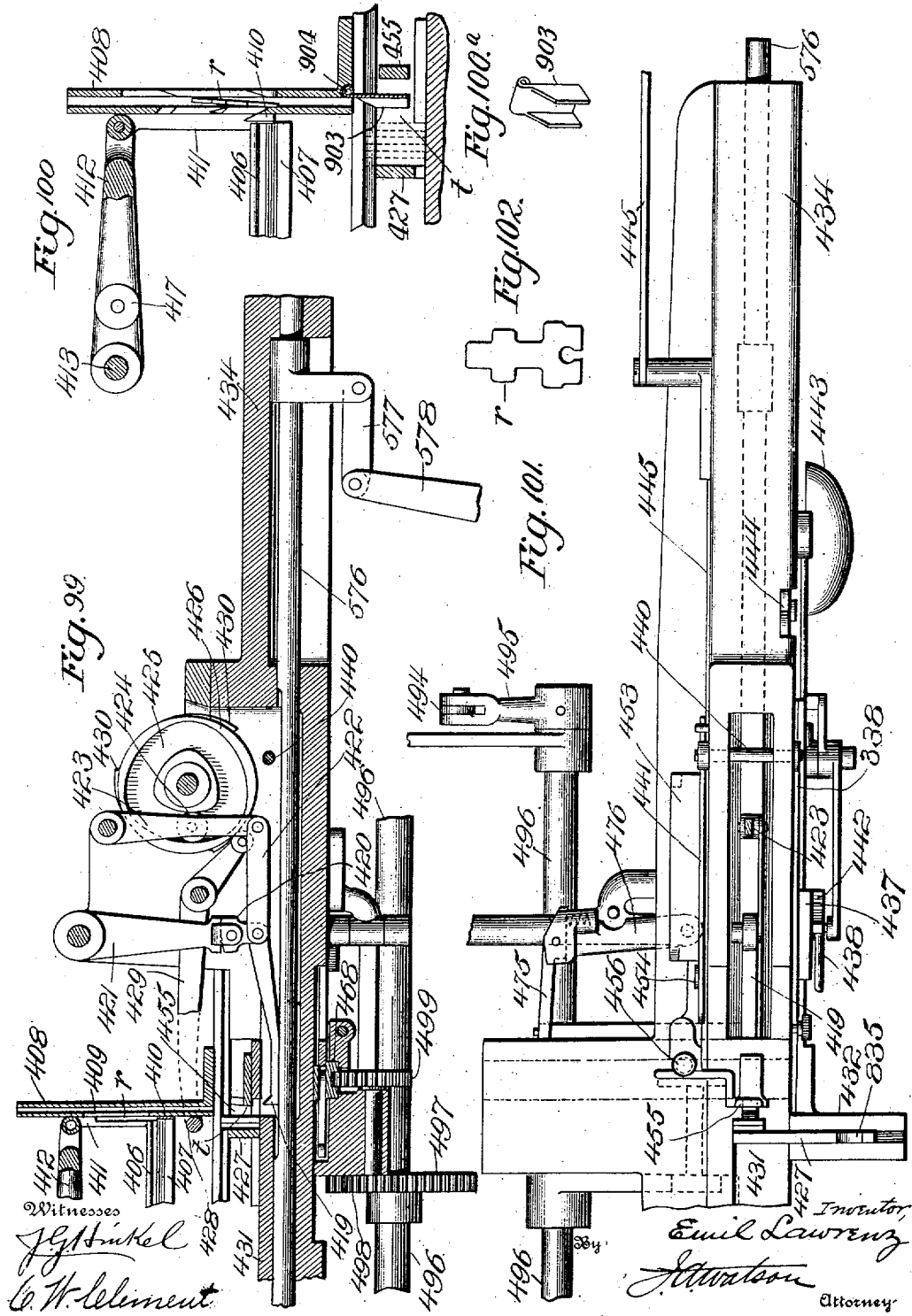

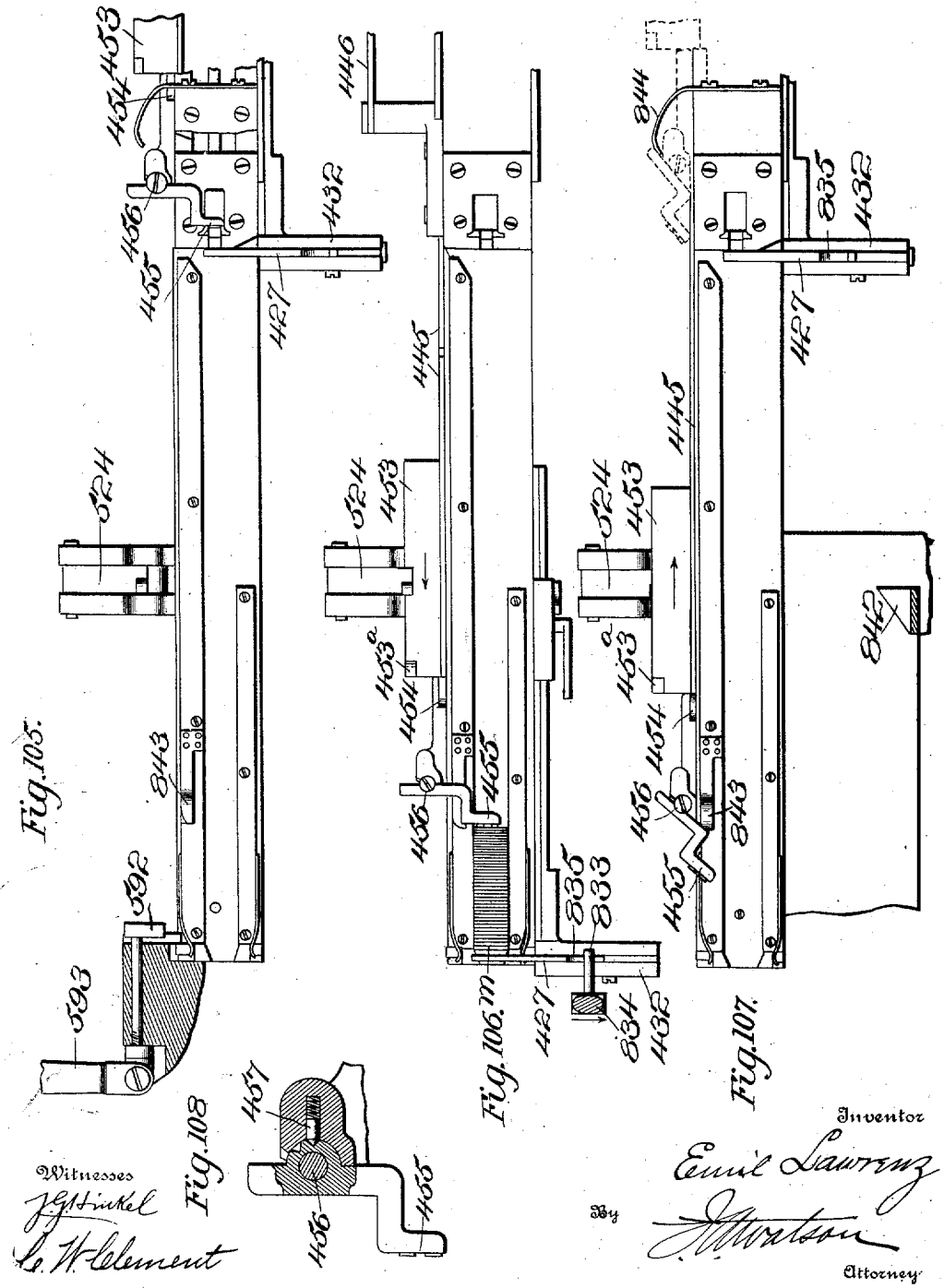

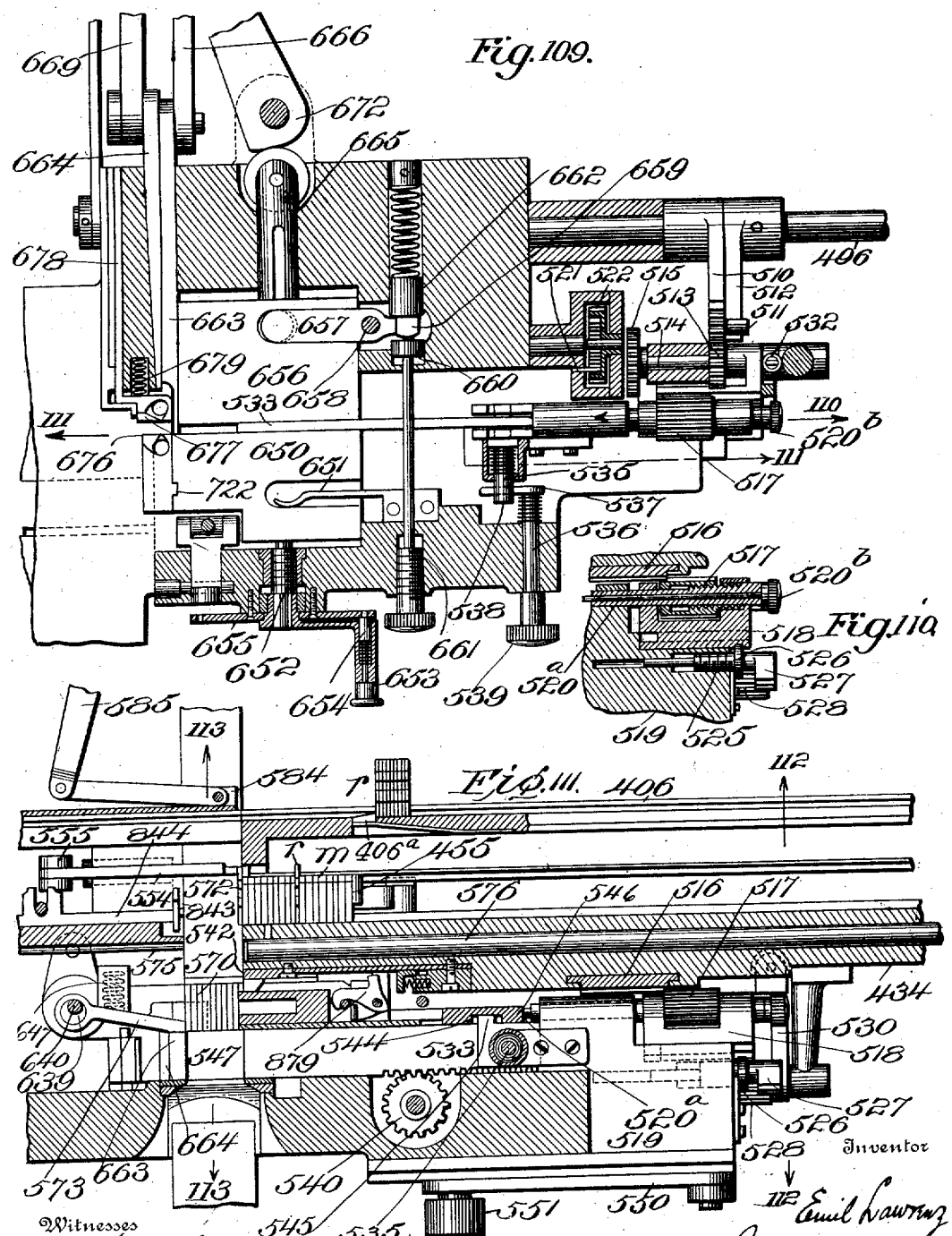

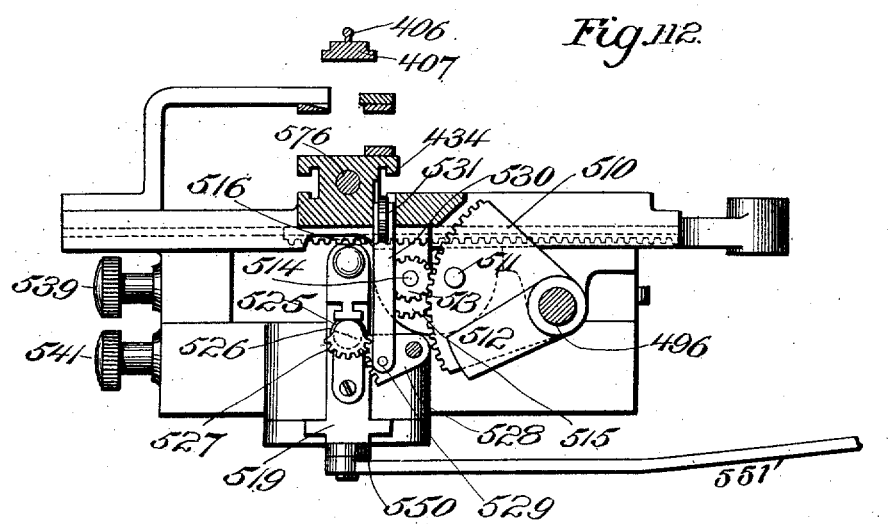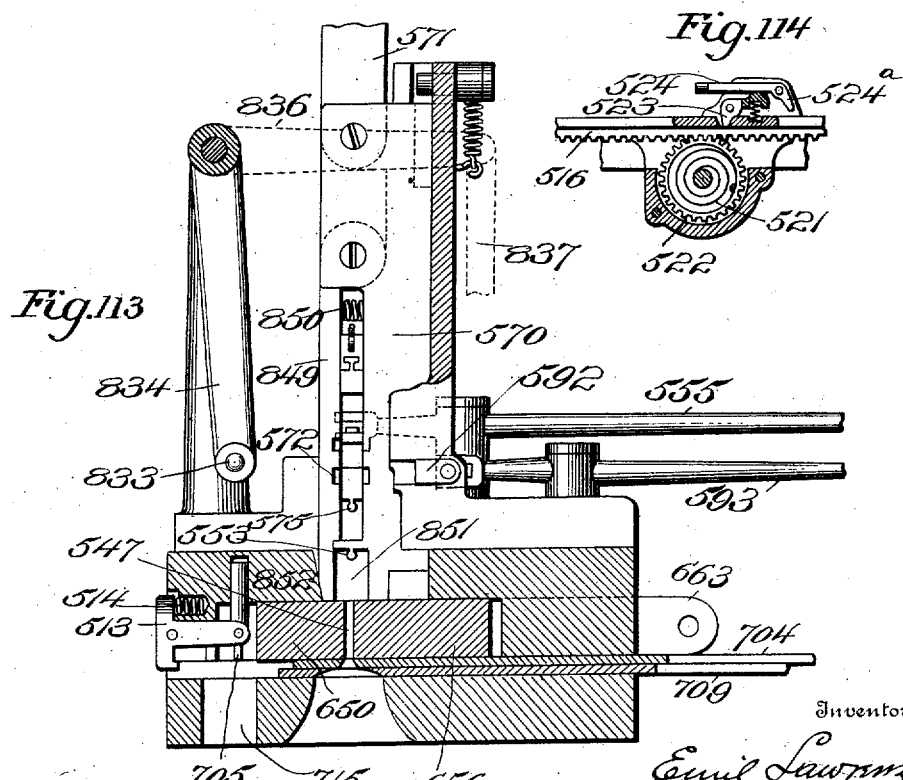

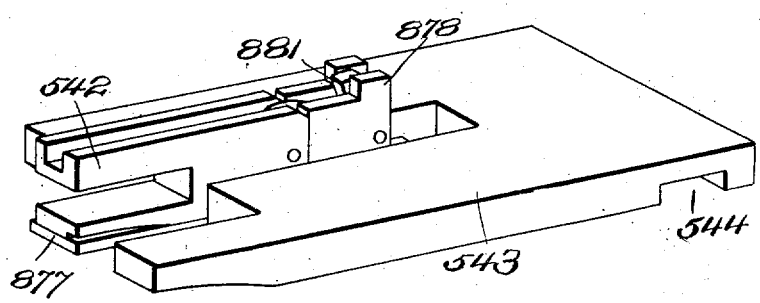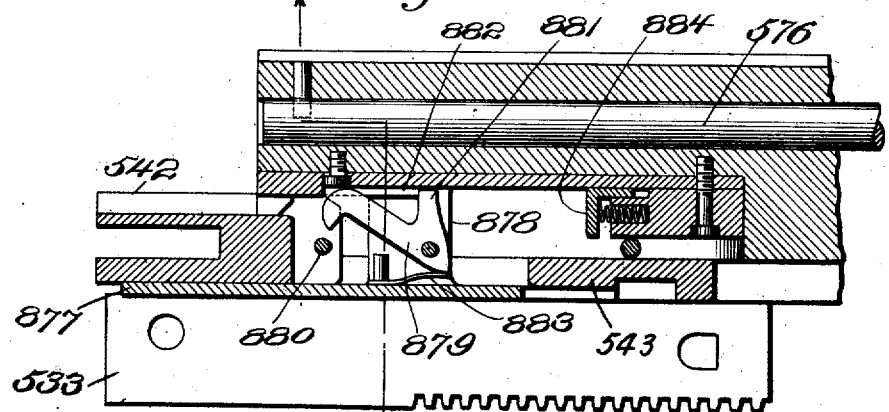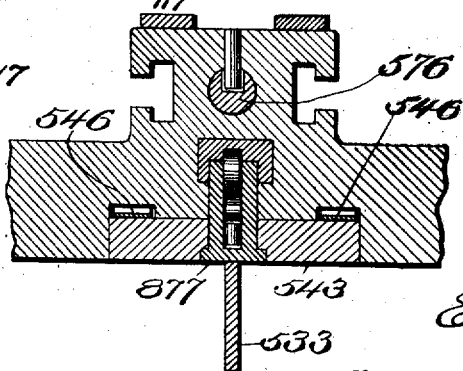

E. LAWRENZ.
TYPOGRAPHIC MACHINE.
APPLICATION FILED MAR. 14, 1904.
1,017,771.
Patented Feb. 20, 1912.
48 SHEETS—SHEET 38.
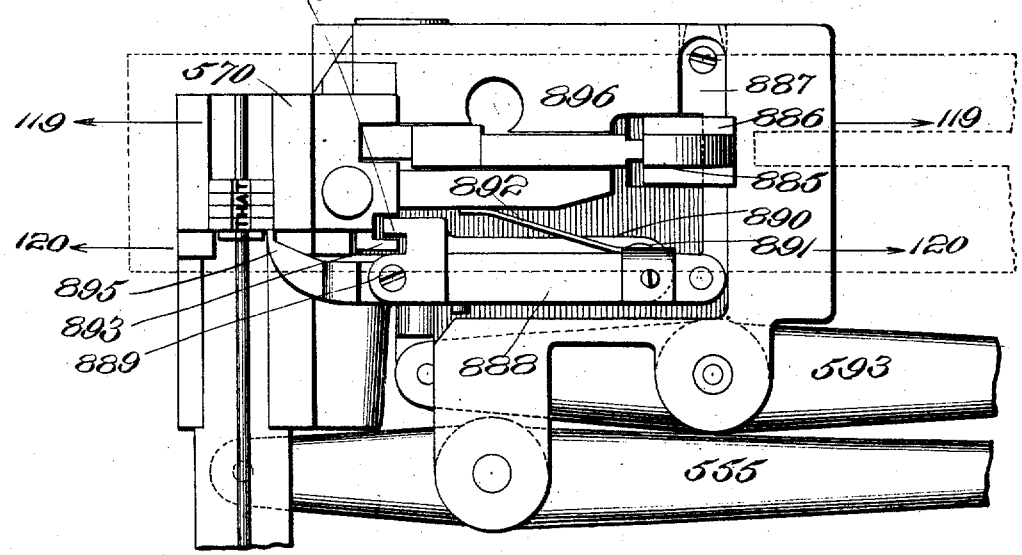
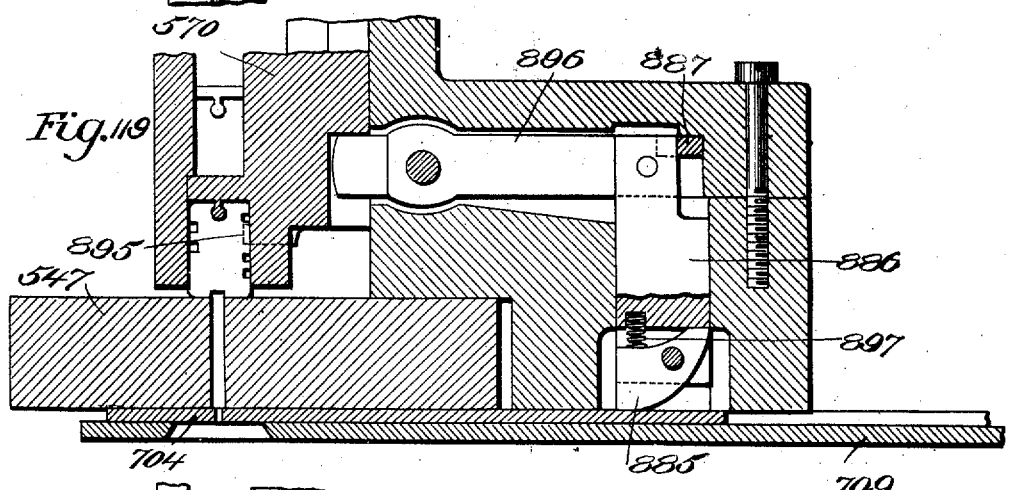
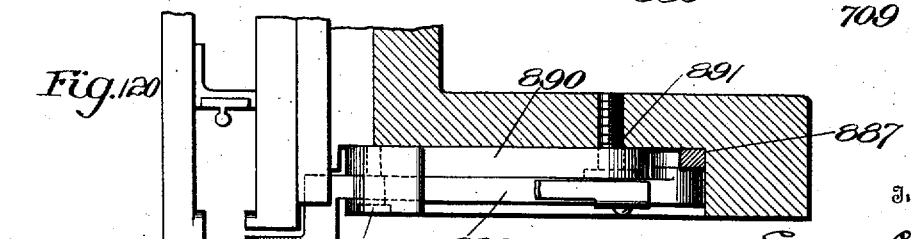

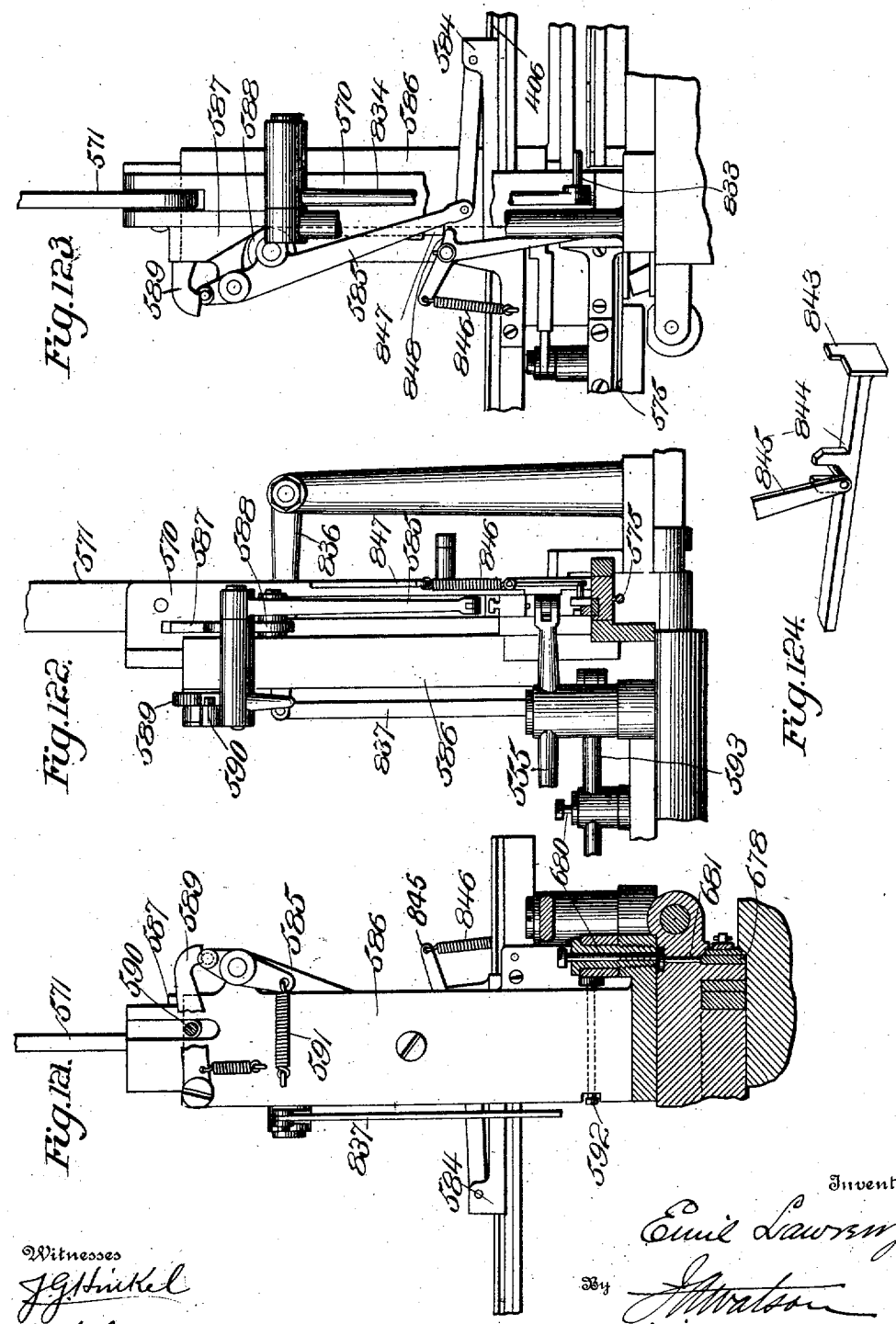

E. LAWRENZ.
TYPOGRAPHIC MACHINE.
APPLICATION FILED MAR. 14, 1904.

1,017,771.

Patented Feb. 20, 1912.
48 SHEETS—SHEET 40.

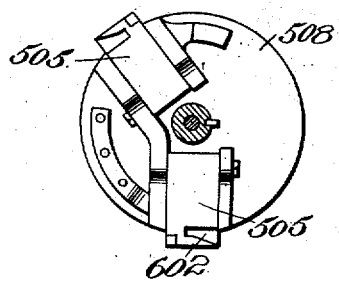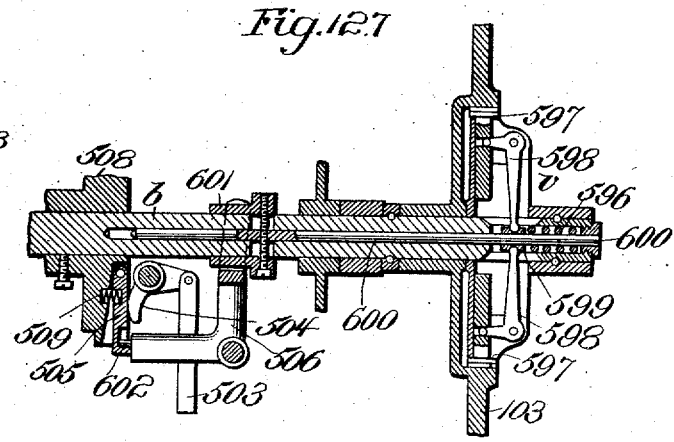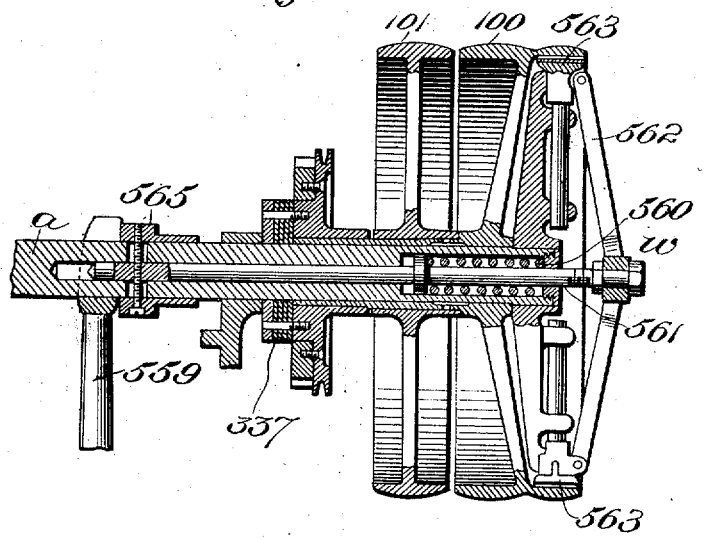

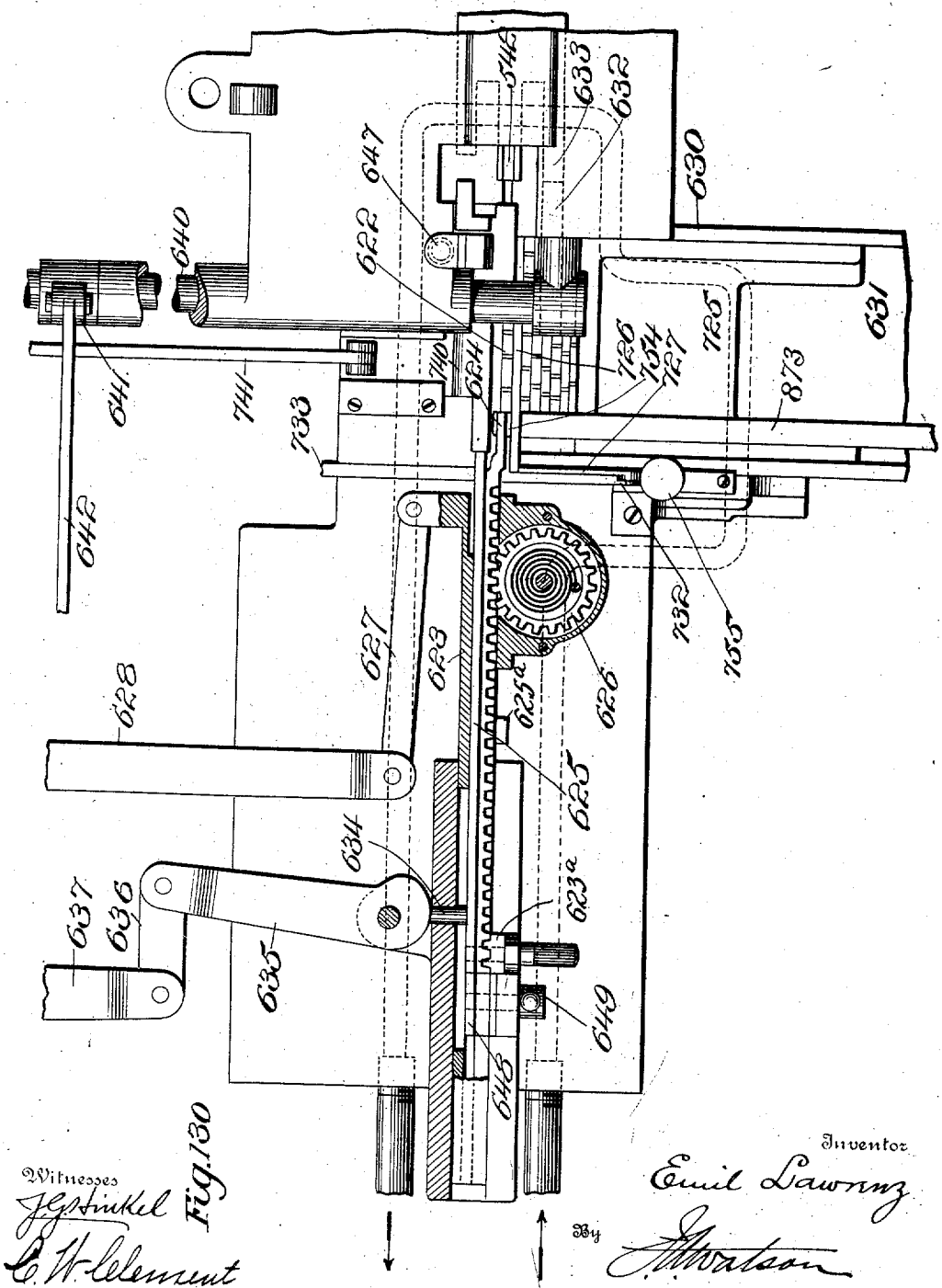

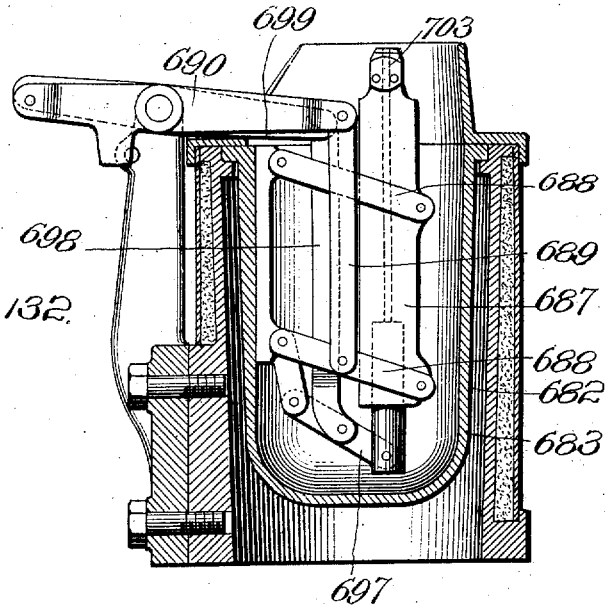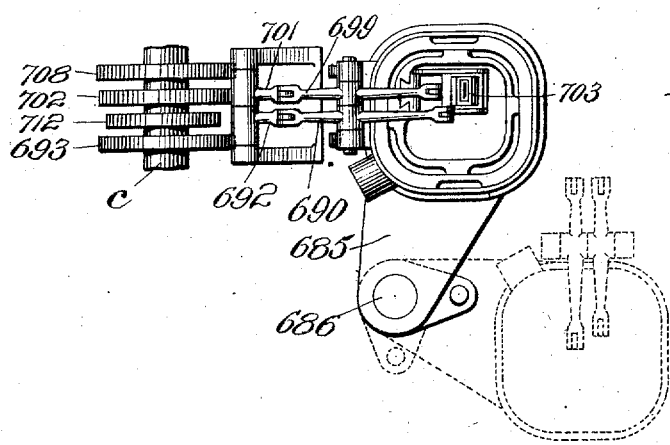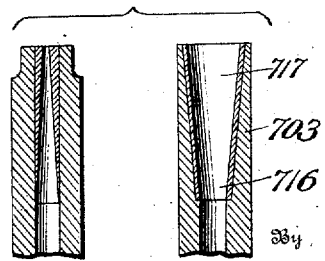

E. LAWRENZ.
TYPOGRAPHIC MACHINE.
APPLICATION FILED MAR. 14, 1904.

1,017,771.  Patented Feb. 20, 1912.
48 SHEETS—SHEET 44.

E. LAWRENZ.
TYPOGRAPHIC MACHINE.
APPLICATION FILED MAR. 14, 1904.

1,017,771.

Patented Feb. 20, 1912.
48 SHEETS—SHEET 45.

Witnesses
J. G. Hinkel
C. W. Clement

Inventor
Emil Lawrenz
By J. Watson

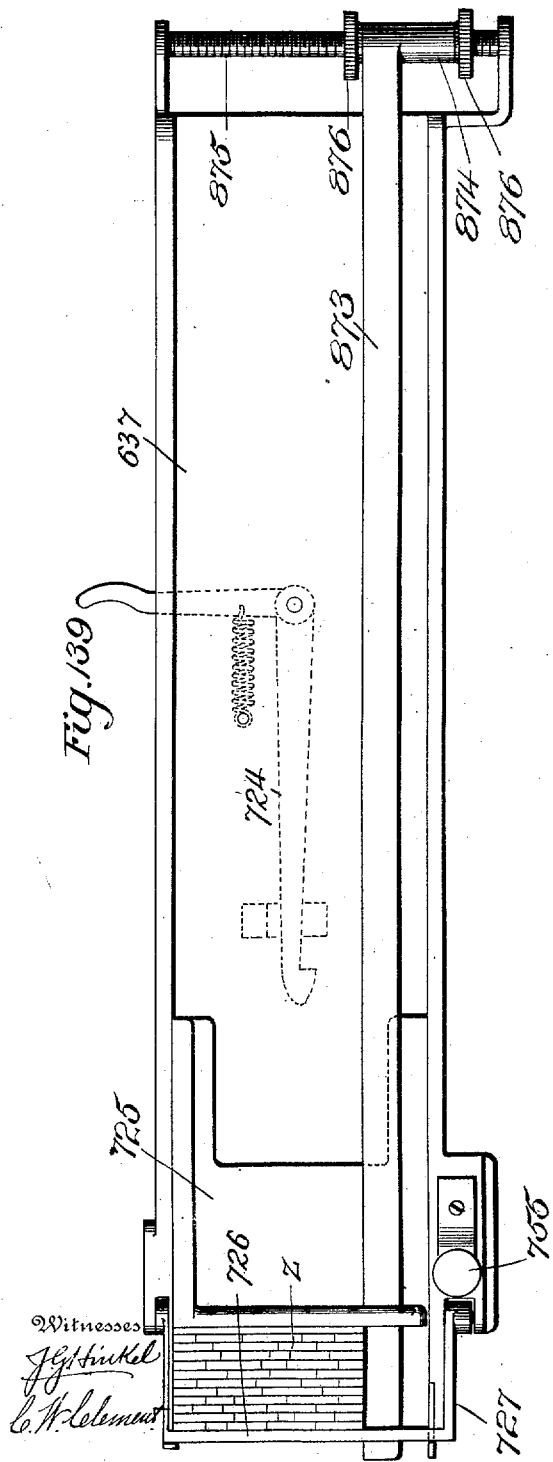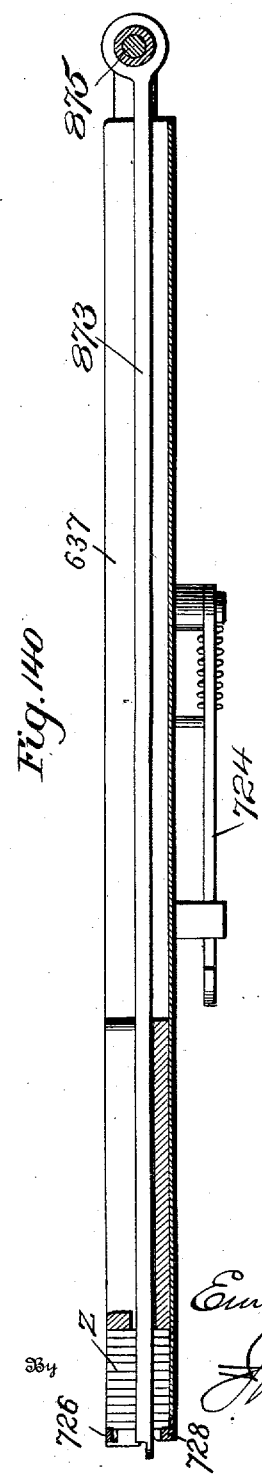

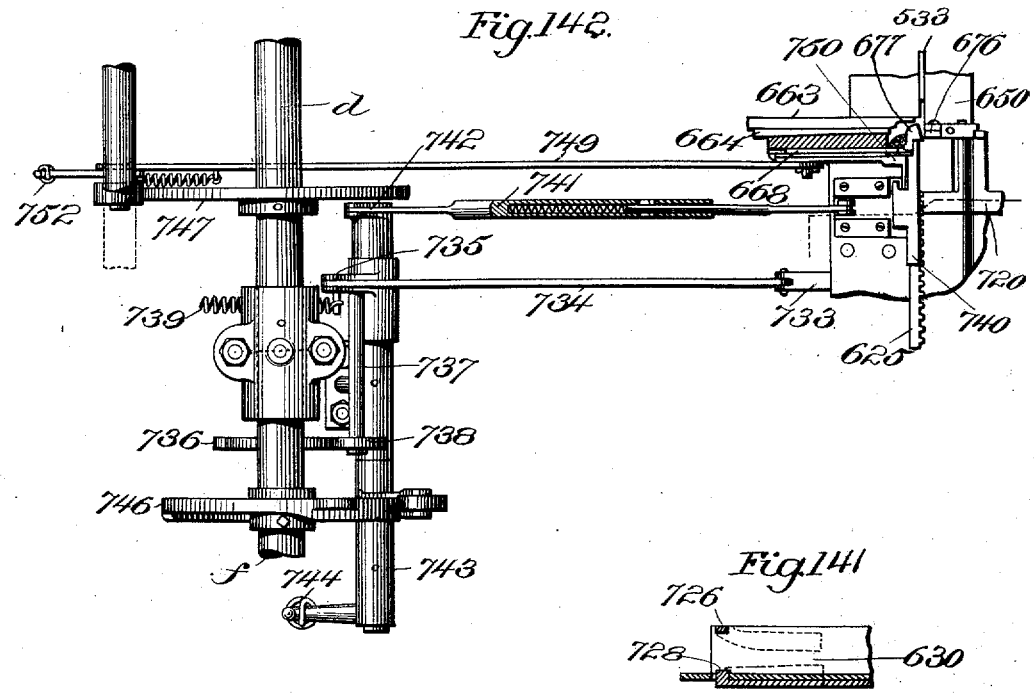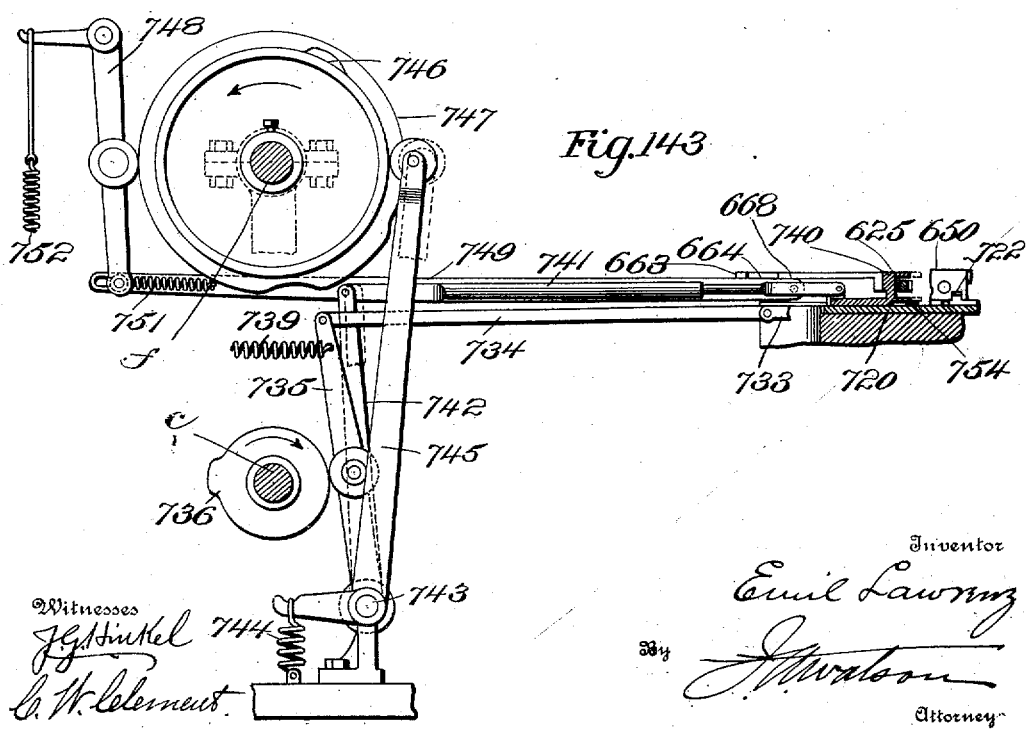

E. LAWRENZ.
TYPOGRAPHIC MACHINE.
APPLICATION FILED MAR. 14, 1904.
1,017,771.
Patented Feb. 20, 1912.
48 SHEETS—SHEET 48.
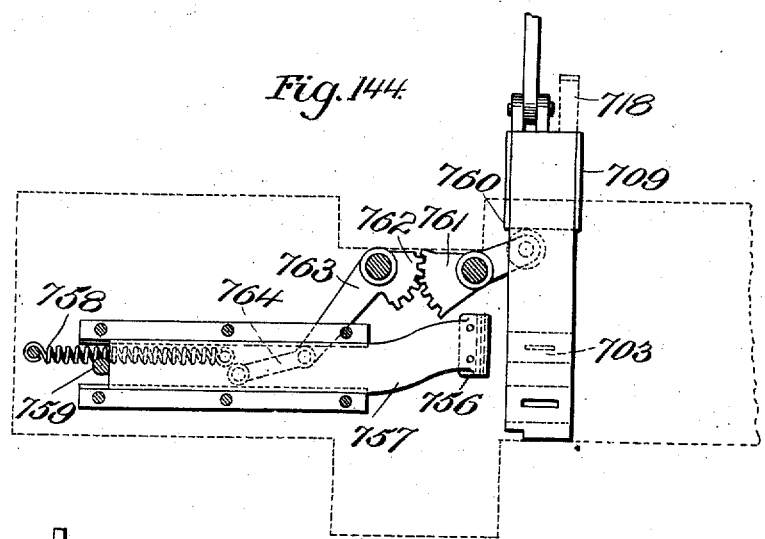
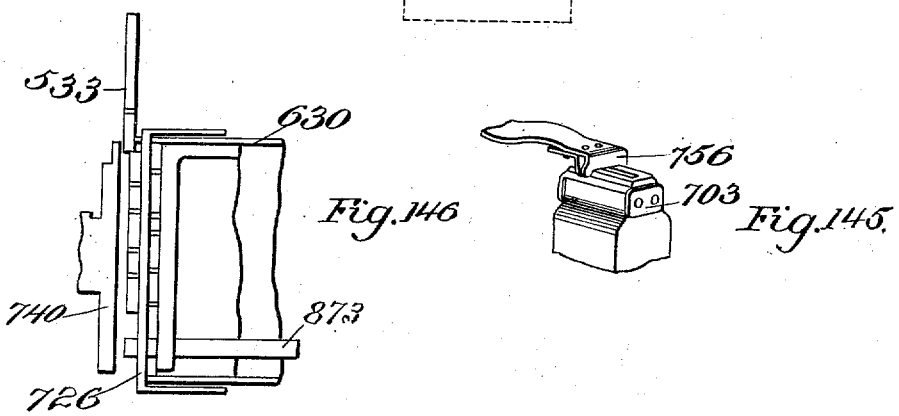
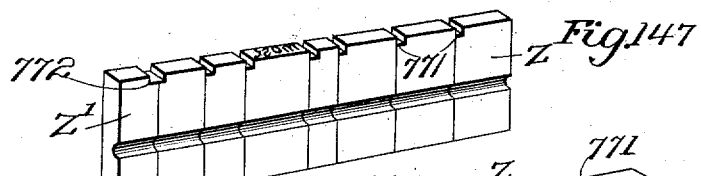
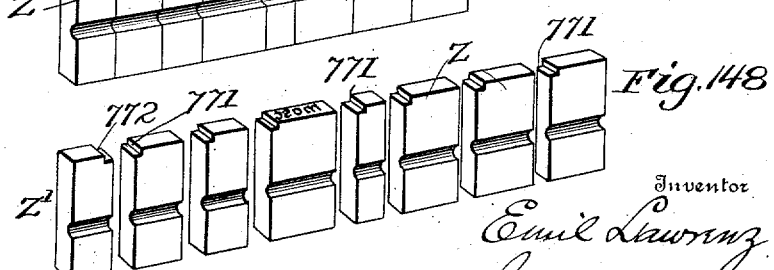

UNITED STATES PATENT OFFICE.

EMIL LAWRENZ, OF BALTIMORE, MARYLAND, ASSIGNOR, BY MESNE ASSIGNMENTS, TO MERGENTHALER LINOTYPE COMPANY, OF NEW YORK, N. Y., A CORPORATION OF NEW YORK.

TYPOGRAPHIC MACHINE.

1,017,771.  Specification of Letters Patent.  Patented Feb. 20, 1912.

Application filed March 14, 1904. Serial No. 198,119.

*To all whom it may concern:*

Be it known that I, EMIL LAWRENZ, a citizen of the United States, residing at Baltimore, in the State of Maryland, have invented certain new and useful Improvements in Typographic Machines, of which the following is a specification.

This invention relates to various improvements in typographic machines and particularly in machines for producing justified lines of logotypes.

In the machine embodying and illustrating my invention, which is described hereinafter, one or more fonts of circulating matrices are employed and mechanism is provided for assembling these matrices in lines with suitable separators to separate the word groups of matrices. The assembled lines of matrices are automatically measured and a mold is adjusted to cast from each word-group of matrices a logotype having a suitable justifying space, the adjustment of the mold for each logotype depending upon the aggregate width of the matrices in the word-group from which the logotype is to be cast and the "shortage" or deficiency in the line as determined by the measuring devices. There being one word more in a line than there are spaces the last logotype of each line is usually cast without a justifying space. On this last logotype a "correcting" space may be cast if necessary to accurately complete the justification of the line. The matrices are automatically transported from the casting mechanism back to their respective magazines and into position to be again assembled into lines.

In some of its broad features the present machine resembles the linotype machine, the matrices circulating from the magazine to the casting mechanism and again to the magazine.

Some of the features of the present invention are applicable to linotype and other typographical machines, while other features are peculiarly applicable to logotype machines.

Figure 3:
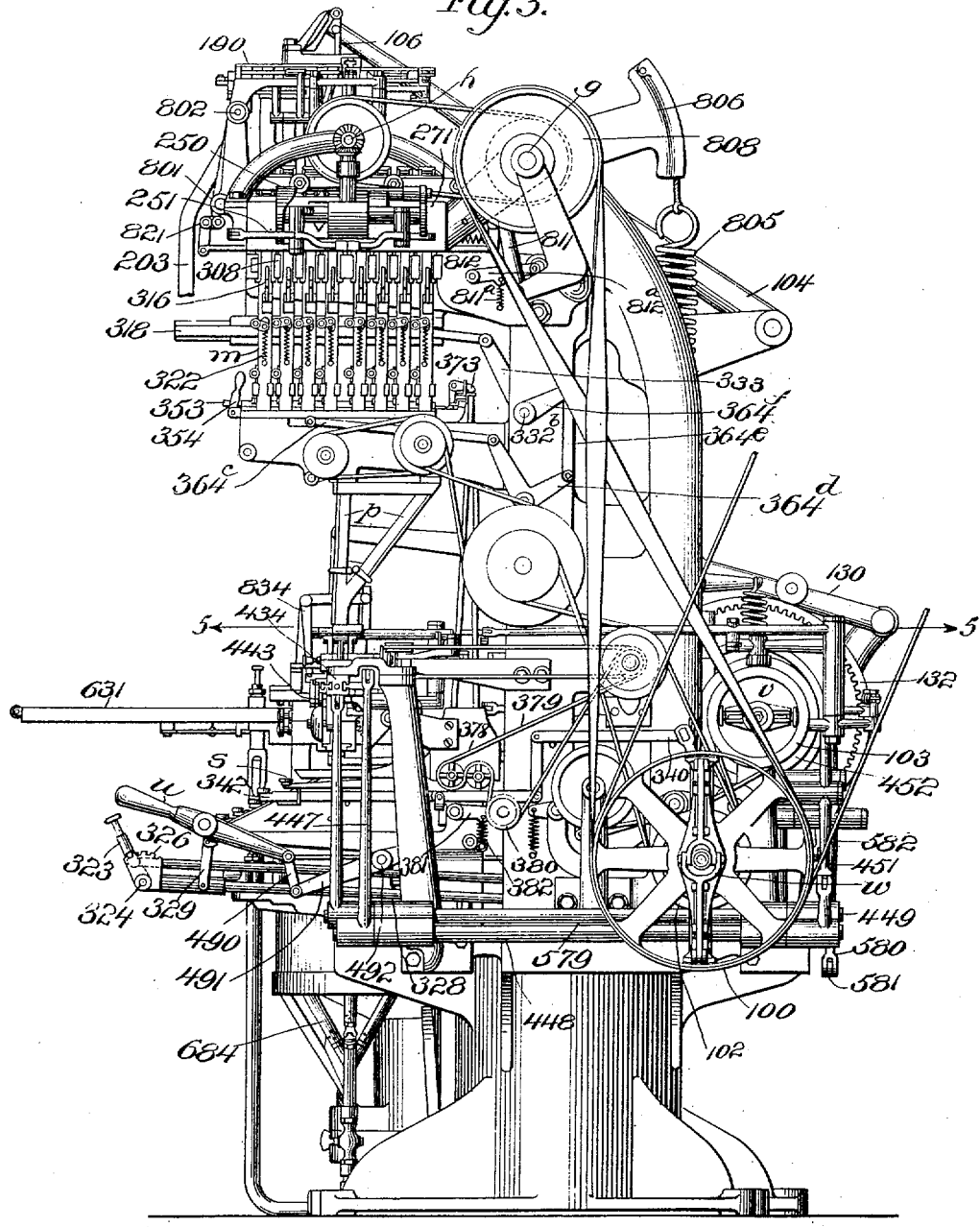
Figure 4:
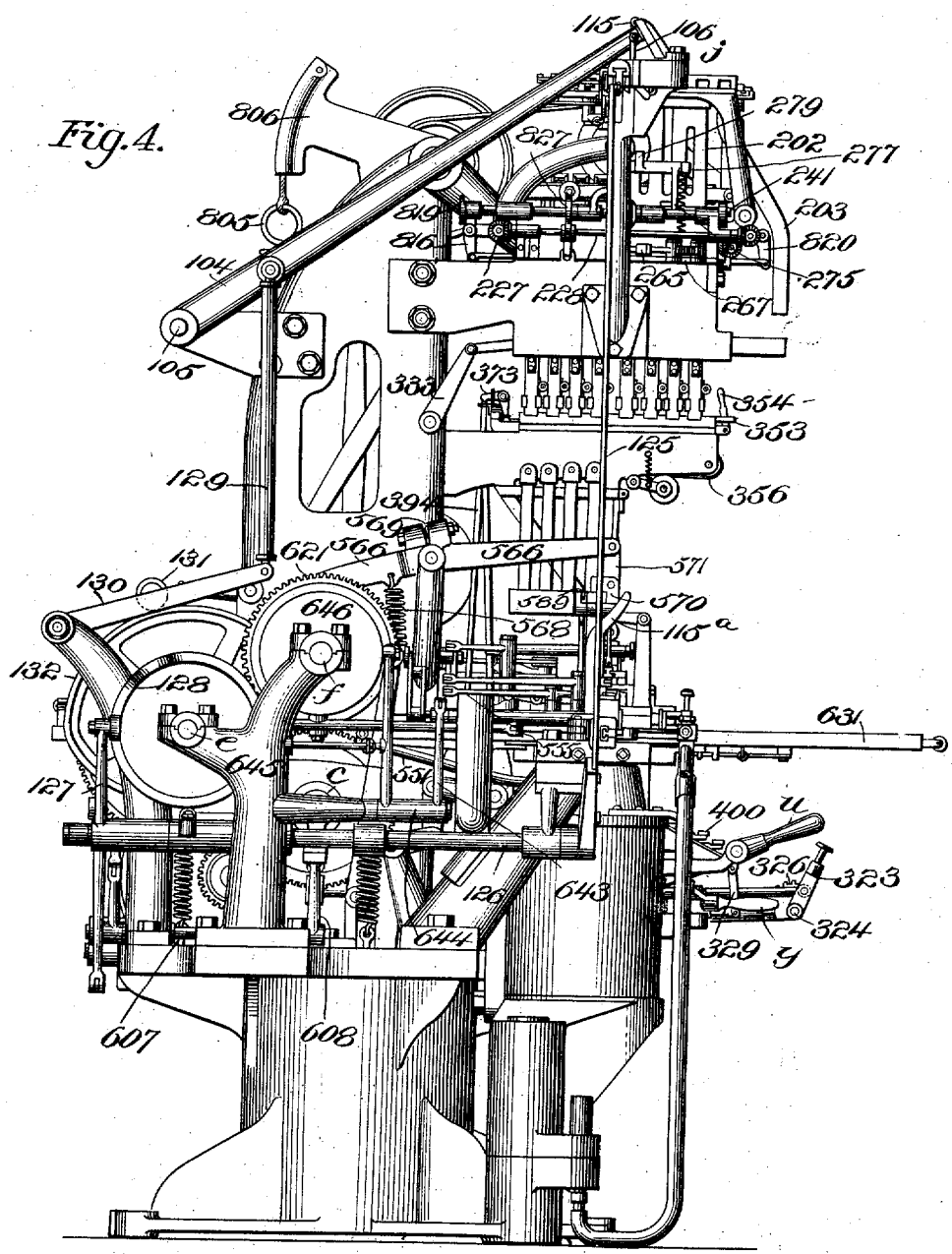
Figure 5:
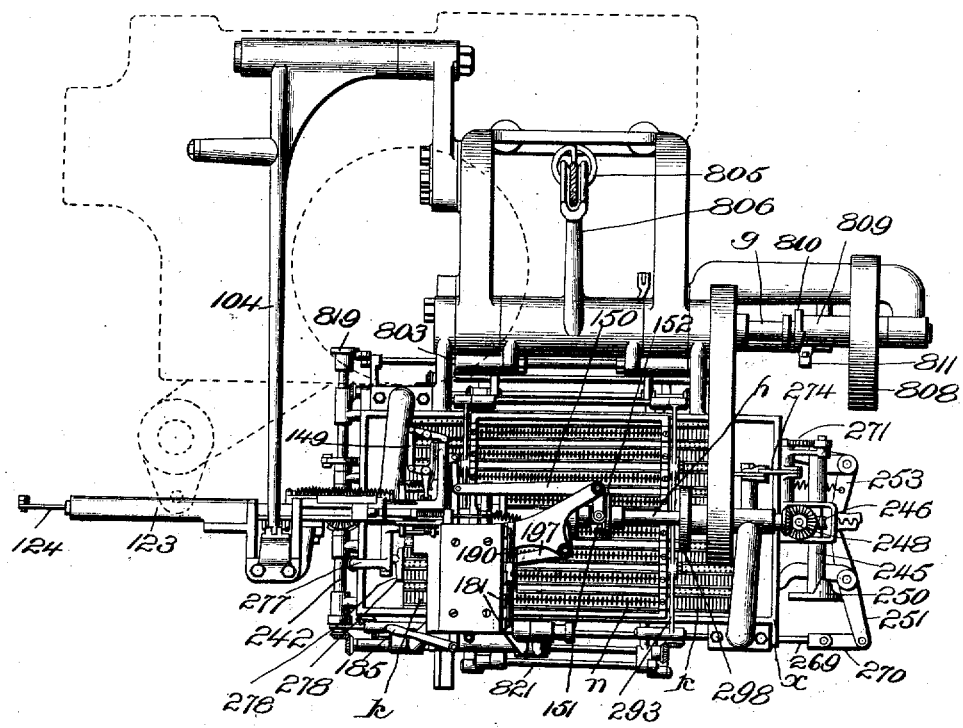
Figure 6:
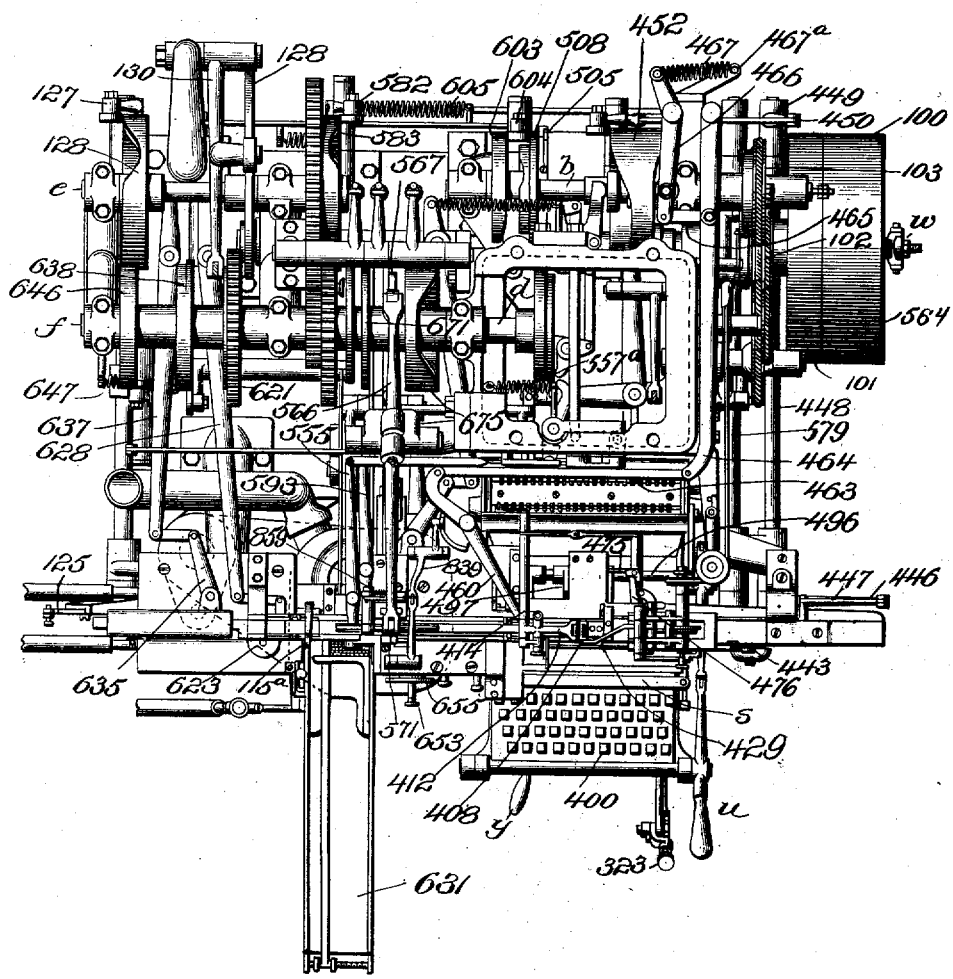

The invention will be described in detail in connection with the accompanying drawings, in which, Figures 1, 2, 3 and 4 are, respectively, front, rear, right side and left side elevations of the entire machine; Fig. 5 is a plan view of the parts above the line 5, of Figs. 2, 3 and 7; Fig. 6 is a plan view of the parts below the line 5 of Figs. 2, 3, and 7; Fig. 7 is a central vertical section looking to the right, taken approximately on the line 7 of Fig. 1; Fig. 8 is a front elevation of the driving and cam shafts; Figs. 9 and 10 are details of the connections for operating the clutches of the movement shafts $a$ and $b$, respectively; Fig. 11 is a plan view of the driving and cam shafts, including the starting and stopping devices; Figs. 12 and 13 are side and top views of the power devices for operating the clutch of movement shaft $a$; Fig. 13$^a$ is a detail of part of Fig. 11; Fig. 14 is a section on line 14 of Fig. 11; Fig. 15 is a section on the line 15, Fig. 8; Fig. 16 is a section on the line 16, Fig. 15; Fig. 17 is a detail; Fig. 18 is a side view of the elevator showing the position of the parts at the distributing station, which is its uppermost position; Fig. 19 is a plan view of parts illustrated in Fig. 18, the top plate being removed; Fig. 20 illustrates the position assumed by the elevator parts as the elevator travels between stations; Fig. 21 illustrates the elevator at the mold station, which is its lowest position; Fig. 22 is a plan view of the lower elevator station; Fig. 23 is a side elevation of the elevator and its operating cam; Fig. 24 is a side view of one of the matrices; Fig. 25 is a rear elevation illustrating the distributer shifter; Fig. 25$^a$ is a detail of part of Fig. 25; Fig. 26 is a plan view partly in section on the line 26 of Fig. 18; Fig. 27 is a section on the line 27, Fig. 25; Fig. 28 is a side view of part of the elevator; Fig. 29 is a perspective view of a portion of the elevator; Fig. 30 is a rear view of the line shifting and font separating devices, partly in section on the line 30 of Fig. 33; Fig. 31 is a similar view on the line 31 of Fig. 33; Fig. 32 is a front view partly in section on the line 32 of Fig. 33; Fig. 33 is a plan view partly in section on the line 33 of Fig. 30; Fig. 34 is a detail view of the gate brake; Fig. 35 is a section on the line 35, Fig. 30; Fig. 36 is a section on the line 36, Fig. 33; Fig. 37 is a top plan view of the matrix distributer; Fig. 38 is a bottom plan view of the distributer; Fig. 39 is a front elevation of the distributer driving mechanism; Fig.

Figure 58:
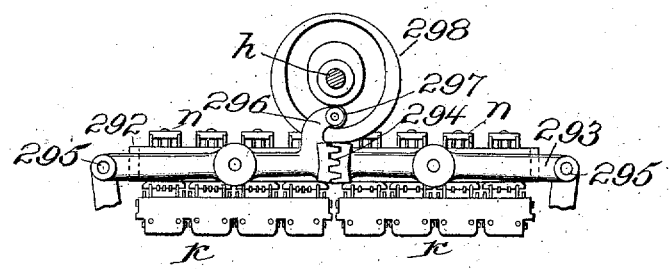
Figure 59:
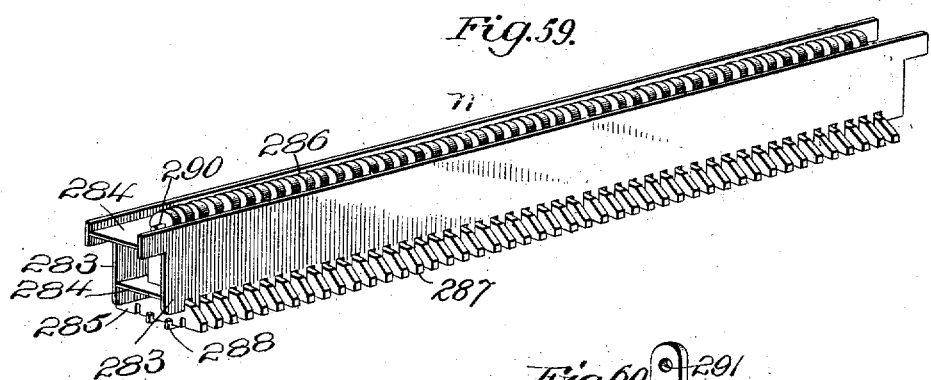
Figure 60:
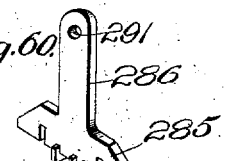
Figure 61:
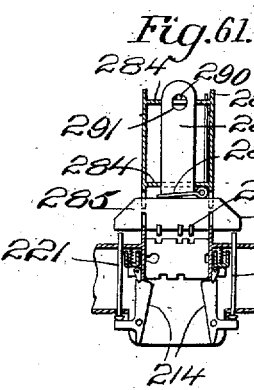
Figure 62:
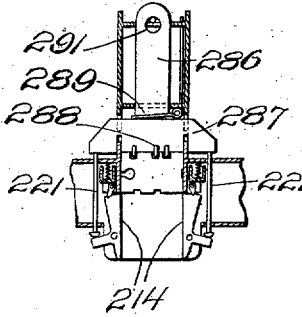
Figure 63:
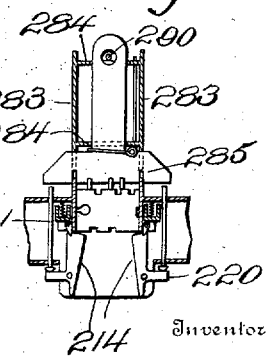
Figure 85:
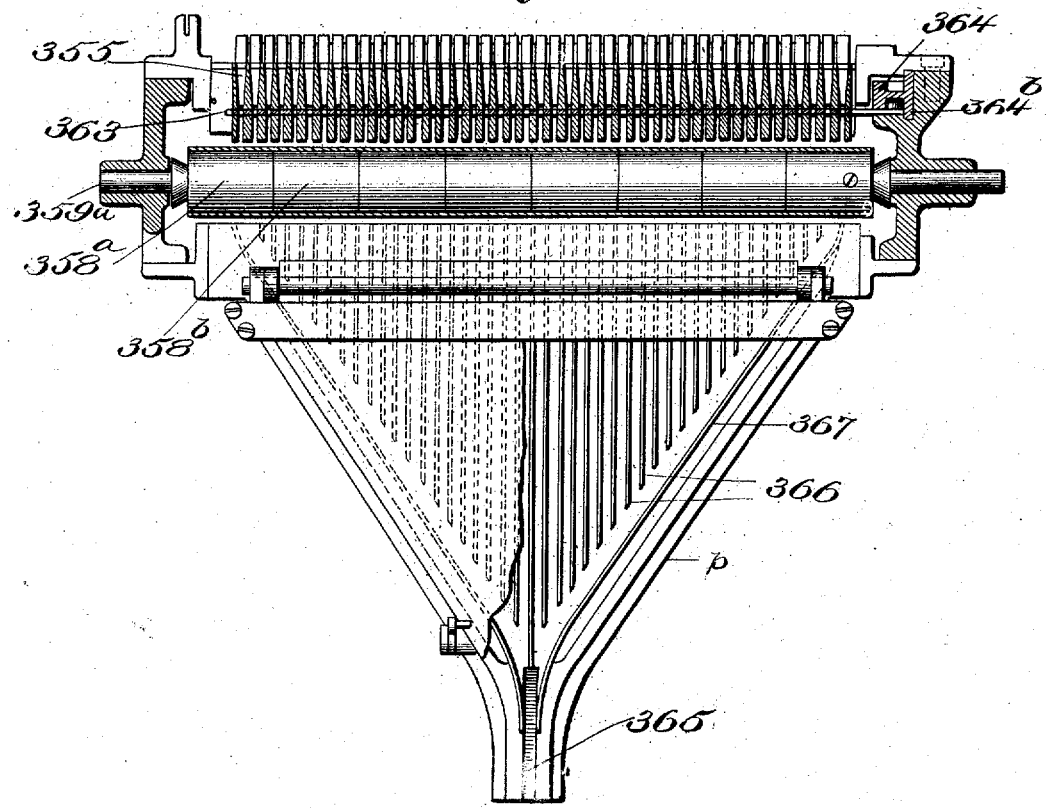
Figure 86:
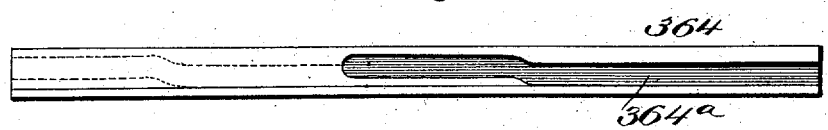
Figure 87:
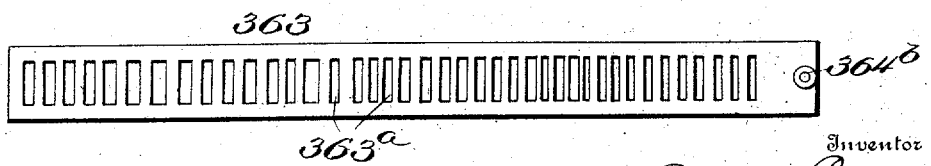
Figure 103:
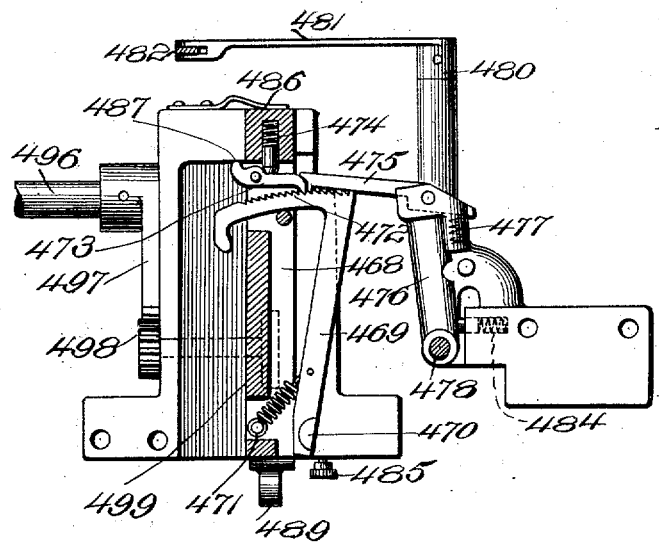
Figure 104:
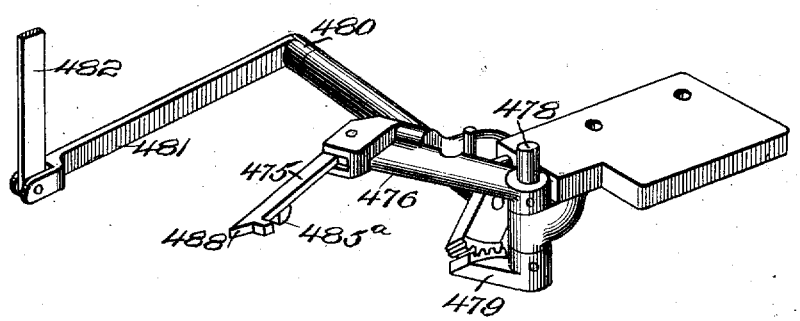
Figure 125:
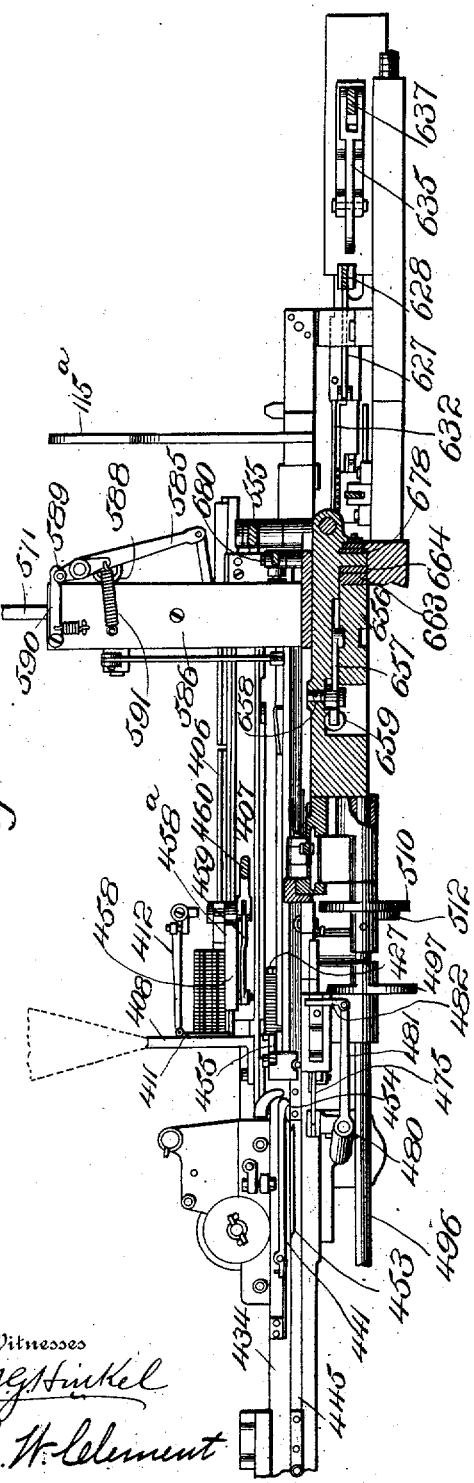
Figure 126:
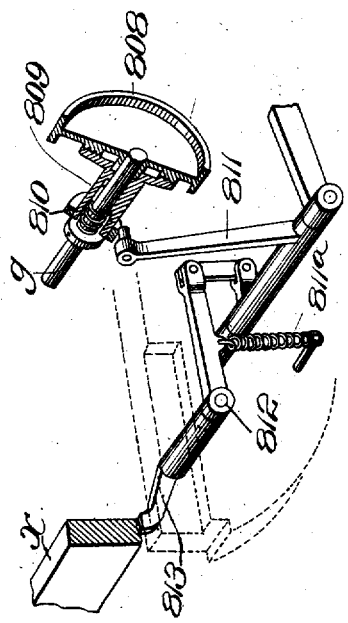
Figure 134:
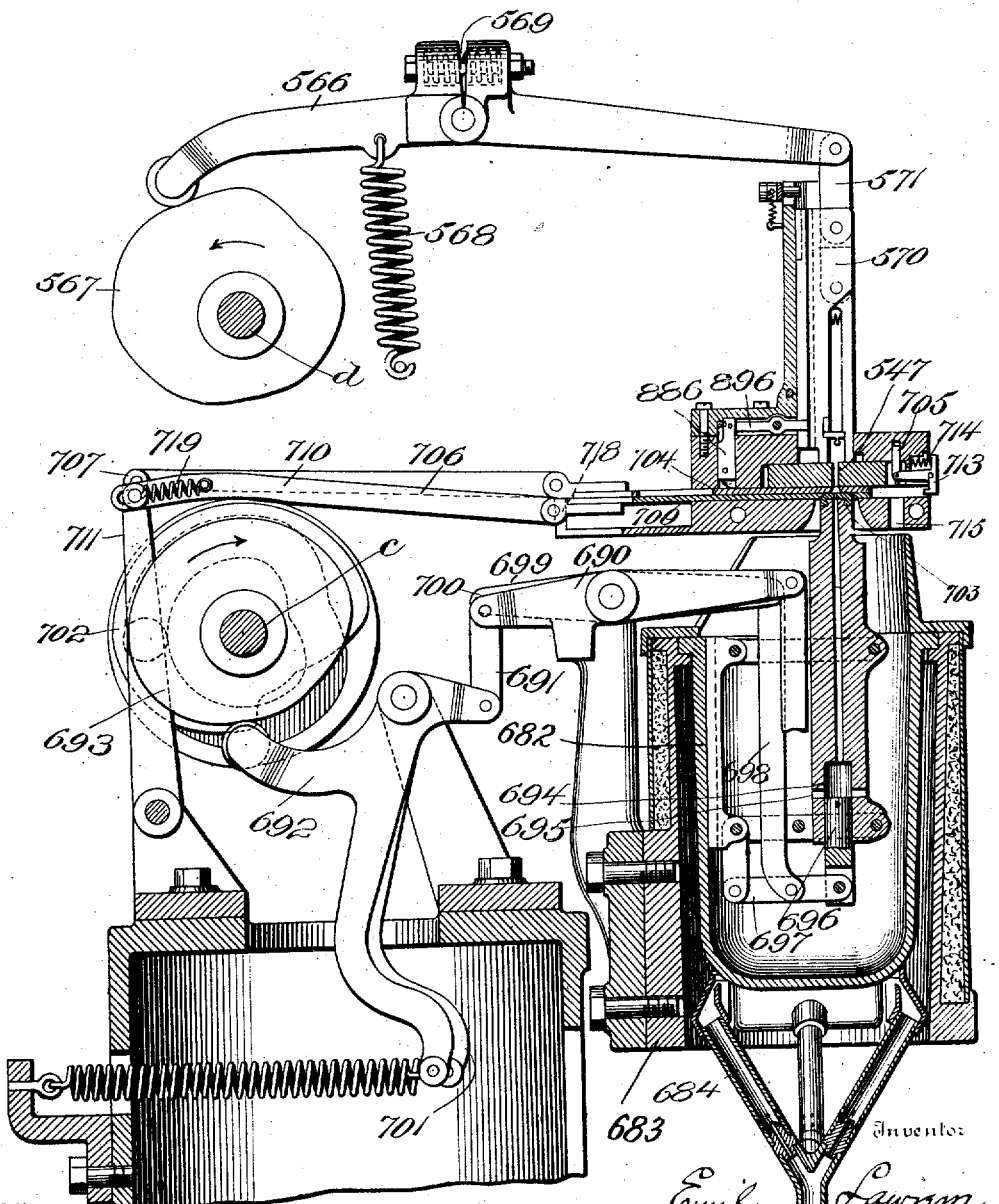
Figure 135:
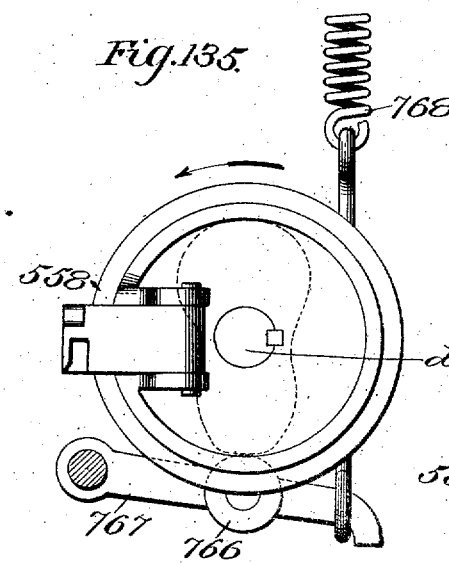
Figure 136:
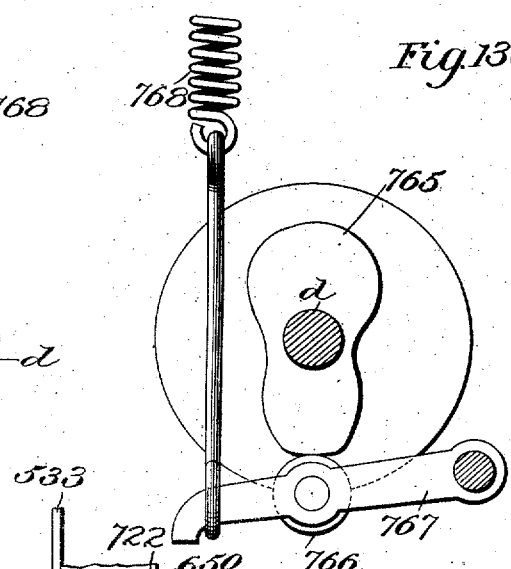
Figure 137:
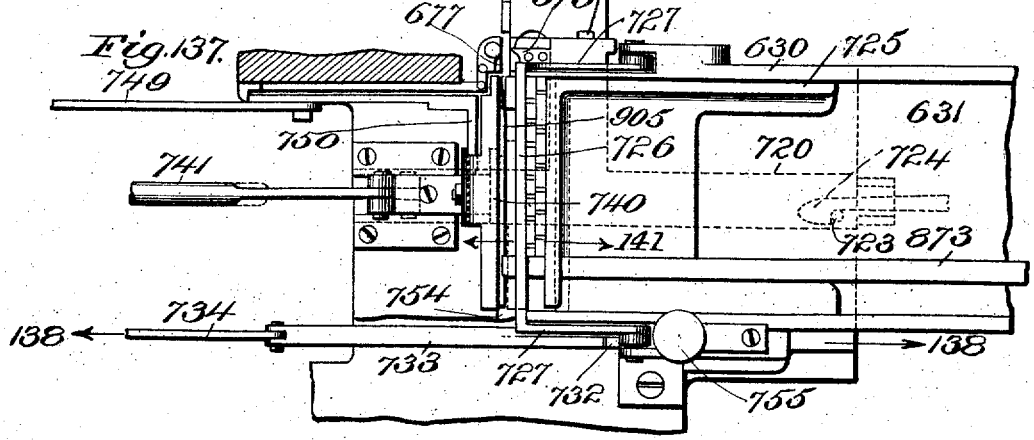
Figure 138:
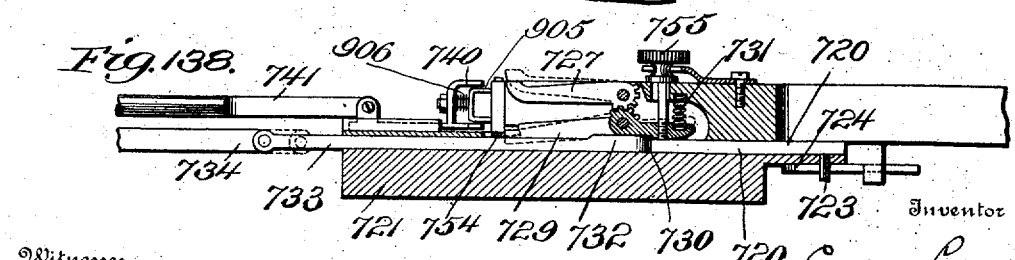

40 is a section on the line 40 of Fig. 37; Fig. 41 is a rear elevation of the mechanism of the font separator, and its operating cams; Fig. 42 is a plan of the font separator; Fig. 43 is a detail of the font feeler locking slide; Figs. 44, 45 and 47 are sections on the line 44 of Fig. 42, showing the parts in different positions; Fig. 46 is a section on the line 46, Fig. 42; Fig. 47$^a$ is an under-side view of the matrix brake; Fig. 48 is a view of one of the font feelers; Fig. 49 is a view of one of the font slides; Fig. 50 is a view of the font slide next to the gate; Fig. 51 is a view of the transfer slide; Fig. 52 is a vertical section on the line 52 of Fig. 45; Fig. 53 is a section on line 53 of Fig. 52; Fig. 54 is a perspective view of one of the carriers of the distributer; Fig. 55 is a view of one of the carrier pawls; Fig. 56 is a side view of one of the carriers, partly broken away to show the interior construction; Fig. 57 is a plan view of a complete carrier; Fig. 58 illustrates the relative positions of the distributer feelers and carriers in operation; Fig. 59 is a perspective view of one of the feeler bars; Fig. 60 is a similar view of one of the individual feelers; Figs. 61, 62 and 63 are sectional views through a feeler bar and one of the carrier cells showing the parts in different positions; Fig. 64 is a section on the line 64 of Fig. 38; Fig. 65 is a detail of the device for restoring the releasing pins of the carriers; Figs. 66 and 67 are details of the devices for intermittently moving the carriers; Figs. 68 and 69 are plan views of the slides for moving the carriers tranversely; Fig. 70 is a front view of one of the magazine sections; Figs. 71 and 72 are views of opposite ends of one of the magazine sections; Figs. 73 and 74 are end and side views of the devices for retaining matrices in the magazine; Fig. 75 is a vertical section through the magazine on the line 75 of Fig. 76; Fig. 76 is a horizontal section on the line 76 of Fig. 75; Fig. 77 is a perspective view of one of the matrix retaining bars; Fig. 78 is a vertical section through the magazine and the funnel showing the mechanisms for operating the same; Figs. 79 and 80 illustrate details of the mechanism for shifting the magazine slide; Fig. 81 is a section through the magazine and funnel on a larger scale than Fig. 78; Fig. 82 is a plan view illustrating the escapement slides; Fig. 83 is a detail of the magazine locking slide; Fig. 84 is a perspective view of one of the escapement slides; Fig. 84$^a$ is an enlarged sectional view illustrating the operation of the escapements; Fig. 85 is a front elevation of the magazine funnel, partly broken away; Fig. 86 is a plan view of the cam bar; Fig. 87 is a plan view of one of the grid bars; Fig. 88 is a vertical, sectional view illustrating the connections between the key board and the escapements; Figs. 89 and 90 are sectional views illustrating two positions of the escapement operating cams; Fig. 91 is a plan view of a portion of the cams; Fig. 92 is an edge view of one of the cams in its mounting; Fig. 93 is a plan view of the same partly in section on the line 93 of Fig. 92; Fig. 94 is a front elevation illustrating the mechanism for assembling matrices in line and transferring them to the casting mechanism; Fig. 94$^a$ is a detail of part of Fig. 94; Fig. 95 is a plan view of the separator collecting slide; Fig. 96 is a view of part of the devices shown in Fig. 94 on an enlarged scale and partly in section; Fig. 97 is an enlargement of a portion of Fig. 94; Fig. 98 is a plan view of some of the parts shown in Fig. 94; Fig. 99 is a horizontal section about on the line 99 of Fig. 98; Fig. 100 is an enlargement of part of Fig. 99; Fig. 100$^a$ is a detail view of a matrix guide shown in Fig. 100; Fig. 101 is a plan view of part of the mechanism illustrated in Figs. 98 and 99; Fig. 102 is a diagram of one of the separators; Fig. 103 is a plan view of the justifier angle bar and its operating pawls; Fig. 104 is a perspective view of the moving pawl of the angle bar and its connections; Figs. 105, 106 and 107 are plan views of the assembling rail showing the line forwarder in its different positions; Fig. 108 is a detail of the line forwarder; Fig. 109 is a plan view of the mold and its adjusting devices, parts being shown in section approximately on a plan co-incident with the upper surface of the mold; Fig. 110 is a partial section on the line 110 of Fig. 109; Fig. 111 is a section approximately on the line 111 of Fig. 109; Fig. 112 is a section on the line 112 of Fig. 111; Fig. 113 is a section partially on line 113 of Fig. 111; Fig. 114 is a detail; Fig. 115 is a perspective view of the movable clamping jaw and its slide; Fig. 116 is a sectional view of the same; Fig. 117 is a section on the line 117 of Fig. 116; Figs. 118, 119 and 120 are views of the mechanism for preventing the casting operation when the matrices are not properly clamped, Figs. 119 and 120 being sections on the lines 119 and 120 of Fig. 118; Figs. 121, 122 and 123 are rear, left side and front elevations, respectively, of the presentation slide and adjacent parts; Fig. 124 is a detail of a part shown in Fig. 123; Fig. 125 is a rear elevation of parts shown in Fig. 94; Fig. 126 is a perspective view illustrating the distributer clutch and its operating mechanism; Fig. 127 is a sectional view illustrating the clutch for starting and stopping the final justification mechanism; Fig. 128 is a detail of part of Fig. 127; Fig. 129 is a sectional view of the main clutch and the driving pulleys; Fig. 130 is a plan view, partly in section, of the measuring devices for controlling the final justification; Fig. 131 is a plan view of the melting pot and pump; Fig. 132 is a sectional elevation of the melting pot and pump; Fig. 133 illustrates the throat of the nozzle of the pump in section; Fig. 134 is a vertical section through the mold and pump, illustrating the operating devices; Figs. 135 and 136 are right and left views of one of the compensating cams; Fig. 137 is a plan view of the devices for assembling the logotypes and transferring them to the galley; Fig. 138 is a section on the line 138 of Fig. 137; Fig. 139 is a plan view of the galley; Fig. 140 is a sectional view of the same; Fig. 141 is a section on the line 141 of Fig. 137; Fig. 142 is a plan view and Fig. 143 a left side elevation of the mechanism for transferring logotypes to the galley; Fig. 144 is a plan view of the jet slide and the pump nozzle wiper; Fig. 145 is a perspective view of the nozzle wiper and nozzle; Fig. 146 illustrates the manner of assembling the logotypes into lines; Fig. 147 illustrates a justified line of logotypes; and Fig. 148 illustrates the same line separated to show the individual logotypes.

The various moving parts of the machine are supported on a frame of suitable construction together with suitable standards and brackets attached to the frame.

On the main drive shaft $a$ is a drive pulley 100 and a loose pulley 101. A cam shaft $b$ is driven by means of pulleys 102, 103. Four other cam shafts $c$, $d$, $e$ and $f$ are driven from the power shaft $a$ by suitable gearing, to be hereinafter referred to.

Figure 2:
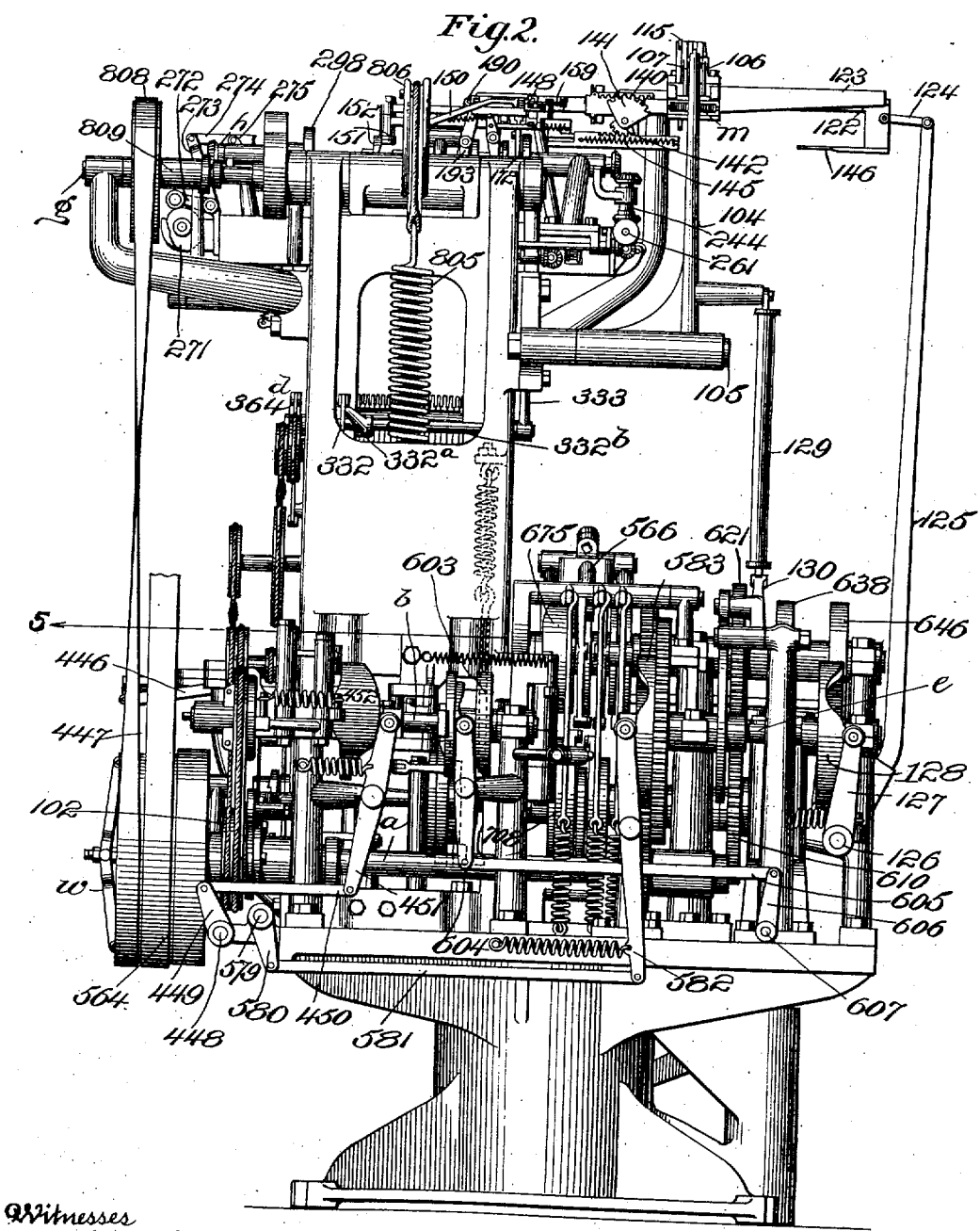

The elevator arm 104 moves in a vertical plane about a fixed pivot 105 (Figs. 4 and 18 to 29 inclusive). The devices for moving the elevator arm will be described hereinafter. Pivotally carried on the forward end of the arm is a forked lever comprising two branches 106 and 107 to the outer or free end of which is pivoted the matrix holder or elevator proper $i$. The elevator $i$ comprises a base 108 having beveled edges 109, a right angled flange 110 and an undercut rib 111. The elevator is normally held with the base 108 at right angles to the lever 106, 107 by means of a coiled spring 112. Rigidly connected with the elevator is an arm 113. The lever 106, 107 is held in its normal relation to the arm 104 as shown in Fig. 20, by a spring 114 attached at one end to the arm 104 and at the other end to a portion of lever 107 extending above the arm. The upward extension of lever is provided with an antifriction roll 115. The matrices $m$ are provided with under-cut notches 116 which interlock with the elevator rib 111. The elevator periodically rises and assumes the position shown in Figs. 18, 19, 23 and 25 and while in such position the matrices, carried by the elevator, are moved from it into a guide which conducts them to the separator. As the elevator rises the roll 115 travels on a fixed cam 117 causing the lever 106, 107 to assume a vertical position. At the same time the arm 113 of the elevator engages roll 118 which is on a fixed pivot and the elevator base 108 is caused to assume a vertical position, bringing the matrices into line with the channel or guide 119 (Figs. 31 and 35) leading to the font separator. This channel 119 is provided with an under-cut rib 120 which registers with the elevator rib 111. A spring latch 110$^a$, connected to flange 110, is provided for retaining the matrices in the elevator while the latter is moving. As the elevator comes to rest at the upper station said latch is moved out of the path of the matrices by a stationary pin 111$^a$, as shown in Fig. 25$^a$. While the elevator is in its uppermost position the matrices are shifted from it into the channel 119 by a shifter 121 carried on a slide 122 which travels in a suitable way in a fixed arm 123 (Figs. 25 and 27). Slide 122 is moved by link 124 and arm 125, said arm being carried by a rock shaft 126 which is periodically rocked by an arm 127 having a roll engaging cam 128 on shaft $e$ (Figs. 2 and 4). The elevator arm is operated by a spring link 129 connecting it to a cam lever 130 having a cam roll 131 which rests on cam 132 of cam shaft $e$ (Figs. 2, 4 and 23). Springs are used throughout the machine, where necessary, to hold the cam rolls in engagement with their cams. As the line of matrices is pushed from the elevator into channel 119 they are engaged by a pair of spring pawls 133 (Figs. 30 to 36 and 41 and 42) and moved against an abutment 134 at the inner end of the channel. The pawls 133 are pivoted above and below the channel to a slide 135. The pawls have extensions 136 which abut against ears 137 on the slide to limit their inward movement. They are also provided with right angled extensions or arms 138 against which springs 139 abut to throw the pawls into the channel. It will be evident that the pawls are easily separated to permit the matrices to pass between them. The slide 135 has an attached rack 140 which meshes with a sector gear 141. This sector gear is connected with a second sector gear 142 which engages a rack 143 sliding in a fixed guide 144. Rack 143 is normally drawn toward its left hand position by a spring 145 and the pawls 133 are thereby under spring tension to move to the right at all times. When the matrix shifter 121 moves to the right to transfer a line of matrices into the separator channel 119 a piece 146 engages the slide 143 and draws back the pawls or fingers 133 over the line of matrices which is being moved into the channel 119. When the shifter is withdrawn spring 145 moves the pawls 133 to the right pushing the line of matrices against the abutment 134. Pawls 133 there-after continue to exert a spring pressure against the line of matrices, holding said line against the abutment 134. The line is thus held against the abutment excepting at intervals when the matrix is to be pushed from the line to the font separator. At such times the pressure of the pawls 133 on the line is relieved as will be presently explained.
The matrices are removed from the line one by one by a pusher 147 sliding in a fixed guideway 148. Pusher 147 is operated by link 149, cam lever 150, cam roll 151, and cam 152 of cam shaft $h$ (Figs. 33, 41 and
42) which is situated in the upper part of the machine. When the pusher is in its rearmost position the pawls 133 are permitted to exert a pressure on the line of matrices to hold the same against the abutment. When, however, the pusher advances and engages the end matrix it is desirable to relieve the pressure on the line. For this purpose the following devices are provided. A pair of blades 153 are mounted upon a common fixed pivot 154. (Figs. 30 and 33). Upon these blades are pivoted a pair of angular pieces 155 mounted with freedom to have a limited movement on their pivots. The angular pieces 155 are adapted to engage the slide 135 when the blades 153 are moved apart. A slide 156 has a tapered end adapted to pass between and separate the blades 153. Slide 156 is operated by sector gear 157, cam lever 158, and cam 159 on shaft $h$.
When the pusher 147 is in its rearmost position the cam withdraws the slide 156 from between the blades 153 thus permitting the line forwarding pawls 133 to exert pressure freely on the line of matrices. When the pusher moves forward, however, the lever 158 is freed from the cam 159 and a spring 160 throws the pointed slide 156 in between the blades 153, spreading said blades. This movement of the blades causes the angular pieces 155 to engage and push back and hold the slide 135 which carries the forwarding pawls. The backward movement of the slide is caused by the rotation of said angular pieces about the pivot 154. In the construction shown this movement is very slight, but sufficient for all practical purposes.

On the forward side of the channel 119 adjacent to the abutment 134 is a sliding gate 161 (Figs. 32 and 33). The gate 161 forms part of a two-part slide, it being arranged to slide upon a part 162 which moves in ways upon the frame. The parts 161, 162 are normally pressed away from each other by a light spring 163. The gate slide is operated by a lever 164, link 165, cam lever 170, cam roll 171, and cam 172 on shaft $h$. Spring 173 holds the roll against the cam. In operation the gate is slowly opened and closed by the cam and connections specified. As the gate begins to open the pusher advances and tends to push out the foremost matrix. As soon as the gate is sufficiently open the matrix and pusher advance. At this moment a brake is applied to the gate mechanism to relieve the gate from the tension of spring 173. This brake comprises a brake lever 174 having a short arm bearing on a pawl 174$^a$ which engages a toothed or roughened surface 175 on the link 165 (Figs. 31, 33 and 34). Spring 176 is connected to the brake lever and tends to draw it in the direction to apply the brake. The lever is also connected by link 177 to an elbow lever 178, one arm of which is in the path of the rear end of the pusher 147. When the pusher is in its rearmost position the brake is withdrawn from link 165 and temporarily held off by a pawl 173$^a$ which engages a projection 174$^a$ on lever 174. Pawl 173$^a$ is operated by a cam lever 175$^a$ and a cam 147$^a$ on the pusher 147. When the pusher has started a matrix through the gate, cam 147$^a$ rocks pawl 173$^a$ and releases the brake lever 174 which permits the brake to be quickly applied by the spring 176 locking the part 162 of the gate. Part 161, however, may be pushed farther back by the matrix, compressing the spring 163. The rear corner of the gate is beveled as shown at 179 to cause the matrix to advance gradually, which permits the brake to be applied and the forwarding pawls to be withdrawn before the matrix is fully through the gate.
The spring 163 exerts a slight pressure on the matrix to steady it as it is being ejected. The gate thus operates as a brake on the matrix and prevents the pusher from driving it too quickly into the font separator.
It will be evident that the means just described limit the gate opening variably to the respective widths of the matrices, as the extent of each opening movement is controlled by the particular matrix presented to the gate.

*Font separator.*—The font separator as illustrated makes provision for separating the matrices into four fonts and for transferring any matrices which do not belong in these channels to a pi receptacle.

Referring to Figs. 42 to 52 inclusive, the font separator $j$ comprises a transfer slide 180 which moves the matrices step by step to bring them opposite the several font channels or receptacles successively; a series of testing slides 181 and a series of font feelers 182. The feelers are on slides 183 which are interchangeable. When in position they are locked by a notched slide 184 operated by a lever 185. The testing slides 181 are provided at their forward ends with two depending flanges 186, 187 between which is a space 188 forming a temporary receptacle for the matrix. At the opposite end of the font slide is a depending flange 189

189 which is engaged on one side by the slide operating rod 190 and on the opposite side by a sliding pin or plunger 191 which is constantly pushed to the right by a spring 192. The transfer slides are intermittently pushed forward against the pressure of the springs 192 by the rod 190 which is carried on the upper end of a cam lever 193 having a roll in contact with a cam 194 on shaft $h$ (Figs. 41 and 42). The transfer slide 180 has a series of matrix transfer devices 195 which transfer the matrices step by step to the successive font slides, carrying them to a position opposite their respective channels or to the pi channel. The transfer slide is operated by a link 196, elbow lever 197, and cam 198 on shaft $h$. The testing slides move right and left on a fixed block 199. The transfer slide moves forward and backward in guides between said block 199 and a bracket 200 (Figs. 44 to 46). The feelers 182 are adjacent to throats or openings 201 which receive the matrices which pass the feelers. These throats lead to the font tubes 202, and a pi tube 203 (Fig. 52). The testing slide 181$^a$ which is nearest to the gate is provided with a guard 204 which closes the gate opening at all times excepting when the space or channel 188 of the testing slide is opposite the gate. To stop and retain the matrices in perfect registration with the first testing slide a friction brake is provided consisting of a slide 182$^a$ working in a fixed guide 183$^a$ and having a beveled projection 184$^a$ which lies in the path of the matrices as they are pushed into said slide. A yielding pressure is put on the brake by a spring 185$^a$ (Figs. 41 and 42).

The operation of the font separating devices is as follows: The testing slides are moved forward into the position shown in Fig. 44, in which position the channels 188 of said slides are in line with the gate opening through which the matrices are delivered to the separator. At this moment the matrix is pushed through the gate into engagement with the friction brake 184$^a$ by the pusher 147, the gate being open. The common bar 190 which operates all of the testing slides then permits the springs 192 to move said slides to the right and the matrix which is in the channel of the first slide is moved away from brake 184$^a$ and has its lower edge presented to and pressed yieldingly against the feelers 182 opposite the first font chute 202. If the notches in the lower edge of the matrix are the same combination as the feelers the matrix will pass the feelers and drop into the channel. If, however, the matrix does not belong in the first channel it will be stopped by the feelers as shown in Fig. 45. The testing slides are then moved to a position between the positions illustrated in Figs. 44 and 45 and stopped. In this position the guards or tongues 195 of the transfer slide 180 register with the matrix channels 188 in the testing slides. The transfer slide then moves forward carrying the matrix which is retained by the first testing slide over to the second testing slide. The transfer slide stops after the matrix has been transferred and the testing slides move to the extreme position shown in Fig. 44 and another matrix is passed into the first slide from the gate. While this is taking place the transfer slide is returned to its original position, flanges 195 passing to the right of the projections 187 of the testing slides. The first and second testing slides are now provided with matrices and they are moved to the right as before to bring the matrices against their respective feelers 182. In like manner each matrix is passed along from one testing slide to the next until it finds the proper font tube or is deposited in the pi channel. The matrices are provided with notches 205 on one side by means of which they are separated into fonts and notches 206 on the opposite side by means of which they are deposited in the magazine. The type or letter 207 is preferably arranged on the end of the matrix opposite the under-cut notch 116.

Each set of feelers 182 corresponds to a font of type and when it is desired to change a font of type the feeler slide 183 corresponding to the font which is taken out is removed and a new feeler slide having a proper combination of feelers is inserted in its place. The feelers are removably locked in place by the slide 184 operated by handle 185 (Fig. 42). The font chutes 202 and the pi channel 203 have a sliding connection with the bracket 200. As shown in Figs. 44 and 45 this connection comprises flanges 208 at the upper end of the chutes which engage corresponding grooves in the bracket. Should a matrix stick in any of the chutes the latter may be taken out by hand and the matrix dislodged. The font chutes are preferably made or united in a single piece as illustrated in Fig. 52. Near the bottom of each chute is a very light flat spring 209 (Fig. 53) adapted to direct the matrices to one side of the chute and deposit them accurately in the carrier of the distributer.

The various parts of the font separator are carried on a swinging frame 800 which is pivoted in bearings 801 on the front of the machine (Figs. 1, 3, 41 and 42). The frame 800 is locked in its normal position by a spring bolt 802. By swinging the frame upward the lower ends of the chutes 202 are exposed and any matrices which may become lodged in the chutes can be withdrawn.

*The distributer.*—The distributer (Figs. 52 to 69) comprises a series of matrix carriers $k$ which receive the matrices from the font separator and transport them step by step over the magazine until they are released and dropped into their proper magazine tubes. One of the carriers $k$ will first be described.

Referring to Figs. 52 to 57 inclusive, it will be seen that the carrier $k$ comprises a series of pockets 210 into which the matrices are discharged from the chutes 202 of the separator. These pockets, as shown, are in four rows of fourteen each, the positions of the rows corresponding to the separator chutes or font chutes as shown in Fig. 52. The pockets or cells are inclosed by longitudinal plates 211 and transverse plates 212, the parts being held together by rivets 213. Each pocket is provided with a pair of pawls 214 pivoted outside of the pocket at 215 and normally extending into the pocket. The matrices are dropped into the pockets from the chutes 202 and rest with their corners upon these pawls. The pawls are held in their retaining positions as shown at the left in Fig. 56 and in their releasing positions as shown in the middle pocket of Fig. 56 by toggle levers 216 which depend from pivots 217 in vertically moving slides 218. The slides are normally pressed down by springs 219 and by reason of the toggle action between the levers 216 and the pawls 214 the pawls are spring pressed into both their operative and inoperative positions. The pawls 214 have rearwardly extending arms 220 upon which rest pins 221 which extend above the carrier frame. When the pins 221 are pressed down the pawls are thrown out of the pockets, as shown in Fig. 56, and the matrix sustained on the pawls is permitted to drop. This condition prevails when the matrix is above its proper magazine tube as will be explained hereinafter. The pawls are prevented from swinging too far outward by pins 222. The inner edges of the pawls aline with the pocket walls when the pawls are thrown out and assist in guiding the matrices properly into their magazine tubes. The magazine shown in the drawing comprises eight sections each capable of holding either a lower case or an upper case font. In other words the magazine is capable of holding four complete fonts of upper and lower case characters. We will assume that the four sections in the forward part of the magazine are lower case sections $l$ and those in the rear part of the magazine are the four upper case sections $l'$ (Figs. 78 and 81). The carriers first pass over the lower case sections and deposit the lower case matrices therein and then over the upper case sections to deposit the upper case matrices. The magazine sections together form a rectangle over which the carriers $k$ travel in a rectangular path in a manner to be now described.

Referring to Fig. 37 which is a partial plan view of the distributer and to Figs. 40 and 64 it will be seen that the carriers $k$ travel in a rectangular path on suitable ways 224 situated above the magazine mouths, the direction of motion being indicated by arrows (Fig. 37). Each carrier is carried along the front half of the magazine by the engagement of gears 225 with the lower edges of the plates 211 of the rearmost carrier in each train. The carriers in engagement with the gears 225 push forward the carriers in advance and the foremost carrier in each train or the one next in rear of it is in engagement with the gears $225^a$. The gears $225^a$ serve to prevent any overmotion of the carriers which might throw them out of register with the magazine. The gears 225, $225^a$ are on shafts 226 which are connected together by shafts 227 and bevel gearing. There are four of the shafts 226, two extending from the front of the distributer to the middle, and two extending from the rear of the distributer to the middle thereof. Those in front are moved step by step in one direction and those in the rear are moved step by step in the opposite direction. The shafts 227 are connected by a shaft 228 at the left end of the machine as shown in Figs. 37, 38, 39, 40 and 64. The gears 225 are operated step by step by the following means: On the front end of the left hand shaft 226 (Figs. 1 and 66) is a ratchet wheel 229. Adjacent to the ratchet wheel is a two-armed rocker 230. To the upper arm 231 of this rocker is pivoted a spring-pressed moving pawl 232 and an operating link or pitman 233. Pivoted to a fixed support is a spring-pressed holding pawl 234, to prevent backward movement of the ratchet wheel. The pawls 232 and 234 engage rearwardly projecting teeth 235 on one-half of the ratchet wheel. On the rear half of the ratchet wheel are a series of forwardly projecting teeth 236 Fig. 67 which coöperate with a stop-pawl 237 to prevent the ratchet wheel from over-throw. It will be seen that the pawls 234 and 237 are adapted to lock the wheel against movement in either direction when they are both operative. On the lower arm 238 of the rocker 230 is a roller 239 which engages an arm 240 of the pawl 237, and throws said pawl out of engagement with the ratchet wheel when the pawl 232 is drawn to the rear to engage another tooth. As the pawl 232 is again moved forward the roller 239 permits the pawl 237 to drop in front of a tooth 236, and stop the ratchet wheel at the proper point in its travel. The pitman 233 is reciprocated by a crank 241 (Figs. 1 and 37) on a shaft 242 at the left end of the machine. The pitman is made in two parts, one part carrying a casing 243 (Figs. 37 and 39) in which the other part slides. The two parts are normally pressed apart by a spring within the casing. This construction affords a yielding joint which will prevent positive movement of the ratchet wheel in case of an obstruction in the distributing mechanism. The shaft 242 is connected by bevel gears with a vertical shaft 244, which latter shaft is driven by the cam shaft $h$.

By the mechanism above described, the gears 225 are given a regular step by step movement, which movement is imparted to the matrix carriers, to bring the pockets of the carriers successively under the chutes 202 of the separator and successively over the tubes of the magazine. The matrix separator chutes deliver the matrices to the carriers, and the carriers deliver them in turn to the magazine.

As previously stated, the matrix carriers move in a substantially rectangular path over the rectangular magazine. The movement from left to right at the front of the machine, and from right to left at the rear of the machine, is accomplished as described, by the gears 225. As the carriers approach the right end of the magazine, they are moved to the rear and as they approach the left end of the magazine they are moved to the front, by mechanism now to be described.

Referring to Figs. 37, 38, 39, 40, 64, 68 and 69, 245 indicates a cam-shaft which is driven by means of a worm-gear 246, worm 247, vertical shaft 248 and bevel gears 249 connecting said shaft with the cam shaft $h$. On the forward end of shaft 245, is a cam 250, which operates a horizontally-arranged three-armed lever 251. This lever is connected by segmental gears 252 with an elbow lever 253. On the levers 251 and 253 are arms connected by links 254, 255, with slides 256, 257. The forward slide 256 has a rib 258 (Fig. 68) which engages with the forward end of the carrier. That is, the carrier moves in rear of the rib. This engagement of the carrier with the rib 258 takes place as the carrier passes to the right of the magazine. The levers 251, 253 are then rocked and the slide 256 moves to the rear, carrying with it the engaged carrier. Simultaneously, the slide 257 moves forward and meets the slide 256. On the slide 257 (Fig. 69) is a beveled rib 260 which is gently spring-pressed upward. The carrier moves across this rib, depressing it, until the rib engages one of the transverse series of notches 259. (Figs. 54 and 56). The slide 257 then moves to the rear and the carrier is moved with it by engagement with said rib 260. At the left end of the magazine are a pair of slides 261, 262, which operate in a similar manner to transfer the carriers from the rear to the front. These slides are connected by links 263, to arms 264, which arms are connected to intermeshing segment gears 265. The forward arm 264 is also connected to the segment gear 266, which meshes with the segment gear 267 connected by the link 268, sliding rod 269 and link 270 with the three-arm lever 251. (Fig. 38). By means of these connections the slides at both ends of the magazine operate simultaneously, being moved in one direction by cam 250, and in the opposite direction by spring 250$^a$.

While the carriers are being transferred from front to rear, and vice versa, they are out of engagement with the gears 225, and it becomes necessary to reëngage them with the gears. This is accomplished by mechanism particularly shown in Figs. 37 to 40 inclusive. Upon the rear end of the shaft 245 is a cam 271 on top of which operates an elbow lever having a horizontal arm 272 and a vertical arm 273. The arm 273 is connected by a link 274 with a lever 275 and on the lower end of the lever 275 is a transverse bar 276 adapted to engage and forward the carrier to the gears 225. In order to follow the carrier properly as it engages with the gears, the lever 275 is given a step by step movement by means of certain irregularities in the cam 271. At the left end of the magazine is a lever 277, having a similar but opposite movement to the lever 275, and having a transverse portion 278, at its lower end, adapted to engage with carriers and start them to the right. The lever 277 is connected by segment gears 279 and an arm 280 with a link 281, the opposite end of which is connected to the lever 275. The levers 275, 277 are operated in one direction by a spring 282 (Figs. 39 and 40) and in the opposite direction by the cam 271.

It will be seen from the foregoing description that the carriers move in substantially rectangular paths following each other in close succession. Each carrier is, for instance started to the right by the lever 277 which moves it forward until it engages with the gears 225. It is then moved step by step across the magazine and after passing beyond the right end of the magazine it engages with the slide 256. This slide then moves rearward and transfers the carrier to the slide 257, which moves the carrier to the rear of the magazine. The lever 275 then engages the carrier, and moves it to the left into engagement with the gears 225, which gears carry it over the magazine until it passes beyond the left end thereof. It is then moved to the front as described, and again comes in engagement with the lever 277. In passing over the magazine the carriers abut against each other and move in a solid procession, those in front being impelled by the one in the rear which is in engagement with the gears 225. At each step the carriers stop with their cells over the tubes of the magazines, as shown in Figs. 40 and 64. While they are stopped, certain feelers descend on the carriers and test the matrices contained therein. Whenever a matrix is above its proper magazine channel the feeler releases it, and it is permitted to drop into the channel.

The construction and operation of the feelers will now be described.

Referring to Figs. 58 and 63, inclusive, $n$ indicates one of the feeler bars, the same being shown complete in Fig. 59. The frame of the feeler bar consists of two side plates 283, and upper and lower plates 284. In each bar is mounted a series of vertically movable feelers 285, each feeler comprising a shank 286, which slides in openings in the upper and lower plates 284, and a head 287, which carries the combination of feelers proper 288. There are projections arranged to correspond to the notches in the several matrices. Each feeler is normally pressed into its lowest position by a spring 289, the downward movement of the feeler being limited by a wire 290 passing through the openings 291 in the shanks 286. There is a feeler bar for each section of the magazine and the entire series of bars are raised and lowered in unison with the step by step movement of the carriers, the feelers reaching their lowest positions while the carriers are stationary, and being in their highest position while the carriers are in motion.

Referring to Figs. 37, 39 and 40, 292 indicates a rectangular frame on which the feeler bars $n$ are carried. Pivoted to the ends of the feeler bar frame are four levers 293. These levers are arranged in pairs, their inner ends being connected by segment gears 294 (Fig. 58). The outer ends of the levers 293 are carried on fixed bars 295. One lever of each pair carries an arm 296 which has a cam roll 297 engaging a cam groove in cam wheel 298 on the shaft $h$. The cams 298 are so shaped as to give the feeler bar frame and the feelers a short vertical reciprocation, causing the feelers to come into contact with the matrices in the carriers at the proper time.

The operation of the feelers upon the matrices is illustrated in Figs. 61, 62 and 63. In Fig. 61 the feeler is shown descending on a matrix which has corresponding notches, the matrix being sustained on the pawls 214. As the feeler projections enter the notches of the matrix the feeler is permitted to descend to its lowest level and the ends of the feeler head 287 push down the pins 221, causing the pawls to be thrown back, as shown in Fig. 62, and releasing the matrix, which drops by gravity into the magazine tube. When the matrix is not over its proper tube the feelers do not enter the notches but engage the upper edge of the matrix as shown in Fig. 63. This prevents the feeler head from striking the pins 221 and the matrix is not released. The matrix is then carried to the next magazine tube and tried by another feeler, and so on until it reaches its proper tube.

The distributer mechanism is carried on a frame $x$ supported on swinging arms 803 fixed on a rock shaft 804. The distributer frame is counterbalanced by a spring 805 the upper end of which is connected to an arm 806 on the rock shaft 804 (Figs. 2, 3, 4, 5, 7, 37, 39, and 40). The spring is sufficiently strong to nearly counterbalance the frame and the mechanism supported upon it. Beneath the frame is hinged a prop adapted to support it when raised. In the lower part of the distributer frame is a series of passages or channels 807 for guiding the matrices from the carriers to the magazine. (Figs. 7 and 40.) The channels 807 are supported by the distributer frame $x$ as are also the various parts of the distributing mechanism illustrated in Figs. 30 to 36 and 41 to 52 inclusive. When the distributer frame is raised for the purpose of inspecting the magazine mouths the distributing mechanism is automatically thrown out of operation. To effect this the driving pulley 808 is loose upon the distributer shaft $g$ and is normally connected to said shaft by a clutch disk carried on sleeve 809 which is arranged to slide upon and turn with the shaft (Figs. 2, 3, 5, 7 and 126). On the sleeve 809 is a cam 810. Adjacent to the cam but normally out of contact with it is a rocking arm 811. A spring 811[a] tends to throw the arm 811 into the path of the rotating cam 810 and when the arm enters the path of the cam the clutch disk is disengaged from the pulley 808 and the distributing mechanism immediately stopped. Upon a rock shaft 812 is an arm 813 (Figs. 7 and 126) which is pressed constantly against the bottom of the distributer frame by spring 811[a]. When said frame is raised the arm rocks upward turning the shaft 812 and causing the arm 811 which is connected by intermediate parts to said shaft to engage the cam 810. The distributer mechanism is thus thrown out of operation automatically when the distributer supporting frame is raised. Devices are also provided for stopping the distributing mechanism in case a matrix sticks in any of the magazine mouths. To accomplish this a series of bars 814 are reciprocated across the magazine mouths (Figs. 7, 37 and 38). The bars 814 are connected to transverse bars 815 together forming a rigid frame, as best illustrated in Fig. 38. The rear ends of the bars are connected to arms 816 upon a rock shaft 817 having an arm 818 at its left end in contact with cam 819 on the shaft 242. The forward ends of the bars 815 are connected to arms 820 on a common rock shaft 821. As the shaft 242 rotates the bars 814 are reciprocated transversely across the magazine mouths. Should a matrix stick in one of the magazine mouths the frame carrying bars 814 would be stopped, preventing the rotation of cam 819 and thus stopping the distributing mechanism, the frictional connection between the clutch and the pulley 808 (Fig. 126) being sufficiently light for this purpose.

Referring to Figs. 37 and 38, 64 and 65, the numeral 822 indicates a blade which reciprocates vertically under the matrix carriers at the left end and rear of the machine and restores the pins 221 and pawls 214 to their normal positions. Blade 822 is carried by a lever 823 rocking on shaft 824. The lever is provided with a spring or yielding joint 825 which permits it to yield if a pawl should stick, and thus prevent breakage of the parts. Lever 823 is rocked in one direction by the spring 826 and in the other direction by a cam 827 on shaft 242. The parts are so timed that the upward movement of the blade 822, takes place while the carriers are at rest.

*The magazine.*—The magazine comprises a series of sections, each preferably adapted to hold a font of lower case or upper case matrices. As shown in Fig. 78 there are eight of these sections in the present machine, four for lower case and four for upper case type or matrices. One object of the invention is to provide a magazine which will hold a very large number and variety of characters, and assembling mechanism adapted to select any character from any one of the magazine sections. A single magazine section, adapted to hold a font of characters, is illustrated in Figs. 70 to 77, inclusive. Referring to these figures *o* indicates a magazine section, the same being shown in side elevation in Fig. 70, and in end views in Fig. 71 and 72. Each section *o* consists of a frame, and a channel member within the frame. The channel member comprises two side plates 299 between which are two series of partition plates 300, 301. The partition plates 300 have perforated ears which extend through openings in the side plates, and plates 301 abut against the inner faces of the plates 299. Wires 303 pass through the lugs 302 and lock the side plates and partition plates together. The partition plates are preferably corrugated as shown at 304 and the upper ends of the partition plates converge, as shown in Fig. 75, to form throats 305 to facilitate the entrance of the matrices. The magazine frames consist of end plates 306, channel plates 307 connecting the upper portions of the end plates and bars 307ª connecting their lower portions. The channel plates coöperate with fixed bars 308 (Figs. 3 and 7) which serve to support and guide the magazine sections. The channel members are removably held in the frames by locking devices which, as shown, consist of threaded blocks 300ª which interlock with lugs 300ᵇ on the channel member, the blocks being carried by a rod 300ᶜ having right and left screw threads (Figs. 70, 71 and 72). By turning the rod 300ᶜ forward or backward the blocks 300ª may be engaged or disengaged with the lugs or projections 300ᵇ thus locking or unlocking the channel member. When the channel member is unlocked it may be lifted out of the frame. Each magazine section is provided with a matrix retainer, the same consisting of an angle bar 309, carried by two pivoted arms 310. These bars 309 support the matrices in their respective magazine sections when the sections are inoperative, as will be hereinafter explained. Arms 310 have slotted openings through which pass pins 311 fixed on the frame. They are also connected by links 312 with cranks 313 on a rock shaft 314, mounted in bearings at one side of the magazine frame. One of the cranks 313 is connected by a link 315 with one arm of a hand lever 316. A spring 317 tends at all times to draw the angle bar 309 into engagement with the lowest matrices in the magazine section and into position to support and retain all of the matrices in the section.

To the left of the magazine is a sliding bar 318 provided with a track or way 319, upon which rollers 320 rest. These rollers are carried by the crank arms 313 on the left ends of the rock shafts 314. In the track 319 are two depressions 321. Springs 322 connect the crank arms on the right ends of the magazines with fixed points, tending to rock the shafts 314 and causing the rollers 320 to bear down upon the tracks 319. The depressions 321 are spaced apart nearly equal to the distance between corresponding sections in the upper case and lower case halves of the magazines. If they were spaced exactly equal to the distance between corresponding sections of the magazine that is, the distance between the first and fifth sections, the second and sixth sections, etc., two sections would be rendered operative simultaneously. It is desirable, however, to only render operative one magazine section at a time to prevent any possibility of matrices from two sections interfering in the assembler. This is accomplished by spacing the depressions 321 slightly different from the spacing of the corresponding magazine sections. By one movement the bar 318 is shifted to set the machine for using a given font, and by another movement the bar is shifted back and forth to render either the upper case or the lower case section carrying said font, operative. The object of the depressions is to render the magazine sections operative by permitting the shafts 314 to rock and throw the matrix-retaining bar out from under the matrices, as indicated in dotted lines in Fig. 73.

The track-bar 318 is adjusted to render different sections operative by devices illustrated in Figs. 78 and 80. Adjacent to the key-board is a lever 323 pivoted at 324 and carrying a spring latch 325 which engages the notches in a sector 326. To the lever 323 is connected a rod 327 and the sector 326 is connected to a parallel rod 328, hung on a link 329, which is pivoted to the frame at 330. The rod 327 is connected to the sliding bar 318 by an elbow-lever 331, link 332, arm 332$^a$, shaft 332$^b$, arm 333 and link 334. When the lever 323 is shifted the sliding bar 318 is simultaneously shifted to render available different font sections of the magazine. When in its forward position the first and fifth sections are available and when in its rearmost position the fourth and eighth sections are available, etc., (Figs. 1, 2, 3, 4, 78 and 80).

The shifting of the rod 318 to render either upper or lower case magazine sections operative for any font is accomplished by the following means: Referring to Figs. 78 to 80, inclusive, 335 indicates a cam shaped roll pivotally carried on the rear end of a lever 336. Cam roller 335 normally stands above and free from a constantly-running roll 337. It is counterweighted and has a tendency to rotate into contact with roll 337, but is normally prevented from engaging said roll by a latch 338 on which a projection 339 of the cam roll rests. Latch 338 forms one arm of an elbow lever, the other arm 340 of which is connected by a link 341 to the case-key lever 342. It will be evident that when the key-lever 342 is operated the latch 338 will be withdrawn from the pin 339 and the cam roll 335 permitted to engage the running roll 337. This will cause the cam roll to make one revolution and rock the lever 336. On the completion of a revolution it is again caught by the latch 338 and it is prevented from rebounding by the stop-pawl 343. The lever 336 is connected to a stop-lever 344 and when it is rocked it withdraws the stop 345 from the projection 346 on cam wheel 347, permitting said cam wheel to make half a revolution. There are two of the projections 346, diametrically opposite, and when the stop 345 is withdrawn from one it is immediately thrown back into the path of the other by spring 348. As cam 347 makes half a revolution it rocks cam lever 349, which cam lever is connected to the rod 328. The rod 328 is thus reciprocated to a small extent and the parts 323 to 334, inclusive, are given a corresponding movement. When the key-lever 342 is again depressed the cam 347 makes another half revolution, restoring all the parts to their original positions. By the means described the bar 318 is shifted to render either upper or lower case, of any font, available, it only being necessary to touch the key 342 to release the weighted cam 333.

Referring again to Figs. 70 to 74, inclusive, 350 indicates a locking lever on the end of each magazine section. When the section is pushed into place in the magazine, as indicated in Fig. 70, the upper arm of the lever 350 strikes rail 318 and is thrown out of engagemenet with the arm 313. A hook-shaped lower extension of the lever 350 engages a flange 351 depending from rail 318. When, however, a section is withdrawn from the magazine the lever 350 locks the rock shaft 314 and matrix-retaining bar 309 so that the section can be handled independently without spilling the matrices. Thus, when it is desired to remove a magazine section, it is drawn out by means of the hand-lever 316. The first effect of pulling the hand lever is to rock the shaft 314, and raise the cranks. The lever 350 is then moved out positively by the flange 351 until its upper arm stands under the crank, as shown in Fig. 72, thus preventing the rock-shaft from moving backward. The rock shaft thus holds the retaining bar 309 in position under the matrices as shown in Fig. 73. A spring 352 is provided to hold the lever 350 under crank 313 when the magazine section is removed. The magazine sections may thus be removed by simply pulling on the hand lever 316, and they may be replaced by simply pushing them into position in the magazine. It is preferable, however, to have a positive lock for holding the magazine sections in place, and this is provided in the form of a locking bar 353 operated by a lever 354 (Figs. 78, 81 and 83).

*Assembling mechanism.*—Beneath the magazine is a series of fixed channels 355 (Fig. 81) through which the matrices pass when released by the escapement devices to be hereinafter described. In the magazine the matrices are deposited one above another on their sides. The characters being in the ends of the matrices, it becomes necessary to give them a quarter turn on their way from the magazine to the assembler. This is accomplished by the mechanism which will be now described.

Immediately beneath the forward group of channels 355 is a wide carrier belt 356, substantially as wide as the magazine, running on a drive roller 357, and an idler 358, (Figs. 78 to 81 inclusive). On account of the width of the belt it has tendencies to buckle and creep on its rollers, which tendencies are counteracted by making the idle roller in a number of independent sections 358$^a$, 358$^b$, etc. One of the sections may be fast on the shaft 359$^a$ of the roller. It will be evident that the other sections will have very little relative motion on said shaft, such motion being due to any inequalities in the tension of the belt. The belt is preferably provided with a spring pressed belt-tightening roller 360. Above the belt is a series of guide strips 361 which keep the matrices on edge while they are being transported to the funnel. The matrices travel to the rear on the upper side of the belt as indicated by the arrows in Fig. 81. They are given a quarter turn by a guide-plate 362 as they pass around the rear roller 357. The parts 357 to 362 inclusive are duplicated under the rear magazine section and are there indicated by the same reference figures. To provide smooth continuous channels for the matrices as they travel on the carrier belts, grid-bars 363 are placed just above the guide strips 361 to close the opening at the lower end of the fixed channels 355. These grid-bars are not used beneath the front upper and lower case sections, being unnecessary. The grid-bars are each provided with a series of slots 363$^a$ and they are movable longitudinally to bring these slots into register with the corresponding magazine channels when a magazine is operative. When the magazine is inoperative the partitions between the slots 363$^a$ stand below the respective magazine channels and over the spaces between the guide strips 361. The grid-bars are reciprocated by a cam bar 364 having cam grooves 364$^a$ which engage rollers 364$^b$ on the ends of the grid bars. The cam groove 364$^a$ for the forward set of grid-bars is on the lower side of the cam bar and the groove for the rear grid-bars is on the upper side thereof, as shown in Figs. 85 and 86.

The cam 364 is controlled by the devices which control the font changing slide 318. For this purpose the cam bar 364 is connected with the rock-shaft 332$^b$ by means of link 364$^c$, elbow-lever 364$^d$, link 364$^e$ and arm 364$^f$ (Figs. 3 and 78). When the bar 318 is shifted into position to render a certain magazine section operative, the cam bar 364 is simultaneously shifted into position to bring the openings in the grid-bar corresponding to said operative section into registration with the matrix channels thereof.

The matrices are delivered by the front and rear carrier belts to two branches of a funnel $p$ respectively, the forward branch being vertical and the rear branch inclined, and both branches being arranged to deliver the matrices into a common delivery tube 365. The funnel $p$ is suitably connected to the frame at its upper end. Each branch of the funnel is provided with a hinged or removable side plate to permit access to the interior. They are also provided with division plates 366 and with light spring buffer plates 367, the latter being arranged along the inclined edges of the funnel and serving to cushion and protect the matrices as they drop.

Beneath the magazine are a series of escapement bars $q$ (Fig. 84). Each of these bars, as shown, comprises two side strips 368 and a series of intermediate blocks 369, the said strips and blocks being so spaced as to provide channel openings 370 between them through which the matrices may fall. The blocks 369 have projections 371 upon their forward ends which form shelves upon which the rear ends of the lowest matrices in the operative magazine section rest, as shown in Fig. 84$^b$. As previously described, the matrices in inoperative magazine sections rest on the angle bars 309. When the escapement bar $q$ is drawn to the rear the supports or shelves 371 are withdrawn from all of the matrices above the bar. The matrices in the several channels are supported and prevented from falling by the angle bar retainers 309, excepting in the magazine section which happens to be operative. The lowest matrix in this section drops into the cell or opening 370 in the escapement bar and assumes the position shown in Fig. 84$^a$, the said lowest matrix resting on a fixed support and supporting the matrices above it. As the escapement bar moves forward the shelf 371 moves under and supports the matrices in the operative magazine section, and the matrix previously deposited in the bar is dropped onto the carrier belt. It will be seen that a single escapement bar answers for the corresponding channels of all of the magazine sections. The escapement bars are normally held in their forward positions by springs 372, which bear upon elbow levers 373, the vertical arms of which engage notches 374, in the rear ends of the bars. The bars lie close together as shown in plan in Fig. 82, their forward ends extending under a flange or cap plate 375. The escapement bars are operated by a pair of continuously rotating rolls 376, 377, said rolls being provided with pulleys 378 and driven by a belt 379 (Fig. 3). Said belt passes around a pulley 380 carried on a pivoted arm 381 which is under tension of a spring 382 to keep the belt constantly tight. Above the rolls 376, 377, are two series of cams 383 each cam being supported in a vertically sliding cam carrier 384. (Figs. 88 to 93 inclusive). Each cam carrier consists of two side plates 385, 386, suitably spaced apart. Between these plates is a short slide 387 held in place, with freedom for vertical movement, by means of a U-shaped key 388 (Fig. 92). The slide 387 rests upon a spring 389, which spring is supported in the cam carrier. The upper ends of the carriers slide in a suitable guide or comb 390 which is removable to permit of the easy removal of the carriers. The lower end of each side plate 385 has two branches which slide vertically in grooves in guide strips 391. These branches have right-angled portions 392 which slide in the grooves and one of these right-angled portions on each carrier is provided with a shoulder 393 (Fig. 92) to limit the downward movement of the carrier and support it when it is inactive. The lower ends of the escapement rods 394 rest within the carriers and upon the slides 387. The upper ends slide in openings in a plate 395 and stand beneath the horizontal arms of the elbow levers 373 which operate the escapements.

Each cam carrier is provided with a pivoted stop arm 396 which has a projection or shoulder 397 adapted to intercept a projection 398 on its respective cam to stop the revolution of the latter. Beneath the free end of each stop lever is a key bar 399 adapted to be vertically reciprocated by one of the key levers 400 of the key board. As shown, the key lever has a projection 401 which engages a notch 402 in its key bar. Each of the key bars is provided with a shoulder 403 by means of which the bar is supported on the fixed rod 404. A second shoulder 405 prevents the key bar from being raised abnormally. It will be understood that for each key lever there is one key bar, one cam carrier, one escapement rod 394, and one of the escapement bars q.

The operation of the devices above described is as follows: Upon pressing the key, the key bar is raised and the free end of the stop lever, which normally rests upon the key bar, is raised sufficiently to carry the shoulder 397 above the projection 398 on the cam. The cam or eccentric is unequally weighted and as soon as released it begins to revolve and immediately it engages one of the rolls 376, 377, and is rapidly rotated. To facilitate this engagement the roll is preferably covered with soft material, such as rubber, and the cam is provided with a roughened or serrated surface. The rotation of the cam raises the cam carrier, to which it is attached, a slight distance, and then permits it to fall again. At the end of a single rotation the cam is again detained by the stop 397, the stop lever having been lowered in the meantime. The upward movement of the cam carrier is communicated to the slide 387 through the spring 389 and then to the escapement rod 394 which rests on slide 387. The spring takes up the shock of sudden starting and stopping and also provides relief in case the escapement bars should for any reason stick or refuse to operate. It will thus be seen that each time a key lever is operated the corresponding escapement bar is quickly reciprocated by power and returned to its normal position, a matrix bearing the desired character being thereby delivered to the assembling mechanism.

The machine is provided with a series of separators r which are used to separate the words in the assembled line of matrices, and which are automatically circulated from the assembled line back to the point at which they are introduced into the line. A series of the separators in their magazine and in position to be dropped into the assembler are illustrated in Fig. 94. The separators are preferably of the form illustrated in Fig. 102, and are provided with undercut notches, which engage a rib 406 on the separator magazine rail 407. As shown in Fig. 97 the rail 407 has a short gap or opening intermediate its ends which permits of the removal and replacement of separators but does not interfere with their travel upon the rail.

Referring to Figs. 7, 99 and 100, inclusive, 408 indicates a common tube through which the matrices and separators pass to the assembler. The matrices enter the upper end of the tube, which is directly under the funnel p. In the left side of the tube 408 is an opening 409 in line with, but slightly above, the separators on the magazine rail. All of the separators in the magazine are under tension to move to the right, that is, they are constantly spring-pressed against the tube 408 by devices to be hereinafter described. An escapement is provided for permitting the end separators to enter the tube by the opening 409 when desired, constructed as follows: Beneath the separators, adjacent to the tube, is a blade 410, having its upper edge beveled, as shown in Figs. 98, 99 and 100. This blade is part of the yoke 411, which is pivotally hung on an arm 412, which arm is pivoted on rock-shaft 413, mounted in a fixed bearing 414. On the forward end of the rock-shaft is an arm 415, carrying a spring plunger 416, which is normally engaged with a socket 417 on the arm 412, causing said arm to rock with the shaft 413. It is sometimes desirable to permit the shaft 413 to rock without inserting a separator, and in such case the plunger 416 is temporarily withdrawn from the arm 412 by hand. The rock-shaft 413 has an arm 418 which is connected with one of the escapement rods 394. This particular escapement rod is operated from a space-key s (Figs. 1, 3 and 6) exactly as the other escapement rods are operated from the character keys. When the space-key is depressed the shaft 413 is rocked, and the end separator raised until it registers with the opening 409, when it is pushed forward by the line of separators and enters the channel or tube 408, and drops by gravity to the assembling point.

The assembler which arranges the matrices and separators in line is constructed as follows: The matrices and separators drop to the assembling point $t$ (Figs. 99 and 101) in front of a pusher 419, having four motions. That is, said pusher moves downward, then rearward, then upward and then forward, thus pushing forward a matrix and passing under the following matrix. The pusher 419 is one arm of an elbow lever, the other arm 420 being pivoted to the extremity of a pivotally mounted arm 421, with freedom for slight movement thereon. The elbow lever 419, 420 is connected by link 422 to a cam lever 423, having a cam roll 424, which runs in a groove 425 in a cam wheel 426. The cam vibrates the arm 423 continuously. As the cam lever starts forward, to the left the elbow lever is rocked on its pivot and the pusher 419 raised. The arm 421 is under some frictional restraint and the elbow lever is permitted a slight movement independently of the arm, after which it carries said arm with it. The pusher 419 is thus moved first upward and then forward. If a matrix or separator be at the assembling point it will be pushed out of the space $t$ and against a yielding abutment 427. As the cam lever 423 starts on its rearward movement the pusher 419 is first lowered and then drawn back, the operations being the reverse of the upward and forward movements.

Adjacent to the lower end of tube 408 is a vibrating packer 428, carried by cam lever 429 which is rapidly rocked by a series of projections 430 on the cam 426. Packer 428 strikes each matrix in turn and seats them all properly on the assembling way 431.

At the lower end of the chute 408 is a swinging apron 903 pivoted at 904 and forming a continuation of the chute when in its normal position. The apron has three walls corresponding with three walls of the chute, its remaining side being opened to permit the matrices to be moved to the assembling point. The apron 903 serves to guide the matrices accurately and keep them on their feet until they are moved into line by the pusher 419. The apron is free to swing out of the way of the line forwarder after the line is completed.

The yielding abutment 427 is in the form of a slide, movable back and forth in a groove in the head 432 of a slide 433 (Figs. 94, 96 and 101). Slide 433 is mounted in a groove in the front face of a fixed rail 434. On the underside of said slide is a rack, meshing with a gear 435, to which is connected a coil spring 436. The tendency of the spring is to keep the slide 433 in its right hand position, holding abutment 427 close to the assembling point. As matrices are added to the line, however, the slide is forced to the left by the pusher 419.

On the slide 433 is an adjustable block 437, which can be clamped in any desired position by means of a clamping screw 438 to limit the length of the assembled line. The line is limited by the block 437 coming in contact with the latch 439, which is carried on rock shaft 440 (Figs. 94, 99, 101 and 125). On the rear end of the shaft 440 is a lever 441, which is moved in a manner to be presently described, to effect the release of the line when the latter is filled and ready to move to the casting mechanism. On the block 437 is an incline 442, which operates a bell hammer 443 to give warning when the line is nearly completed. When it is desired to make any correction in a line wholly or partially assembled the abutment 427 is moved slightly to the left to release the matrices, and is held in such position so long as desired a clamp 444 Fig. 94).

Sliding in a groove in the rear side of the rail 434 is a slide 445, operated by link 446, lever 447, rock-shaft 448, arm 449, link 450, cam lever 451, and cam 452 (Figs. 1, 2 and 6) on shaft $b$. The slide 445 carries a plate 453, having a cam surface 454 which raises the arm 441 when the slide is moved to the left, thus raising the latch 439 and releasing the abutment 437 from control of said latch (Figs. 94, 101 and 125). This permits said abutment to move to the left in advance of the line. The line is moved to the left by the line forwarder 455 (Figs. 105, 106, 107 and 108), said forwarder being pivotally mounted on the left end of the slide 445. The line forwarder normally stands in position shown in Figs. 98, 105 and 108 that is, to the right of the assembling point and in position to forward the line to the mold. It is arranged to turn upon a pivot 456 and provided with notches which engage with a spring bolt 457 to hold it in either one of two positions. One of these positions is that shown in Figs. 98 and 105 while in the other position the forwarder is out of line with the assembling rail and adapted to be moved to the right in the rear of said rail, as shown in Fig. 107.

In the underside of the separator magazine rail 407 slides a head 458, carrying a pair of spring pawls 458$^a$ which normally press the separators in the magazine against the tube 408. The slide 458 is operated by link 459, arm 460, rock-shaft 461, arm 462, link 463, lever 464, (Figs. 2, 6, 94, 95 and 98) link 465 and cam lever 466, having a roll bearing on the right edge of the cam 452. The spring 467 connecting arm 464 with a fixed arm 467$^a$ tends to hold the cam roller against the cam. Said cam is so shaped that the spring acting through the parts mentioned causes pawls 458$^a$ to follow the line of separators and constantly press them against the tube 408.

In assembling a line of matrices a device to control the justification of the line is adjusted each time a separator is introduced, the maximum adjustment for each line being in proportion to the number of separators in the line. In the present instance, the device which controls the justification is a pivoted bar adjustable angularly in proportion to the number of separators. After the bar is adjusted for a line it is in effect a wedge and it is given a bodily movement which is limited by the shortage of the line. This bodily movement in any case is in proportion to the quotient of the shortage of the line divided by the number of word spaces and it determines the width of the justifying spaces. The construction of this justifying controller and its operation will now be described in detail.

Referring to Figs. 94, 99, 101, 103 and 104, 468 indicates a slide which moves back and forth beneath the rail 434. An angle bar 469 is pivoted to the slide 468 in such manner that one of its edges is radial to and passes through the pivoted point 470. A spring 471 tends to bring the angle bar into parallelism with the slide. On its free end the bar is provided with a curved series of ratchet teeth 472. The ratchet teeth 472 are unequally spaced, the spaces between teeth gradually decreasing from the radial edge. The spacing of the teeth is such that raidal lines passing through them divide a tangential line into equal parts. A pawl 473 pressed into engagement with said rack by a spring 474 tends to hold the rack and angle bar in any position in which they may be placed. The moving pawl 475 of the angle bar is pivoted to the end of an arm 476. A spring 477 holds the pawl in engagement with the ratchet 472. Arm 476 is mounted on rock-shaft 478, driven by bevel gear segments 479 from rock-shaft 480. On said rock-shaft is an arm 481 connected by link 482 with an arm 483 (Figs. 98, 104) on the rock-shaft 413 which operates the separator eseapement. Spring 484, Fig. 103 tends to move the pawl 475 to the left, and it is moved positively to the right by means of the described connections with the separator mechanism and the space-key. When it is desired to introduce a separator into the line without moving the angle bar, the push pin 485 is pushed in while the space key is being operated. The inner end of this pin abuts against a projection 485$^a$ on the moving pawl 475. To throw out both pawls, 473 and 475, the slide 468 is moved rearward against the action of the spring 486, which holds it in its normal position. When this is done, the tail end of pawl 473, engages the fixed wall 487, throwing pawl 473 out of engagement with the ratchet teeth. Pawl 475 has a projection 488, with which pawl 473 engages. In this manner both pawls are simultaneously thrown out, permitting spring 471 to draw the angle bar into its normal parallel position. This rearward movement of slide 468 can be effected by means of a small hand lever 489 (Fig. 94). It is also effected by the movement of the starting lever $u$ as will be presently explained. The starting lever $u$ is situated at the right and in front of the machine in a convenient position. After each line is completed this lever is pushed down from its normal position to measure the line and set the justifying mechanism and then raised and pushed upward slightly above the normal position, the latter movement being to start the machine and restore the angle bar to its initial position in order to receive a setting for a new line. The lever $u$ is connected by link 490 with arm 491 on the rock shaft 492. A second arm 493 on said shaft is connected by link 494 with arm 495 to a second rock shaft 496 (Figs. 3, 8, 11, 14, 94 and 103). Shaft 496 is connected with the angle bar slide 468 by sector gear 497 pinion 498 and gear 499, the latter gear meshing with a rack on the slide 468. It will thus be seen that the downward movement of the starting lever effects a forward movement of the justifier slide. This forward movement of the slide continues until the outer or right edge of the angle bar 469 engages the left inner edge of the block 437. The position of the block 437 at this time depends upon the matter in the line, that is, the combined thickness of the separators and matrices which have been assembled. The matrices, it should be understood are of different thicknesses, the thickness of each matrix being equal to the space which its type or character should occupy in the line. The position of the block 437 therefore is different for the different lines and in each instance depends upon the amount of matter in the line, or the difference between that amount of matter and the desired length of lines, which difference may be termed the " shortage " of the line. The forward movement of the angle bar slide sets the justifying mechanism to cause proper spaces to be cast on the logotypes.

It is necessary that the angle bar slide should be immediately returned to its initial position in order that the assembling of the matrices for the next line should not be delayed. When the starting lever is raised the justifier slide is therefore returned and by giving the starting lever a slight upward movement beyond its normal position the angle bar slide is moved rearward beyond its normal position, causing the pawls to be disengaged from the ratchet of the angle bar, as hereinbefore explained, with reference to Fig. 103, and permitting the angle bar to be restored automatically to its initial position parallel to the slide.

The rock shaft 492 carries a short arm 500 (Figs. 7, 11 and 14) which abuts against a horizontal link 501 connected to the lower end of a vertical lever 502. The upper end of this lever is connected by a link 503 with an elbow lever 504. The elbow lever 504 operates to withdraw a spring latch 505 from the end of clutch lever 506. The latter lever when engaged with the latch maintains its clutch $v$ inactive. When lever 506 is released, however, the spring 596 within the shaft $b$ throws the clutch in operation (Fig. 127). There are two unequally spaced latches 505 hinged to the disk 508, which disk is fixed on shaft $b$. Each of these latches is pressed outward by a spring 509 and near its outer end is a slot or notch having an inclined edge 602. As the shaft revolves this inclined edge engages the end of the lever 506 and draws it inward toward shaft $b$ thus throwing the clutch $v$ out of operation. As disk 508 has two of these latches it will be evident that the shaft $b$ will be automatically thrown out of operation after each partial rotation. The various operations performed by shaft $b$ will be recapitulated hereinafter.

On shaft 496 is loosely mounted a sector gear 510, upon which is a pin 511. Fixed on shaft 496 adjacent to the sector gear is an arm 512 adapted to engage with the pin 511 and turn the sector gear when the shaft 496 is turned in the direction for moving forward the justifier slide. The sector gear 510 meshes with pinion 513 on a shaft 514. Upon said shaft is also a gear 515, which meshes with the teeth on a sliding rack 516 (Figs. 109, 110, 111 and 112). The rack 516 is in mesh with a pinion 517, mounted in a sliding yoke 518, which is adapted to slide in guides upon a sliding carriage 519, the carriage 519 being movable in guides upon the main frame. The yoke 518 carries a plunger 520 which is threaded to correspond to an internal thread in pinion 517. The plunger 520 is cylindrical and is prevented from turning by a rib or feather which engages the yoke, and consequently as the pinion 517 turns the plunger is moved one way or the other. The amount of movement of the plunger, as will be seen, must be in proportion to the amount of movement of the angle bar slide, that is, it is determined by the shortage of the line and the number of separators in the line. The movement of the plunger for any particular line should be equal to the width of justifying spaces which are to be cast upon the logotype of that line. As shaft 496 is rocked forward and then immediately backward means must be provided for holding the slide 516 and its connected parts in position for justifying the line until the logotypes requiring justifying spaces have been cast. A spring 521 acting through pinion 522 and rack 516 (Figs. 109 and 114) tends to return said rack to its initial position. When the rack is moved forward it is prevented from returning by a spring pawl 523 which bears frictionally upon its upper surface. Above the pawl 523 is a lever 524, which is depressed in a manner to be hereinafter described, to release the slide and its connected parts and permit them to return to normal position. A foot 524$^a$ prevents abnormal displacement of lever 524 (Fig. 114).

In measuring the shortage of the line with the angle bar the actual shortage, minus the combined thickness of the separators in the line, is really measured. The mechanism above described would set the mold for casting a space which is, therefore, too small by the thickness of a separator and it becomes necessary to give the body piece a second and constant adjustment to allow for the thickness of a separator in casting each of the words of a line excepting the last one. This adjustment is effected as follows: Below the yoke 518 is a threaded stud 525, turning in a threaded opening in carriage 519. The stud 525 has a collar 526, which engages a groove in the lower edge of yoke 518. On the outer end of stud 525 is a sector gear 527 which is in mesh with a second sector gear 528. (Figs. 110, 111 and 112.) To a pin 529 on said latter gear is connected a rod 530, which carries in its upper end a roll 531. The roll 531 is normally drawn up into the path of slide 445 by a spring 532. As the slide 445 moves to the left to carry a line of matrices to the mold it presses down the roll 531, turning the screw stud 525 and causing the yoke 518 and its connected parts to move to the left, thus increasing the amount of space to be cast on the logotype, as will be presently explained. The rack 516 and the sector gear 528 and pinion 517 are broad, that is, they have long teeth, and they remain in mesh during the movement of slide 519.

The mold is provided with a movable liner or body piece, 533 (Figs. 109 and 111). The right end of the blade is locked to the slide 519 by a spring bolt 535. A sliding rod 536 carries a claw 537 which engages a pin 538 on the bolt 535. A handle 539 is provided on the rod 536 for withdrawing the bolt to release the liner. On the lower edge of the liner are teeth which engage a pinion 540. This pinion may be turned by a knob 541 (Fig. 112), to remove the liner when it is unlocked. Above the liner 533 (Fig. 111) is mounted the movable jaw 542 of the matrix clamp which is integral with a slide 543. This slide is normally held down upon the liner and mold by springs 546 (Figs. 115 to 117). In its rear end is a slot 544, into which engages a toe 545, upon the carriage 519. When the mold has been adjusted to cast a logotype the rear end of the slide 543 is in contact with a small spindle 520ª within and carried by the plunger 520. The spindle 520ª is threaded and removably screwed into the right end of plunger 520. In the normal operation of the machine the spindle 520ª is in the position shown in Figs. 110 and 111 with its head 520ᵇ abutting against the plunger 520. When it is desired to cast a word of greater length than the length of the mold the matrices for the word are assembled in two groups with a separator between them and two-half logotypes are cast. In such cases the intermediate separator is not counted in setting the justifier angle bar, and the first half-logotype is cast with the spindle 520ª retracted until flush with the end of the plunger 520. The shoulder 544 of jaw 542 abuts on the toe 545 and the half-logotype is cast without any space. The spindle is then restored to normal position and the second half-logotype is cast with the usual space. In this manner words of any length greater than that of the mold may be cast. After a logotype is cast the slide 519 and its connected parts are moved to the right to release the matrices and allow them to be raised out of the jaw after which the slide 519 and connected parts are moved to the left to eject the logotype from the mold 547. To prevent the movable jaw 542 from coming in conflict with the knives which shave the logotypes the lower part of said jaw is made relatively movable and means are provided for preventing it from interfering with the knives. This lower part consists of a slide 877 arranged between the liner and the jaw proper 542. Pivoted in standards 878 on the slide 877 is a hook 879 which is adapted to engage the pin 880 on the rear ends of the jaw 542. When the jaw and liner are moved to the left, an arm 881 of the hook 879 engages a fixed stop 882 and the hook is thus thrown out of engagement with pin 880 and the slide 877 prevented from moving farther to the left, without interfering with the movement of the jaw 542. When the jaw is returned to the right, it strikes the standards 878 and carries the slide 877 along with it. A spring 883 reengages the hook with the pin 880. A spring abutment 884 is preferably provided to lessen the shock of stopping the jaw. The slide 519 is moved to eject the logotype after each casting operation by means of link 550, cam lever 551 and cam 552 on shaft c (Figs. 8 and 112).

The line of matrices and separators when assembled is moved to the left by the line forwarder 455 until the forward end of the line encounters the head or clamp 843 of the slide 844 which is spring-pressed toward the right, (Figs. 111, 113, 122 123 and 124). Slide 844 is controlled by a lever 845 having a pin entering a yoke or notch in said slide. A spring 846 is connected to an arm of lever 845 and tends constantly to move the slide to the right. The line forwarder overpowers the yielding clamp 843 and the matrices of the first word are carried into engagement with the presentation slide while gripped between the forwarder and the said clamp. Clamp 843 is then immediately moved to the left of the presentation slide and out of its path as follows: As the presentation slide 570 starts to descend a shoulder 847 on said slide immediately engages a short arm 848 of lever 845 and throws the slide 844 to the left. The clamp 843 repeats this operation for each word in the line, thus insuring the proper delivery of the matrices to the presentation slide and preventing them from being canted or otherwise disarranged. The matrices are supported in the presentation slide by the rib 553 on the lower end thereof. The movement of the line to the left is limited by the first separator engaging the presentation slide, the lugs of the separator projecting beyond the matrices and being thereby prevented from entering the space into which the matrices enter. The first separator strikes the end of the trip bar 554 connected to a lever 555 (Figs. 8 to 14 inclusive). A link 556 is connected to the rear end of lever 555, the opposite end of said link being supported by a swinging rod 855 to which a spring 856 is connected which holds the link 556 normally in its left hand position. On the free end of link 556 is a spring pawl 857 which rocks an elbow lever 858 when a separator strikes the trip-bar 554. One arm of the lever 858 is connected by a rod 859 like lever 860, which carries a stop projection 861. Adjacent to the lever 860 is an arm 862 carrying a cam disk 863, which is so weighted that it tends to rotate into engagement with a constantly running roll 864. The cam is normally prevented from engaging the roll 864 by the stop 861, which intercepts a projection on the cam. When the lever 860 is raised, cam 863 rotates by gravity into engagement with roll 864 and said roll continues to engage the cam until the latter makes a complete revolution and is again stopped by the projection 861. The pawl 857 rocks the elbow lever 858 a sufficient distance to release the cam 863 and then passes the lower end of the elbow-lever leaving it free to return instantly to its normal position, thereby immediately replacing the stop 861 in the path of the projection of cam 863. Cam 863 is thus permitted to make but one revolution at a time. It will be seen that the operation of cam 863 is similar to that of the case-key-cam 335 and also similar to the operation of the key-board cams 383 previously described. A link 865 connects the arm 862 with a latch 557, the rotation of cam 863 thus serving to raise latch 557, permitting spring 557ª to rock shaft 557ᵇ and throw back the latch 558, which retains the clutch lever 559 in position to hold the main clutch open (Figs. 6, 8, 9, 111 and 113). When the clutch lever is released a spring 560 within the shaft a forces a rod 561 within said shaft to the left, operating toggle arms 562, which operate clutch shoes 563 and connect shaft a with the drive pulley 100. The rod 561 is connected with a collar 565, which bears on the clutch lever 559 (Figs. 6 and 129). The shaft a is thus started and it continues to turn until the casting cam shafts c and d have made a full revolution, at the end of which time the latch 557 engages the end of the clutch lever 559 and rocks said lever to throw out the clutch, the said latch 557 having an inclined surface which engages the lever and draws it radially inward toward shaft a. Shaft a is in gear with shaft c and shafts c and d are geared together (Fig. 11). As shaft d rotates cam lever 566 is rocked vertically by cam 567, the lever being held in contact with cam by spring 568. The lever 566 is made in two parts, connected by spring joint 569, so that it may yield in case the presentation slide becomes jammed (Fig. 134). The presentation slide 570 is connected to the forward end of the lever by link 571. The first movement of the presentation slide carries the matrices of the first word downward into proximity to the mold 547. As the presentation slide moves down the slide 519 moves to the left, causing jaw 542 to compact the matrices against a jaw 573 upon the opposite side of the mold. The matrices are then given a further downward movement to press them against the face of the mold. As the slide reaches this position the foremost separator is pushed into a recess 572 in the slide, which recess is equal in depth to the thickness of the separator (Figs. 111 and 113). As the presentation slide rises after the logotype is cast (the longitudinal pressure on matrices being relieved by the return of jaw 542) it stops first with its rail 553 opposite a fixed rail or rib 575, which is in line with the rib of the elevator when the latter is at its lower station. A slide 576 (Figs. 1, 2, 99, 111, 113) arranged within the rail 434, then moves to the left and pushes the matrices from the presentation slide onto the fixed rib 575. Slide 576 is operated by link 577, arm 578, rock shaft 579, arm 580, link 581, cam lever 582 and cam 583 on the elevator cam shaft e. The cam 583 has three depressions equally spaced on its edge, two of these depressions being sufficient to move the matrices onto the fixed rail 575 only, while the third depression, being deeper, moves the matrices over the rail 575 and onto the elevator (Figs. 1, 2, 8 and 11). The cam shafts c and d are geared to run at the same speed and the elevator shaft e is geared to run at one-third of the speed of the shafts c and d, hence for each revolution of shafts c and d the shaft e makes one-third of a revolution. The lower elevator station comprises two rails 108ª having beveled faces against which the elevator head 108 fits. Upon the rails 108ª are guides 109ª and on the rear rail is a cam arm 115ª upon which the cam roll 115 runs to guide the elevator properly into the station. (Figs. 18, 21 and 22).

The presentation slide 570 comprises two relatively movable parts. One of these is the slide proper and the other is a hinged portion 849 (Fig. 113). The two parts are normally pressed apart by a spring 850 which holds their lower ends sufficiently apart to permit the matrices to enter the recess 851 freely. The construction of the joint between the two parts prevents the jaws from opening unduly. The lower end of the hinged jaw 849 is slightly beveled and as the presentation slide moves into the vicinity of the mold this jaw engages a fixed incline 852 which brings the jaws together and correctly alines the matrices at the time they are presented to the mold. When the presentation slide is in its uppermost position the separator in the recess 572 registers with the rib 406, upon which the separators are reconveyed to their magazine. The separators are then ejected from the presentation slide onto rail 406 and beyond a retaining pawl 406ª by a pusher 584 (Figs. 111, 121, 122, 123). This pusher is connected to a lever 585 pivoted to a standard 586, in which the presentation slide works. As the presentation slide moves down an incline 587 on said slide engages a roll 588 on lever 585 and draws the pusher 584 to the left. When the pusher is withdrawn it is held in such position by a latch 589. When the presentation slide reaches its uppermost position it strikes a pin 590 on the latch 589 and releases the lever 585, permitting a spring 591 to throw said lever and its connected pusher 584 to the right, carrying the separator onto the rib 406 and beyond a spring catch 591, which prevents the return of the separators. The operations above described are repeated for each word in the line, and the matrices and separators are thus returned to their magazine. As each new line of matrices is moved to the presentation slide the pawls 458ª move to the left and then to the right carrying the separators of the preceding line to the separator magazine. After each third word is cast the elevator rises and carries the matrices which have been accumulated to the distributers. As the line preceder 427 reaches the presentation slide it is withdrawn from in front of the line by a pin 833 on arm 834, said pin engaging the notch 835 in the preceder slide (Figs. 94, 98, 105, 106, 107, 113, and 123). The arm 834 is rocked by means of arm 836, link 837, rocker arm 839, cam arm 840, and cam 841, said cam being connected with the arm 460 which operates the separator gathering slide 458. Immediately when the preceder 427 is released from the line it is returned to its initial position by the spring gear operating the slide 433. During its travel back the slide 427 is returned into the path of the succeeding line of matrices by contact with a fixed incline 842 (Figs. 98 and 107). The preceder 427 is thus returned to its initial position against the succeeding line of matrices as illustrated in Figs. 105 and 107. After the line forwarder 455 has pushed the last group of matrices into the presentation slide it is carried back to its initial position by the arm 447. In making this movement it has to pass around, and into the rear of the matrices which have been assembled for the succeeding line. As it begins its backward movement it strikes the cam edge of a spring 843 and is thrown out of the path of the matrices as illustrated in full lines in Fig. 107. It is held in this position by the spring bolt 457 (Fig. 108) until it reaches the end of its travel at which point it engages a spring projection 844 which throws it back into its normal position in the rear of the assembler as shown in Figs. 99, 101 and 105. When all the logotypes but the last one have been cast they are measured and the mold is set to cast a logotype which will exactly fill out the line to the desired length. Theoretically the last logotype should be equal to the combined width of the matrices of the last word, but in practice it is expedient to cast spaces on the logotypes, excepting the last one, which are slightly less in width than the average or normal justifying space. This practice will leave a slight deficiency in the length of the line, which is supplied by casting a space on the inside of the last logotype. Should the justifying spaces on the logotypes be of the full width required the last word would be cast without any space. The mechanism for performing this "final justification" will now be described.

Mounted in the standard 586, and in the path of the line forwarder 455 is a slide 592 (Figs. 113, 121 and 122). When the matrices of the last word enter the presentation slide the line forwarder engages slide 592 and moves it to the left, rocking its connected lever 593 (Figs. 6, 8 and 11). Lever 593 operates through link 594, normally drawn to the left by spring 594ᵃ, to rock a lever 866 on the short arm of which rests a pin projecting from a rocking arm 867 (Figs. 8 to 14 inclusive). The arm 867 is connected by a link 868 to an arm 869 above the shaft 844. The arm 869 carries a stop which controls the cam 870 connected to an arm 871, the parts 869, 870 and 871 being constructed and operated exactly like the parts 860, 863 and 862 respectively. The arm 871 is connected by a link 872 with latch 595 and operates to raise the latch, permitting spring 595ᵃ to rock elbow lever 595ᵇ. Lever 595ᵇ through link 503ᵃ and lever 504ᵃ operates the latch 505, releasing the clutch lever 506, which controls the clutch $v$ (Fig. 127). The clutch $v$ like the main clutch, is operated by a spring 596, which tends to move the shoes 597 radially outward by means of elbow levers 598. The levers 598 are connected to a collar 599, which is fast on a rod 600, sliding within the shaft $b$. Rod 600 is connected with the sliding collar 601, upon which the elbow lever 506 bears (Figs. 11 and 127). The shaft $b$ is thus started and makes part of a revolution and it is again stopped by one of the latches 505, said latches having inclined surfaces 602, which rock the lever 506. As the shaft $b$ rotates its first effect is to return the line forwarder 455 to its initial position. During the return movement of the line forwarder the plate 453 rides over and depresses the rear end of lever 524 (Figs. 101 and 114) thus releasing the slide 516 and permitting it to partially restore the mold adjusting devices to their initial or normal positions. The plate 453 has reverse inclines 453ᵃ and 453ᵇ on its ends causing it to ride under the lever 524 in moving to the left and over said lever in moving to the right. The next effect of the return movement of the line forwarder is to release the vertical slide 530 permitting the spring 532 to restore the slide 518 to its right-hand or normal position, thus completing the restoration of the mold adjusting devices to normal position ready to be set for a new line. As the shaft $b$ continues to rotate a cam 603 (Figs. 2, 4, 11, 15 and 16) operating through lever 604, link 605, arm 606 and rock shaft 607 throws out clutch lever 608. On the left end of shaft $c$ is a clutch disk 609 adjacent to a loose gear 610. The disk 609 carries a bolt 611, which can be thrown into and out of connection with a notch 612 in gear 610, (Figs. 16 and 17). A cam lever 613 is pivoted on the hub of disk 609 and engages the bolt 611. The lever 613 throws the bolt in or out by engagement of the arm 608 with the cam surfaces 614. A spring 615 tends to hold the lever at either extreme of its movement. The lever 608 is operated to throw the bolt 611 into the notch 612, while the shaft $c$ is at rest. Immediately after the shaft $c$ is started, as will be presently explained, it makes one revolution during which time the gear 610 is carried around with it. Before the completion of the revolution, the arm 608 is moved to the right, and as the gear 610 revolves the lever 613 rides up on said arm, withdrawing the bolt 611. The spring pawl, 616, carried by the arm 608, springs into the notch 612 and stops the gear 610, as the bolt is withdrawn. A cam 617 on shaft $b$ (Fig. 11) operates through an elbow lever 618, link 619 and lever 620 to move the latch 558, which holds the starting lever 559. The shafts $c$ and $d$ are thus started and they make a complete revolution. This takes place immediately after the clutch lever 608 is operated as above described. The gear 610 drives the gear 621, which is fast on the shaft $f$. The shaft $f$ is in line with shaft $d$, but independent thereof, as indicated in Fig. 16. On shaft $f$ are the cams which effect the final justification of the logotypes for each line.

Referring to Fig. 130, 622 indicates a line of logotypes complete, excepting the last word. In slide 623 is guided a rack 625 upon the right end of which is a measuring gage 624. The rack 625 is normally forced to the right by a spring gear 626, carried on the slide 623. Slide 623 is controlled by link 627, cam lever 628 and cam 629 on shaft $f$ (Figs. 8 and 11). At the proper time the measuring gage 624 is moved by the arm 628 into contact with the partial line of logotypes 622, as shown in Fig. 130. The right end of the line of logotypes is against a fixed abutment, which, as shown, is the inner end of the right wall, 630 of the galley 631. The position of the gage is used to determine the width of the mold for casting the last word. For this purpose a stop 632, in the form of a rod, is carried by the slide 623 (Figs. 94 and 130). The stop 632 is in alinement with the portion 633, of the vise jaw 542. Before the vise jaw is moved to the left against the matrices and after the gage 624 has been adjusted, the slide 623 and its connected parts are clamped by a pin 634, which is operated by a lever 635, link 636, cam lever 637, and cam 638 on shaft $f$. The vise jaw 542 is then moved against the stop 632 and the liner 533 moves with it and remains flush with it; no justification being provided for at this time by the ordinary justifying devices. The left hand vise-jaw 573, of the matrix clamp is then moved to the right to compact the matrices and close the mold. The extent of movement of jaw 573 is equal to the amount of space to be cast on the last logotype. The jaw 573 is moved by eccentric 639, rock shaft 640, arm 641, link 642, arm 643, rock shaft 644, cam arm 645 and cam 646 on shaft $f$ (Figs. 4, 6, 8, 11 and 111). While the parts are in this position the last logotype is cast. The jaw 573 is held against the mold by the presentation slide. A spring 647 within a thimble connected to jaw 573 lifts said jaw, when the presentation slide is raised to permit the logotype to be ejected. After the casting operation the completion of the rotation of shaft $f$ restores the measuring gage 632 to its normal position, ready to be brought into operation at the end of the succeeding line. A stop 648 (Fig. 130) is provided for limiting the movement of the gage rack 625 to the left. Stop 648 is adjustably held by the clamping screw 649 and should be adjusted to the exact length of line which the machine is to produce. On the end of rack 625 is a depending lug 625$^a$ which coöperates with a stop 623$^a$ on slide 623 to limit the movement of the rack to the right. When the presentation slide rises, the left hand vise-jaw 573 also rises, and its end would swing in the arc of a circle and tend to jam and injure the matrices if means were not provided to withdraw it toward the left simultaneously with the rising of the presentation slide. Devices are therefore used to quickly withdraw the jaw 573 as the presentation slide begins to rise. As shown in Figs. 94, 94$^a$ and 98 a segment gear 898 on the rear end of shaft 640 meshes with a similar gear 899 which is connected with a cam-lever 900. At the moment the presentation slide begins to rise, the cam-lever is rocked by a cam 901 on gear 902. The rocking of the cam-lever 900 turns the shaft 640, and the eccentric 639 on said shaft withdraws the vise-jaw 573 sufficiently to prevent it from interfering with the matrices as it rises.

*The mold.*—The mold opening is adjustable both as to the width of body and as to position of body with reference to the faces of the type. Referring to Fig. 109, the front mold section 650 is constantly pressed by a spring 651 into contact with an adjusting screw 652. Screw 652 is turned by means of a handle 653 which carries a spring plunger or detent 654, adapted to engage with any one of a series of holes in circular plate 655. Said holes correspond to the positions which the handle 653 must occupy when the mold is set for different fonts of type, such as pica, brevier, etc., as well as to the different positions of the type faces with respect to the type bodies. The rear mold section, 656, is adjustable toward and from the front mold section. For this purpose it is engaged by a lever 657 pivoted at 658, and having an arm 659, which engages the end 660 of an adjusting screw 661. To adjust the mold, screw 652 is first set for the particular font to be used, and the screw 661 is then turned until section 656 comes in contact with the liner 533, care being taken to permit a working fit between the liner and the mold section. The spring pressed plunger 662 tends to move the section 656 away from the liner. When the matrices are in position for casting and the liner is adjusted a mold gate 663 is moved across the open end of the mold. A wedge 664 then moves against the back of the gate and closes the same tightly and a clamp 665 is then moved against the portion 656 to clamp the mold section and the liners close together. The gate 663 is operated by link 666, cam lever 667 and cam 668. The wedge 664 is operated by link 669, lever 670 and cam 671. The mold clamp 665 is operated by lever 672, link 673, cam lever 674, and cam 675 (Figs. 8, 11, 109 and 111). To the forward mold section is rigidly connected a trimming knife, 676, and a second trimming knife 677 is connected to a movable shank 678. A spring 679 tends to move the latter knife forward. To adjust the rear knife the liner is moved between the knives, and the spring 679 permitted to press the rear knife against it. A clamping screw 680 (Fig. 121) is then turned down, causing a pin 681 to bear upon the shank 678 and clamp the same in position. The knives will then be located properly to shave the logotypes as they are ejected from the mold by the liner.

*The pump.*—Referring to Figs. 131 to 134 inclusive, 682 indicates the melting pot, which is suitably supported in a casing 683. Beneath the pot is a gas burner 684. Casing 683 is carried on arm 685 and arranged to be swung horizontally on a pivot 686, so that the melting pot may be moved away from the mold and into position where it may be readily inspected. Within the melting pot is a vertically movable pump body 687 guided and supported by two pairs of parallel bars 688, which are pivoted to the pot. A vertical movement is imparted to the pump body by means of link 689, lever 690, link 691, cam lever 692 and cam 693 on shaft *c*. The pump cylinder 694 is in the lower part of the pump body. Openings 695 permit the metal to flow freely into the lower part of the cylinder. Within the cylinder is the piston or plunger 696, which is operated at proper intervals by lever 697, link 698, lever 699, link 700, lever 701 and cam 702 on shaft *c*. The cams are so shaped that the pump plunger first moves slightly upward to close the openings 695, the pump and plunger then move together until the nozzle 703 of the pump closes the jet plate, after which the pump plunger is given a quick upward movement to drive the molten metal into the mold.

Between the pump and the mold is a jet plate 704, having a tapering opening which registers with the mold during the casting operation. The jet plate is reciprocated between the mold and a jet ejector 705 by a link 706, cam lever 707 and cam 708 on shaft *c*. Beneath the jet plate is a nozzle plate 709, which is reciprocated by link 710, cam lever 711 and cam 712 on shaft *c*, (Figs. 8 and 134). The jet ejector 705 is in the form of a vertical slide or plunger, carried by lever 713, which is operated in one direction to hold the ejector raised by a spring 714. The slide 704 having the jet orifice is first brought to register with the ejector 705 after which slide 709 moves forward and the end of the slide 709 strikes the lower end of lever 713, causing the ejector to move down and push the type metal from the jet opening through the opening 715 into the melting pot. These operations take place in the following order: The pump nozzle is raised while the opening in slide 709 is in register with the pump nozzle. The jet opening is then brought into register with the mold and nozzle and the pump operated. After the metal is injected into the mold the jet slide 704 is first moved slightly forward to trim the logotype and to cut off communication between the pump and the mold. The pump is then returned and both slides 704 and 709 moved forward to cause the ejection of the jet from the jet slide. The upward movement of pump body and pump plunger are effected by means of springs connected to the levers 692 and 701, as shown in Fig. 134. The movements of the slides 704 and 709 are positive in both directions, being controlled by cam grooves.

If the pump is operated when the matrices are not properly clamped together and tightly seated upon the mold, the mold will not be properly closed and the type metal which is injected under pressure will escape, causing delay to the machine and possibly injury to the operator. To obviate this trouble the opening in the jet-slide 704 is not permitted to register with the pump nozzle excepting when the matrices in the presentation slide are clamped tightly together and pressed tightly against the mold. This is accomplished by mechanism illustrated in Figs. 118, 119, 120 and 134 which will now be described. When the jet-slide moves forward after the casting operation it is prevented from returning by a detent 885 which is pivoted on the lower end of a vertically moving slide 886, which detent is not permitted to rise until the matrices are properly adjusted to the mold for casting. Slide 886 drops by gravity when the presentation slide is raised and the jet slide moved forward. A locking bolt 887 is then drawn over the upper end of the slide 886. This locking bolt is connected to a lever 888 which is pivoted at 889 to a second lever 890 having a fixed pivotal point 891. The bolt 887 is normally held over the slide 886 by a spring 892. As the presentation slide descends, a cam surface 893 engages a projection 894 on lever 890 and draws a finger 895 on the lever 888 into the presentation slide. When the matrices are properly clamped at the left side of the presentation slide, as shown in Fig. 118, said finger will be forced to the left, swinging the lever 888 about the pivot 889, which is now fixed, and throwing the bolt off of the detent slide 886. The detent slide is now free to be raised by a lever 896, the longer arm of which is connected to the slide while the shorter arm lies in the path of the presentation slide, as shown in Fig. 119. As the presentation slide moves down it rocks this lever and raises the detent 885, the parts being so proportioned that when the slide is moved to its lowest position, seating the matrices firmly on the mold, the detent will free the jet-slide 704 which is under tension at this moment to move into registration with the mold. If the matrices are not clamped at the extreme left side of the presentation slide, the bolt 887 will not permit the detent to rise and if the matrices are not seated on the mold the lever 896 will not raise the detent. In either case the jet slide 704 will cut off communication between the pump and the mold and prevent what is commonly known as a "squirt." A spring 897 permits the detent to yield in one direction and prevents wear upon the jet-slide.

As shown in Fig. 133 the opening in the pump nozzle is substantially circular at its inner end 716, and from this point it flares outward in one direction and inward in the direction at right angles thereto until it terminates in a narrow slit 717 at the upper end. The cross section of the opening decreases toward the outlet, being about two-thirds less at the outlet 717 than it is at the lower end 716. The nozzle is surmounted by a cap plate having a slit corresponding to the opening 717 and said cap plate is beveled at its outer edges to fit the opening in the nozzle plate. A fixed stop 718 (Fig. 134) is provided to aline the opening in the nozzle plate with the nozzle of the pump. The link 710 is provided with a pin-and-slot connection with the lever 711 and the link and lever are also connected by a spring 719, thus permitting the slide 709 to be spring-pressed against the stop 718.

The mechanism for assembling the logotypes in lines and transmitting them to the galley is illustrated in Figs. 137 to 143 inclusive. Referring to these figures 720 indicates a T-shaped plate which is adapted to slide on the supporting bracket 721. The plate 720 has at its right side a spur 722 which interlocks with a notch in the forward mold section 650. The plate 720 is thus adjusted with the forward mold section and always bears the same relation to said section. On the under side of the forward end of the plate or slide 720 is a pin 723 with which a spring hook 724 on the under side of the galley engages when the galley is pushed into its operative position, as shown in Figs. 137 and 138. By reason of the connection of the galley with slide 720 the inner end or mouth of the galley always registers with the inner face of the mold section 650. The galley is locked to the machine solely by the hook 724 and it may be disengaged in a moment when it is desired to unload the type contained in it. Within the galley is a sliding block 725 which recedes as the lines are moved into the galley mouth and supports the lines in vertical position. As a means for adjusting the width of the galley, a bar or rod 873 is provided, arranged within and parallel with the galley. At its outer end this bar has an elongated eye or hub 874 which surrounds a threaded rod 875 attached to the side walls of the galley by means of a pair of thumb nuts 876. The bar 873, which really forms one side of the galley may be adjusted and locked in any desired position. By connecting the bar 873 to the galley at its outer end only, the inner end is rendered more or less flexible, which is found to be preferable to having both sides of the galley rigid, as lines which vary slightly as to length may be more readily introduced. The galley mouth is provided with a pair of jaws, one above and one below, which serve to retain the lines within the galley in proper position and which form guides against which the logotypes are assembled into lines. The upper jaw 726 is carried by pivoted arms 727, and the lower jaw 728 is carried by pivoted arms 729. The arm 727, 729 are connected by segment gears as shown in Fig. 138 and one of the arms 729 has a rearward extension 730 which is moved in one direction by spring 731 to close the jaws and is periodically moved in the other direction to open the jaws by a cam projection 732 upon a slide 733. Slide 733 is operated by link 734, arm 735, and cam 736 connected to gear 610 on shaft $c$, the arm 735 having a pin 737 which carries a roll 738 bearing on said cam. A spring 739 holds the roll in contact with the cam. After each line is completed the slide 733 is moved forward and its cam opens the jaws at the galley mouth, causing the lower jaw to register with the bottom of the galley. At this moment the line is pushed into the galley by a pusher 740 which is operated by a spring link 741, arm 742, rock shaft 743, spring 744, arm 745 and cam 746 on shaft $f$. The pusher 740 is given an independent forward movement after each logotype is cast to shift the logotype over against the jaws at the galley mouth. This independent movement is imparted by a cam 747, on shaft $d$, operating through lever 748, link 749, and a hook 750. Hook 750 is interlocked with the pusher and it draws the pusher back compressing the spring link 741 when a word is being ejected from the mold. After the word is opposite the galley the spring link is permitted to expand and the pusher moves the logotype against the jaws at the galley mouth, as will be more fully explained hereinafter. A pin-and-slot connection between the link 749 and the lever 748 permits the pusher to be moved forward by the link 741 to transfer the line to the galley. A spring 751 connects the lever 748 with link 749 and a spring 752 presses the roll of lever 748 against its cam 747.

As illustrated in Figs. 137 to 146 inclusive the logotypes are ejected from the mold by the liner or body pieces 533, which liner follows each logotype until it has passed the knives 676, 677 and the entire logotype has passed the right wall 630 of the galley. The logotypes then rest on the assembling rail 754. When the first logotype has reached this position the pusher 740 advances and moves the logotype over against the jaws or rails 726, 728. While in this position the logotype is partly in front and partly in the rear of the end of the wall 630 of the galley, as illustrated particularly in Figs. 137 and 146. In the former figure a single logotype is shown in dotted lines in the position in which it is left by the liner 533, and in full lines in the position in which it is left by the pusher 740. As the second logotype is ejected from the mold it engages the rear end of the first logotype and pushes the same to the left. The pusher 740 then moves the second logotype into line with the first. In like manner each succeeding logotype moves those preceding it to the left until a complete line is formed. The slide 733 then advances and the cam 732 opens the jaws 726, 728, the lower jaw moving down until its upper surface registers with the bottom of the galley. The pusher 740 then moves forward carrying the line into the galley and the jaws 726, 728 immediately close to retain the line in upright position in the galley.
The jaws at the galley mouth serve to form one side of an assembling channel in which the logotypes are assembled and they also serve to sustain the lines of logotypes in the galley when the galley is removed from the machine. When it is desired to eject the assembled matter from the galley a thumb screw 755 is turned to open the jaws 726, 728. The matter may then be ejected by the slide 725.
In Figs. 144 and 145 is illustrated a mechanism by means of which the nozzle 703 of the pump is cleaned after each logotype is cast. Referring to these figures 756 indicates a wiper which is carried by a slide 757 and normally drawn to the left, away from the pump, by a spring 758, being held against a stop 759. A shoulder 760 on slide 709 engages a roller carried by a sector gear 761. An intermeshing sector gear 762 is connected with the slide 757 by an arm or lever 763 and a link 764. As the slide 709 advances it rocks the sector gears and draws the wiper 756 to the right causing it to scrape over the nozzle of the pump and to remove any surplus metal which may have gathered on the nozzle.

On the cam shafts $b$ and $d$ equalizing or compensating cams are provided for the purpose of equalizing the strains upon the driving gear which are produced by the several cams. Many of the cams at some parts of their revolution tend to retard the cam shafts and at other periods tend to assist them. The resultant of these retarding and assisting effects tends to give the shafts irregular or jerky movements and also imparts unequal strains to the driving mechanism and unequal resistance to the motive power. To remedy this trouble the cam shafts are provided with compensating or equalizing cams which are complementary in their effects to the resultant effects of all other cams on the shafts. Referring to Figs. 11, 135 and 136, 765 indicates an equalizing cam on the shaft $d$. Bearing on this cam is a roll 766 on a cam lever 767 which roll is forcibly pressed against the equalizing cam by a spring 768. The spring is so proportioned and the cam so shaped that their combined effect is complementary to the resultant of the effects of the other cams on shafts $c$ and $d$, and therefore said shafts offer a substantially constant resistance to the motive power. A similar compensating cam is formed on the cam wheel 452 on shaft $b$, said cam operating in conjunction with lever 769 and spring 770 (Fig. 7).

In Fig. 147 is illustrated a justified line of logotypes $z$ and in Fig. 148 the same logotypes are shown separated. Referring to these figures 771 indicates the ordinary justifying spaces which are cast upon all of the logotypes excepting the one at the left end of the line, which is the last logotype cast. If the spaces 771 were of proper width to justify the line the last logotype would be cast without any space. As heretofore explained, however, if the spaces must deviate from the normal amount required for justification care is taken that they shall not overrun. It is found preferable to so adjust the mold or the justifying mechanism as to make the justifying spaces very slightly too small in order to prevent overrunning. In casting the final logotype $z'$ the mold is adjusted independently of the combined thickness of the matrices for the logotype, the adjustment of the mold being equal to the difference between the column measure and the aggregate width of the existing logotypes in the line. Any deficiency in the justification of a line is therefore made up by a space, which has been termed a "correcting" space, cast upon the inner end of the final logotype. Such a space is indicated at 772 in Figs. 147 and 148. The width or thickness of the correcting space is generally very small and for the purpose of illustration it is much exaggerated in the drawing.

It is desirable to be able to stop the machine instantly at any time and for this purpose a stopping lever $y$ is provided. As shown in Figs. 8, 11, and 14 the stopping lever $y$ is connected by means of arm 828, link 829 and lever 830 with a rod 831 having a forked end which engages a pin $831^a$ on an arm $559^a$ connected with the lever 559 which operates the main clutch $w$. When lever $y$ is thrown to the right against stop pin 832 the rod 831 rocks the lever 559 and disconnects the main clutch. When the lever $y$ is thrown in the opposite direction bringing lever 830 against stop $832^a$ it withdraws the rod 831 and permits the main clutch to reëngage and the shaft $a$ to continue its revolution.

The operation of the machine will be understood from the foregoing detailed description.

The construction illustrated and described constitutes a form of the invention which has been found to operate satisfactorily. It will be evident, however, that the construction can be varied largely within the scope of the invention and it is therefore to be understood that the broader claims herein contained are not limited to the particular mechanism and devices illustrated and described. It will also be evident that various features of the present invention are applicable to various classes of composing machines, those in which ordinary printers' type are set and distributed as well as those in which type or bars are cast from matrices.

While the term "matrices" has been used in this specification for convenience it is intended that such term shall include ordinary type, or dies, as well, when it is used in such connection or relation that the words "type" or "dies" might readily be substituted therefor.

Having thus fully described the invention, what I claim and desire to secure by Letters Patent, is—

1. In a typographic machine, the means for separating a line of matrices, comprising a line forwarder, a matrix pusher for detaching the individual matrices from the line, devices for discontinuing the pressure of the forwarder upon the line when a matrix is being detached from a line and means for simultaneously advancing the pusher and operating said devices.

2. In a typographic machine, the combination of means for forwarding a line of matrices yieldingly, a pusher acting transversely to the line to separate individual matrices, a brake arranged to relieve the pressure of the forwarding device upon the line, a yielding gate arranged to exert a light pressure upon the matrix as it is ejected by the pusher and means for simultaneously advancing the pusher and operating said brake.

3. In a typographic machine, the combination of a channel, and means for forwarding a line of matrices therein, a gate in the side of the channel, a pusher for ejecting matrices through the gate opening, and means independent of the line forwarder for periodically opening the gate.

4. In a typographic machine, the combination of a channel, means for forwarding a line of matrices therein, a normally closed gate at one side of said channel, a pusher arranged opposite the gate and adapted to eject matrices through the gate opening, and means for locking the gate while a matrix is being ejected by the pusher.

5. In a typographic machine, the combination of a channel and means for forwarding matrices therein, with a gate at one side of said channel, a pusher opposite the gate, means for periodically opening the gate, and means arranged to lock the gate in its open position when the pusher begins to eject a matrix through the gate opening.

6. In a typographic machine, the combination with a channel, of a gate controlling a lateral opening of the channel, and a pusher opposite the gate, said gate comprising a slide and a spring seated beveled part carried by the slide.

7. In a typographic machine, the combination with a matrix channel, of a gate normally closing and opening at one side of said channel, a pusher opposite the gate adapted to eject matrices successively through said opening, means for opening the gate periodically, and means for limiting the gate opening to the width of the matrix which registers with the gate.

8. In a typographic machine, the combination with a type channel, and a pusher for ejecting matrices laterally from said channel, of a gate opening and gate opposite said pusher, and means for variably opening the gate, said means being controlled by the variable thickness of the matrices.

9. In a typographic machine, the combination of a matrix line forwarder, a pusher operating transversely to the forwarder to separate individual matrices, a gate through which the matrices are ejected, a series of sets of font feelers, a series of testing slides arranged to carry the matrices to the feelers, a plate on one of said testing slides arranged to close the gate when the slide is not in position to receive a matrix from the pusher.

and a transfer slide for transferring the matrices to the successive testing slides.

10. In a typographic machine, the combination of means for shifting from one case to another, a source of power, and a key adapted to connect said means with said source of power, for the purpose set forth.

11. In a typographic machine, the combination with two magazines for different classes of characters, of power operated means for rendering either magazine operative.

12. In a typographic machine, the combination with two magazines for different classes of characters, of power operated means for rendering either magazine operative, and a key adapted to control said power mechanism.

13. In a typographic machine, the combination of a plurality of upper case magazines, a plurality of lower case magazines, selective means for bringing into action any upper case magazine and its corresponding lower case magazine, assembling mechanism, and power operated means for rendering the assembling mechanism operative upon either of said magazines at will.

14. In a typographic machine, the combination of a magazine having sections for two classes of characters respectively, of power operated mechanism for shifting from one class to the other and vice versa.

15. In a typographic machine, the combination with a magazine having separate sections for upper and lower case characters, a key-board, and devices for releasing matrices from said magazine, of means for normally retaining the matrices in the magazine, and power-operated means for rendering corresponding upper and lower case sections alternately operative.

16. In a typographic machine, the combination of a magazine having two classes of characters, a key-board, and power operated means for shifting from one class of characters to the other and vice versa, comprising a constantly running mechanism and a shift-key for bringing said mechanism into operation.

17. In a typographic machine, the combination with a magazine having two classes of characters, and a key-board having but one set of characters, of means for shifting from one class of characters to the other and vice versa comprising a constantly running roll, a rotating cam, means for holding said cam normally disengaged from said roll, and a key and connections for bringing said cam into operative contact with the roll.

18. In a typographic machine, the combination of separators, each having an undercut notch, of the separator magazine rail adapted to engage said notches and support the separators, said rail having a gap or opening at an intermediate point to permit of the engagement or disengagement of separators therewith.

19. In a typographic machine, the combination of a series of separators, each having an under-cut notch, a magazine rail adapted to engage said notches and support the separators, means for discharging the separators successively from said rail, and means for automatically returning separators to the magazine rail, said rail having a gap or opening intermediate its ends to permit of the manual introduction or discharge of separators.

20. In a typographic machine, the combination with means for assembling a line of matrices and separators, of a casting mechanism, a way leading from the assembling to the casting mechanism, a line forwarder movable along said way to carry a line to the casting mechanism, means for moving the forwarder transversely to the way as it returns to the assembling mechanism to cause it to pass around the newly assembled matrices, and means for moving the forwarder in the reverse direction to cause it to coöperate with the succeeding line of matrices.

21. In a typographic machine, the combination with a mold, and metal injecting mechanism, of knives for trimming the slug, a body-piece movable to propel the slug through the trimming knives, a two-part matrix clamping jaw movable with the body-piece, and means for arresting one part of said jaw during the ejecting movement of the body-piece to prevent injury to the trimming knives.

22. In a machine of the class described, the combination with a mold, and a presentation slide, of means for delivering a line of matrices to the presentation slide, and a yielding device adapted to support the forward end of the matrix line while the matrices are moved into engagement with the presentation slide.

23. In a machine of the class described, the combination with the mold and the presentation slide, of means for delivering matrices to the presentation slide, a device having a head 843 arranged in the path of the matrices, and a spring urging said head against the matrices, the matrix forwarder being adapted to overpower said spring and move the matrices into engagement with the presentation slide.

24. In a machine of the class described, the combination with the presentation slide, of the line forwarder, the spring pressed retarder 843, means for moving the slide toward and from the mold, and means for throwing the retarder out of the path of the presentation slide.

25. In a typographic machine, the means for separating a line of matrices, comprising a line forwarder, a matrix pusher for detaching the individual matrices from the line, and devices for discontinuing the pressure of the forwarder upon the line when a matrix is being detached from the line.

26. In a typographic machine, the combination of the galley, with jaws arranged above and below the mouth of the galley and normally in the path of type entering the galley, means for automatically opening said jaws periodically, and manually operated means for opening said jaws for the discharge of type from the galley.

27. In a typographic machine, a removable galley, in combination with a pair of jaws pivoted to the galley and arranged to normally close the galley mouth.

28. In a typographic machine, the combination of a mold, a liner adapted to eject type from the mold, a pusher operating at right angles to the liner, means for operating the pusher after each individual type is ejected to aline said type, and means for giving the pusher an additional movement on the completion of each line to carry the line to the galley.

29. In a typographic machine, the combination with a mold, of means for imparting to said mold a constant adjustment to compensate for separators in the line of matrices, and means for imparting to said mold a variable adjustment to justify the line.

30. In a typographic machine, the combination with a cam shaft having a series of cams thereon, of a compensating cam on said shaft having its contour complementary to the resultant of the contours of the remaining cams on said shaft, and a cam roll bearing on said compensating cam, whereby the resistance of said shaft to turning is rendered substantially constant.

31. In a typographic machine, the combination with the mold and pump, of the jet slide, the nozzle slide, means for actuating said slides, and a stop for alining the opening in the nozzle slide with the nozzle.

32. In a typographic machine, a removable galley, in combination with a jaw arranged across the mouth of the galley and normally in the path of the type, said jaw being mounted upon and movable with the galley, and means for moving said jaw to permit a line to be pushed into the galley.

33. In a typographic machine, the combination with the removable galley, of a pair of jaws arranged across the mouth of the galley and normally preventing the entrance of type thereto, and means for periodically opening the jaws to admit type to the galley, said jaws being mounted upon and movable with the galley.

34. In a typographic machine, the combination of a plurality of upper case magazines, a plurality of lower case magazines, each of said magazines comprising a plurality of type or matrix channels, an assembling belt coöperating with the several upper case magazines, and a second assembling belt coöperating with the lower case magazines.

35. In a typographic machine, the combination with a magazine, of an assembling belt substantially as wide as the magazine to receive the matrices directly from the magazine, and a funnel having converging sides into which said matrices are discharged by said belt.

36. In a typographic machine, the combination with a magazine, of a belt substantially as wide as the magazine and horizontally arranged below the magazine, and an upright funnel having converging sides into which said belt discharges.

37. In a typographic machine, the combination with upper and lower case magazines, of horizontally arranged belts to receive the matrices from said magazines respectively, and a funnel having two branches to receive the matrices from said belts.

38. In a typographic machine, the combination with a mold, a galley and means for ejecting type successively from the mold, of a fixed shoulder, a pusher for moving the type successively into register with said shoulder after they are ejected, said pusher being also operated to move the line, when complete, into the galley.

39. In a typographic machine, the combination with a plurality of magazines each comprising a plurality of type or matrix channels, of a belt substantially as wide as the magazines and located below said magazines and arranged to run transversely of said magazines and to receive type or matrices from all of said magazine channels.

40. In a typographic machine, the combination with a plurality of upright magazines, arranged in parallel planes and each provided with a plurality of type or matrix channels, of a belt substantially as wide as the magazines and horizontally arranged beneath the magazines and adapted to receive type or matrices from all of said channels, for the purpose set forth.

41. In a typographic machine, the combination with a plurality of upright parallel magazines each comprising a plurality of type or matrix channels, of a horizontally arranged belt substantially as wide as the magazines and running beneath said magazines and adapted to receive type or matrices therefrom, and a funnel into which the type or matrices are delivered by said belt.

42. In a typographic machine the combination with a plurality of upright parallel magazines each comprising a plurality of type or matrix channels, of two horizontally arranged belts located below said magazines, and two funnels arranged to receive type or matrices from said belts respectively, said funnels being constructed to deliver the type or matrices at a common assembling point.

43. In a typographic machine, the combination with a magazine comprising a plurality of type or matrix channels, of a belt substantially as wide as the magazine and arranged below and running transversely of the magazine, and guides above said belt for holding the type or matrices on edge as they are conveyed upon the belt.

44. In a typographic machine, the combination with upper and lower case magazines of separate delivery belts for said magazines, and separate funnels for receiving type or matrices from said delivery belts, said funnels being adapted to convey the type or matrices to a common assembling point.

In testimony whereof I affix my signature, in presence of two witnesses.

EMIL LAWRENZ.

Witnesses:
GEO. B. GAMMIE,
CLARENCE R. TUCKER.

---

Copies of this patent may be obtained for five cents each, by addressing the "Commissioner of Patents, Washington, D. C."